US010203405B2

(12) United States Patent
Mazzaro et al.

(10) Patent No.: US 10,203,405 B2
(45) Date of Patent: Feb. 12, 2019

(54) MULTITONE RADAR WITH RANGE DETERMINATION AND METHOD OF USE

(71) Applicant: U.S. Army Research Laboratory ATTN: RDRL-LOC-I, Adelphi, MD (US)

(72) Inventors: Gregory J. Mazzaro, Charleston, SC (US); Kenneth I. Ranney, Rockville, MD (US); Kyle A. Gallagher, Derwood, MD (US); Anthony F. Martone, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 238 days.

(21) Appl. No.: 15/093,788

(22) Filed: Apr. 8, 2016

(65) Prior Publication Data
US 2016/0282457 A1  Sep. 29, 2016

Related U.S. Application Data

(63) Continuation-in-part of application No. 13/870,519, filed on Apr. 25, 2013, now Pat. No. 9,395,434, and
(Continued)

(51) Int. Cl.
*G01S 13/10* (2006.01)
*G01S 7/41* (2006.01)
(Continued)

(52) U.S. Cl.
CPC .......... *G01S 13/106* (2013.01); *G01S 7/292* (2013.01); *G01S 7/414* (2013.01); *G01S 13/103* (2013.01); *G01S 13/887* (2013.01)

(58) Field of Classification Search
CPC .... G01S 13/103; G01S 13/106; G01S 13/887; G01S 7/292; G01S 7/414
(Continued)

(56) References Cited

U.S. PATENT DOCUMENTS 3,732,567 A  5/1973 Low et al.
3,781,879 A  12/1973 Staras et al.
(Continued)

OTHER PUBLICATIONS

K. Ranney, K. Gallagher, A. Martone, G. Mazzaro, K. Sherbondy, R. Narayanan, "Instantaneous, stepped-frequency, nonlinear radar," Proc. SPIE 9461, Radar Sensor Technology XIX; and Active and Passive Signatures VI, 946122. (May 21, 2015) doi: 10.1117/12. 2186620.

(Continued)

*Primary Examiner* — Timothy A Brainard
(74) *Attorney, Agent, or Firm* — Lawrence E. Anderson; Alan I. Kalb

(57) ABSTRACT

Method for determining distance to target using a multitone nonlinear radar system comprising providing a transmitter that transmits a signal comprising at least two predetermined frequency components; receiving transmitted signal upon reflection from target; determining the phase relationships of the frequency components when signal strikes target; determining distance the signal has travelled to target based upon the phase relationship of the frequency signal components at the time of reflection from target; computing the distance to target. A system comprising a transmitter subsystem that transmits radar signal comprising at least two frequency components; a receiver subsystem configured to receive a return signal comprising intermodulation and harmonic products; at least one processor configured to extract frequency samples from the return signal within a frequency range, apply a window function to the extracted frequency samples and perform an inverse fast Fourier transform on the resulting function to create a range profile.

1 Claim, 67 Drawing Sheets

Related U.S. Application Data a continuation-in-part of application No. 14/032,387, filed on Sep. 20, 2013, now Pat. No. 9,476,973.

(51) Int. Cl.
*G01S 13/88* (2006.01)
*G01S 7/292* (2006.01)

(58) Field of Classification Search
USPC .......................................................... 342/127
See application file for complete search history.

(56) References Cited

U.S. PATENT DOCUMENTS

| | | | |
|---|---|---|---|
| 3,972,042 | A | 7/1976 | Johnson |
| 4,053,891 | A | 10/1977 | Opitz |
| 5,191,343 | A | 3/1993 | Danzer et al. |
| 6,049,301 | A | 4/2000 | Weagant |
| 6,060,815 | A | 5/2000 | Nysen |
| 6,163,259 | A | 12/2000 | Barsumian et al. |
| 6,765,527 | B2 | 7/2004 | Jablonski et al. |
| 6,856,275 | B1 | 2/2005 | Ehlers et al. |
| 6,894,614 | B2 | 5/2005 | Eckstein et al. |
| 6,897,777 | B2 | 5/2005 | Holmes et al. |
| 7,777,671 | B2 | 8/2010 | Lehtola et al. |
| 7,830,299 | B2 | 11/2010 | Steele et al. |
| 7,864,107 | B1 | 1/2011 | Schnitzer |
| 7,987,068 | B2 | 7/2011 | Schultz |
| 8,131,239 | B1 | 3/2012 | Walker et al. |
| 9,395,434 | B2 | 7/2016 | Mazzaro et al. |
| 2006/0067541 | A1* | 3/2006 | Yamada ................ G10H 1/361 381/98 |
| 2009/0009380 | A1* | 1/2009 | Schnitzer ................ G01S 7/282 342/90 |
| 2014/0350793 | A1* | 11/2014 | Schrabler ................ G01S 7/006 701/41 |
| 2015/0084811 | A1 | 3/2015 | Mazzaro et al. |
| 2016/0282457 | A1 | 9/2016 | Mazzaro et al. |

OTHER PUBLICATIONS

+G. Mazzaro, A. Martone, D. McNamara, "Detection of RF Electronics by Multitone Harmonic Radar," IEEE Transactions on Aerospace and Electronic Systems, vol. 50, No. 1, Jan. 2014, pp. 477-490.

G. Mazzaro and A. Marione, "Multitone harmonic radar", Proc. SPIE 8714, Radar Sensor Technology XVII, 87140E (May 31, 2013); doi:10.1117/12.2014241.

J.A Kosinski, W.D. Palmer, and M.B. Steer, "Unified understanding of rf remote probing," IEEE Sensors Journal, vol. 11, No. 12, pp. 3055-3063, Dec. 2011.

G. Mazzaro, K. Gallagher, A. Marione, R. Narayanan, "Stepped-frequency nonlinear radar simulation," Proceedings of SPIE, vol. 9077, id. 90770U 10 pp. (2014).

Stanger, C., et al. "A practical superheterodyne-receiver detector using stimulated emissions," IEEE Trans. Instrum. Meas., vol. 60, No. 4, pp. 1461-1468 (Apr. 2011).

Martone, A., et al., "Cognitive Nonlinear Radar," Army Research Laboratory, ARL-MR-0837 Jan. 2013.

"Fleming, Harmonic Radar Detection Systems," Proceedings of the IEEE International Conference RADAR-77, pp. 1223-1231 (Oct. 1977).

A. Singh, et al., "Respiratory Monitoring and Clutter Rejection Using a CW Doppler Radar with Passive RF Tags," IEEE Sensors, vol. 12, No. 3, pp. 558-565, Mar. 2012.

Polacek, V., et al."The Use of Digital Modulation Signals in Radar System for Detection of Nonlinear Scatterers," Proc. Int. Radar Symp., IRS, pp. 743-747,Apr. 2011.

A. F. Martone and E. J. Delp, "Characterization of RF devices using two-tone probe signals," in Proc. 14th Workshop on Stat. Sig. Process., IEEE/SP, pp. 161-165, Aug. 2007.

E. Axell, et al., "Spectrum Sensing for Cognitive Radio," IEEE Signal Processing Magazine, vol. 29, No. 3, pp. 101-116 (May 2012).

M. Ressler, G. Smith, L. Nguyen, and R. Harris, "Synchronous Impulse Reconstruction (SIRE) radar sensor," U.S. Army Research Laboratory, Adelphi, MD, Technical Report ARL-TR-4661, Nov. 2008.

D. Liao, "A hybrid approach for characterizing linear and nonlinear electromagnetic scattering: Theory and applications," U.S. Army Research Laboratory, Adelphi, MD, Technical Report ARL-TR-6261, Nov. 2012.

* cited by examiner

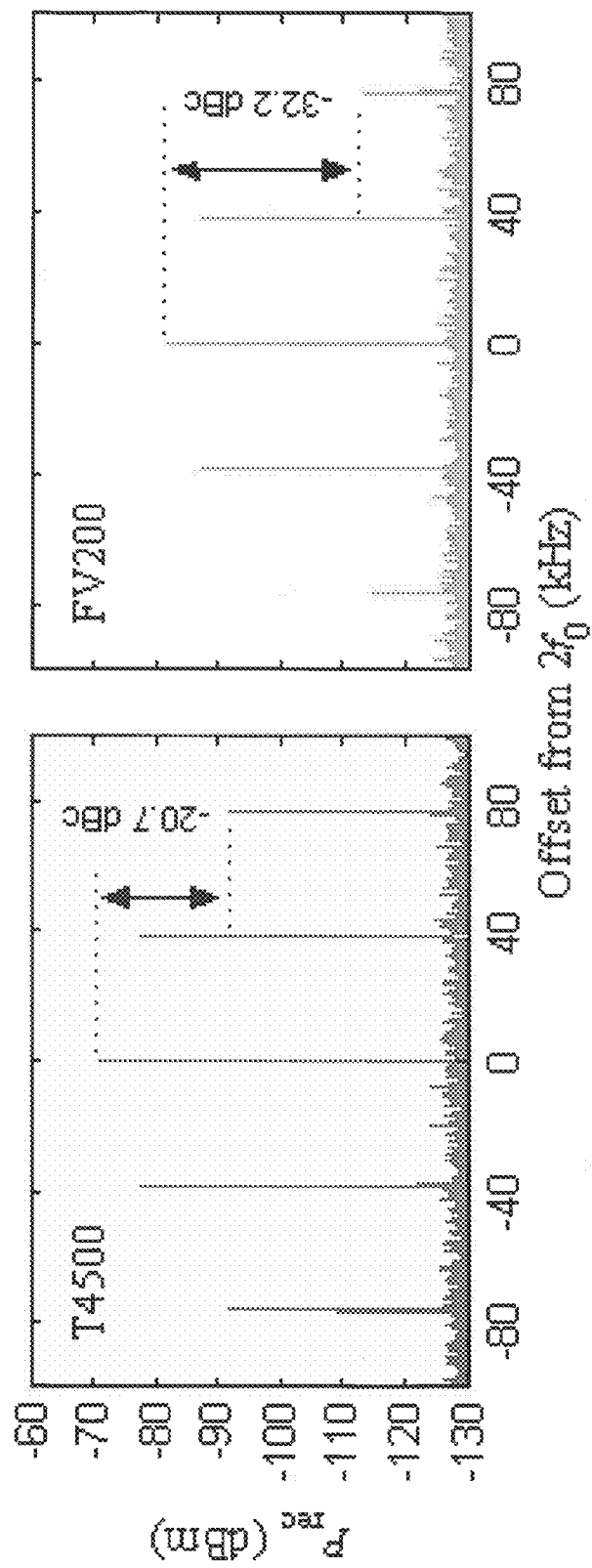
FIG. 2 Nonlinear response recorded from two DUTs at $f_0 = 756$ MHz, corresponding to the first row of Table 1.

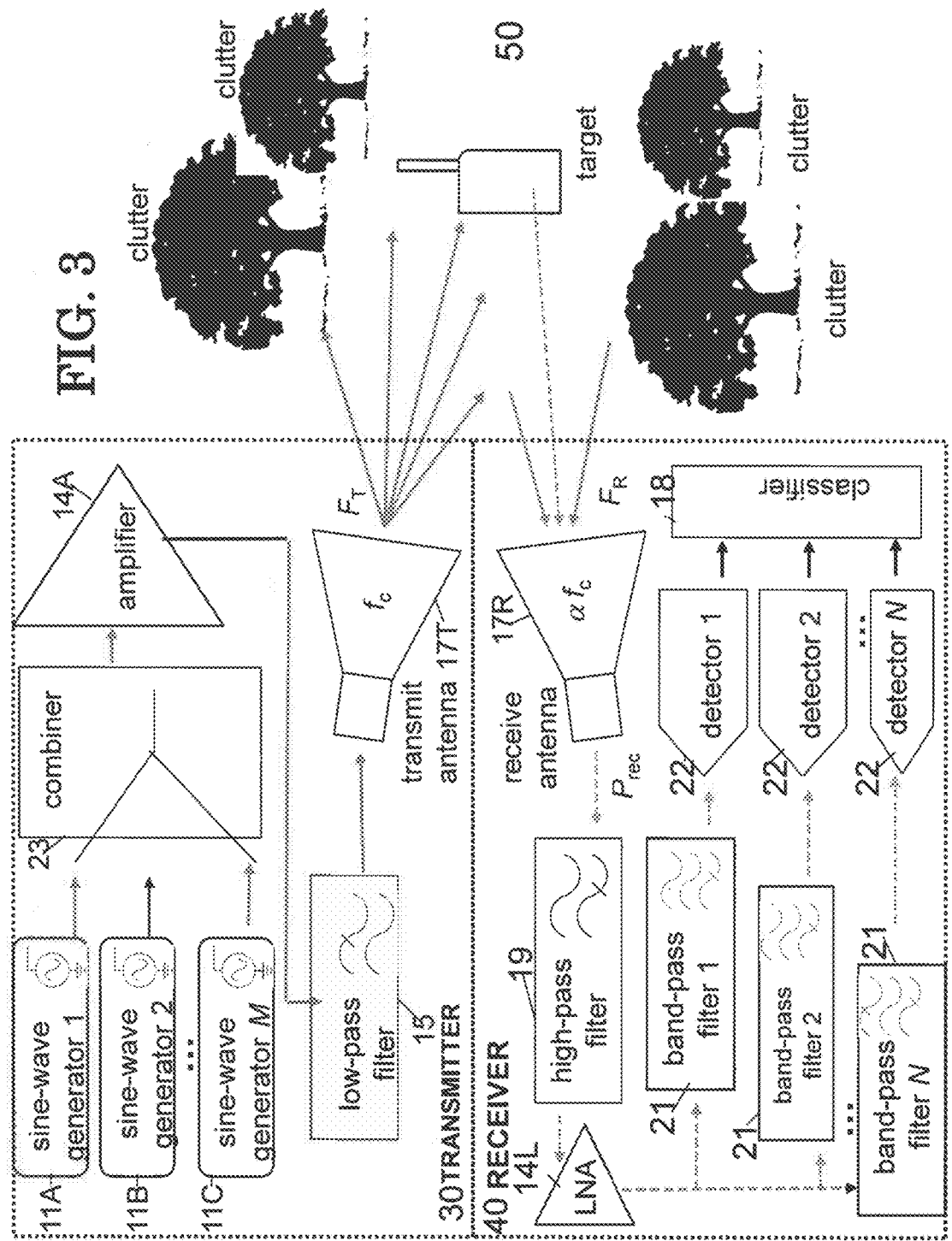

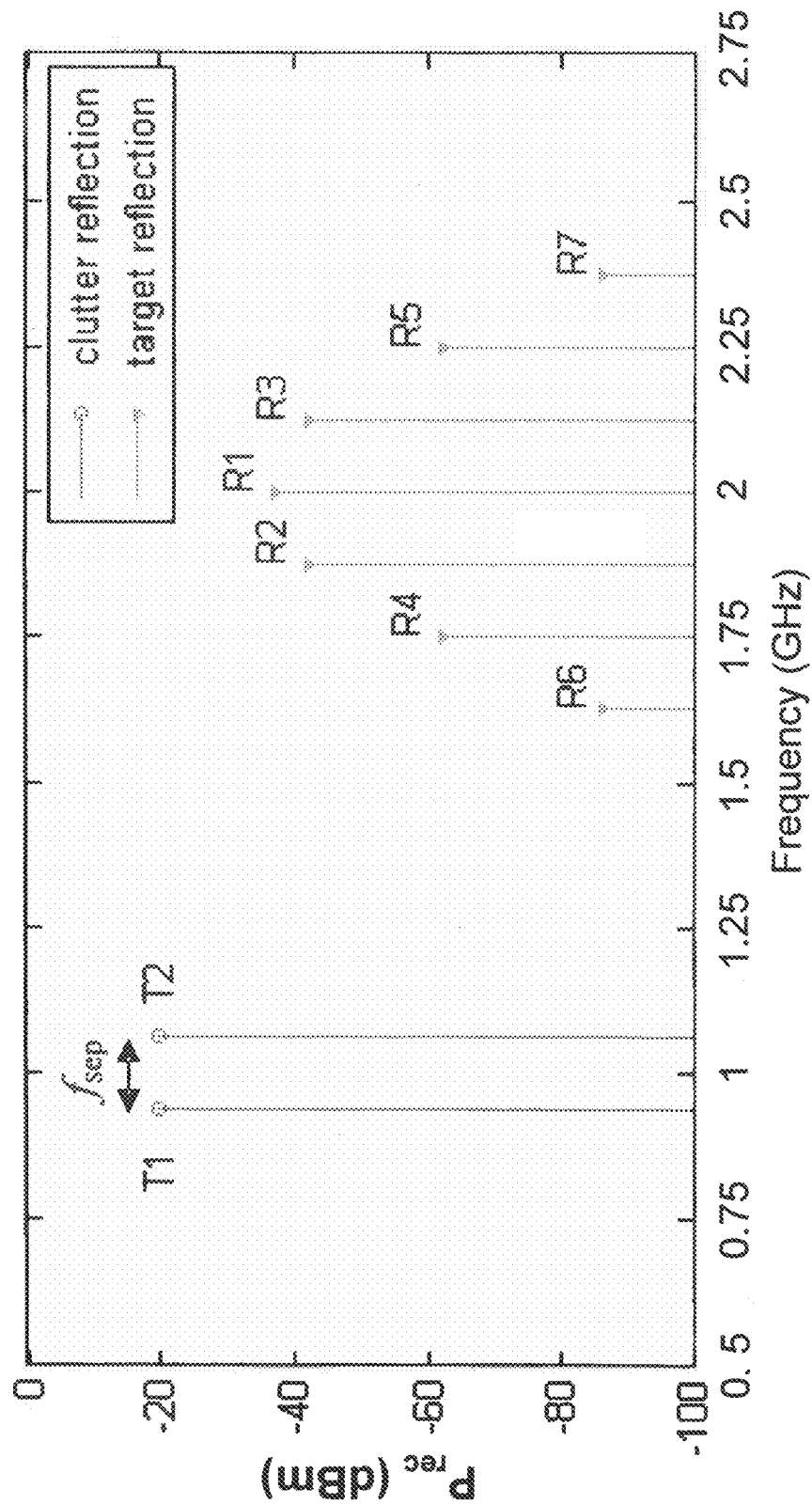
FIG. 5A  Harmonic radar return: $M = 2$, $N = 7$, $\alpha = 2$, $f_c = 1$ GHz.

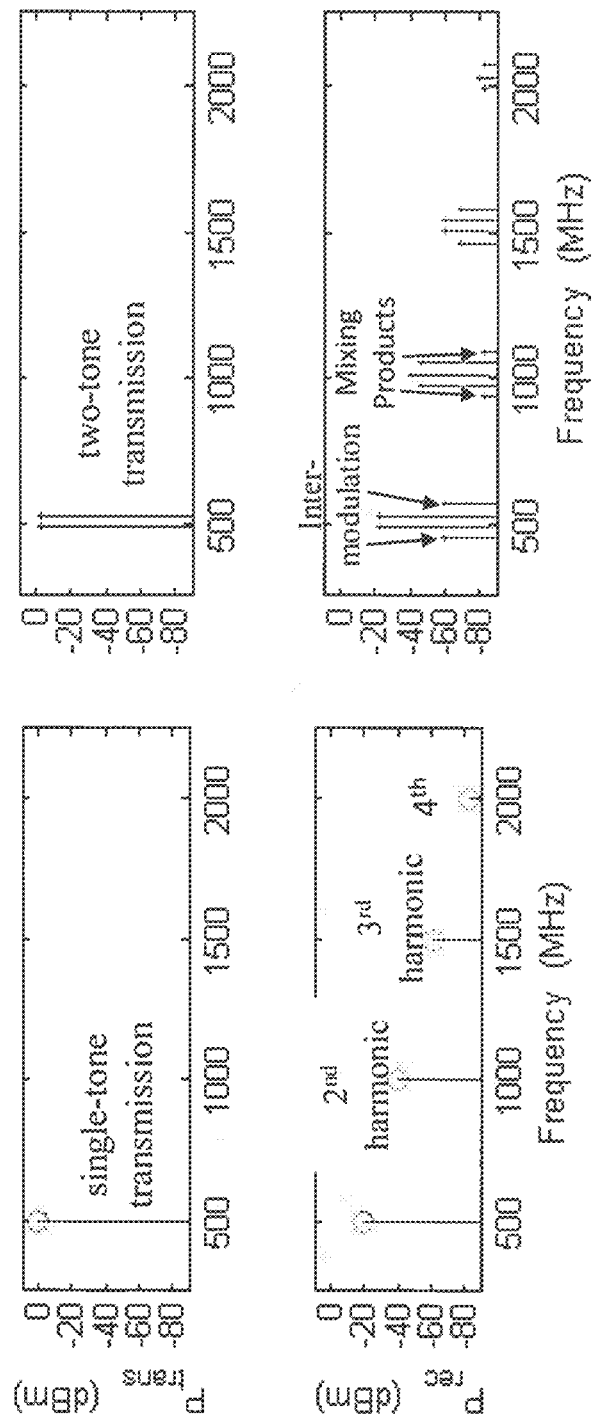
FIG. 5B Single-tone CW     FIG. 5C Two-tone CW.

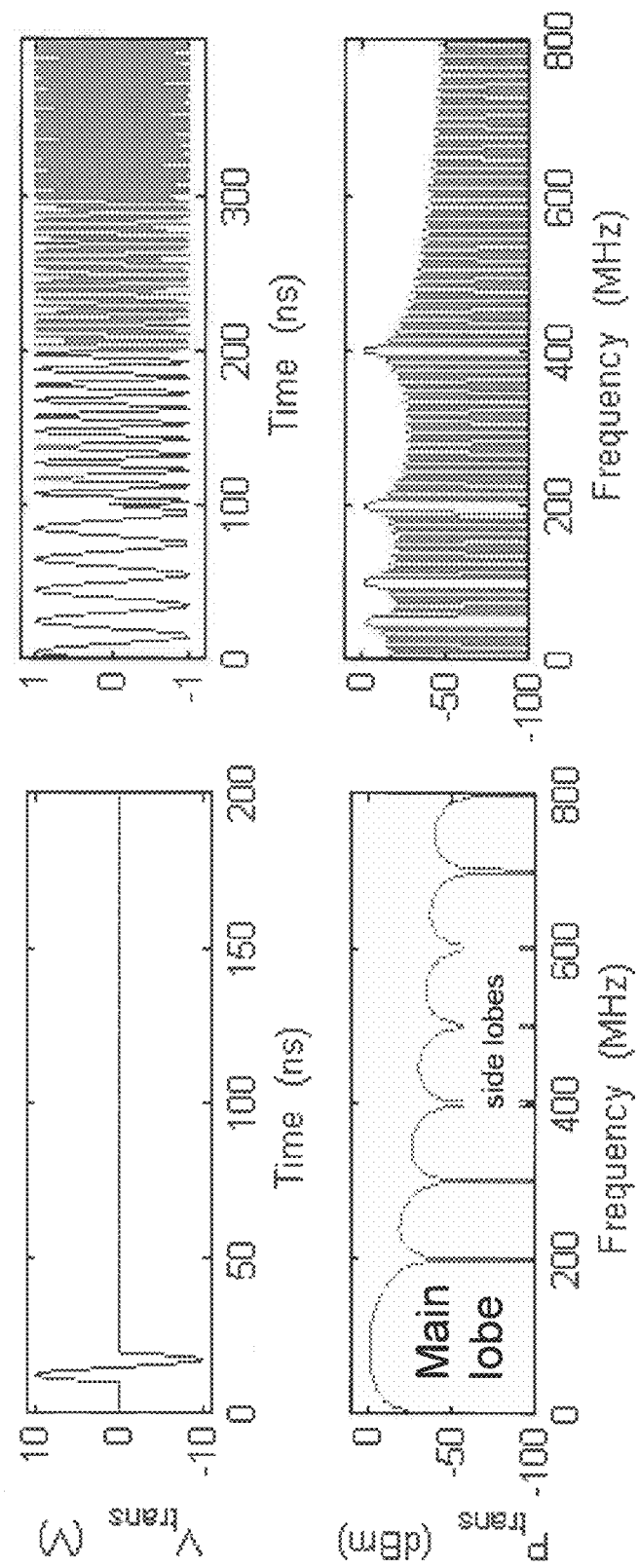

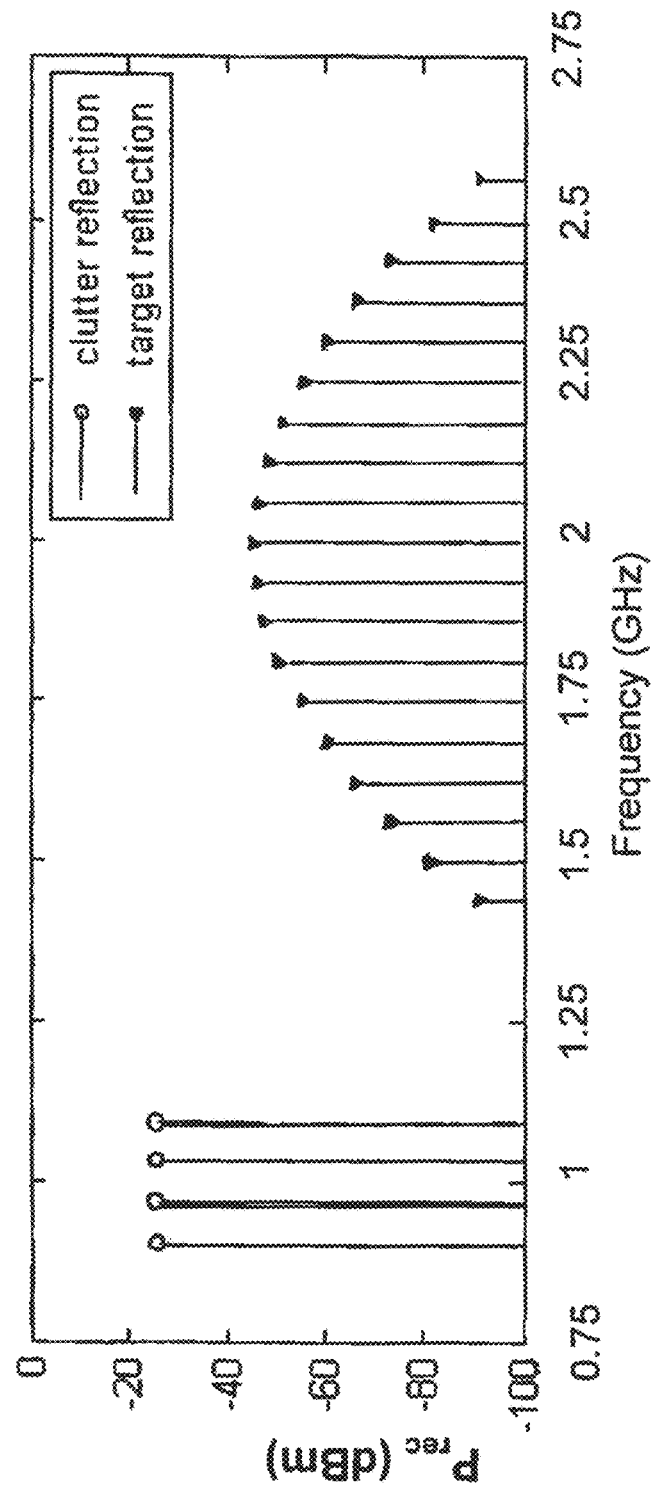
FIG. 6  Harmonic radar return: $M = 4$, $N = 19$, $\alpha = 2$, $f_c = 1$ GHz.

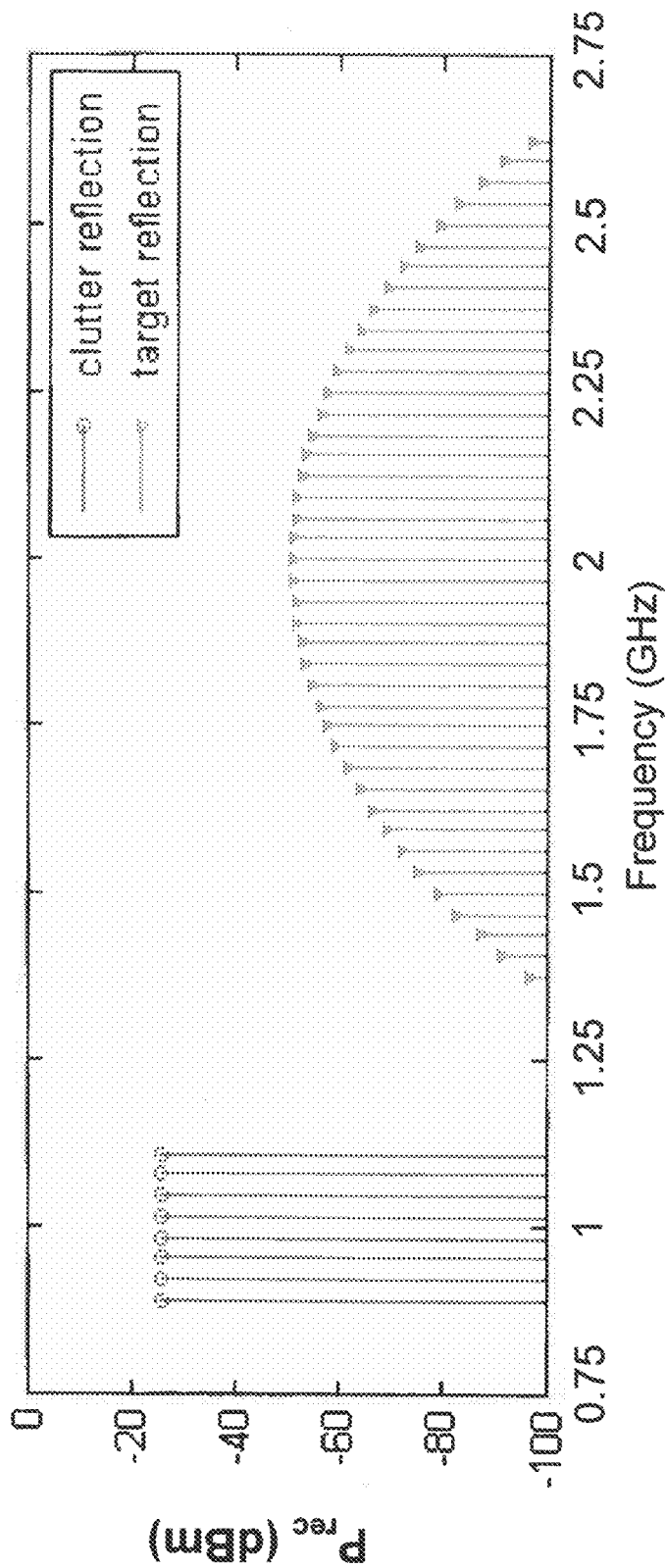
FIG. 7 Harmonic radar return: $M = 8$, $N = 41$, $\alpha = 2$, $f_c = 1$ GHz.

Multitone radar data: 3 targets, $M = 2$, $f_{sep} = 5$ MHz.

Multitone radar data: 3 targets, $M = 2$, $f_{sep} = 5$ MHz.

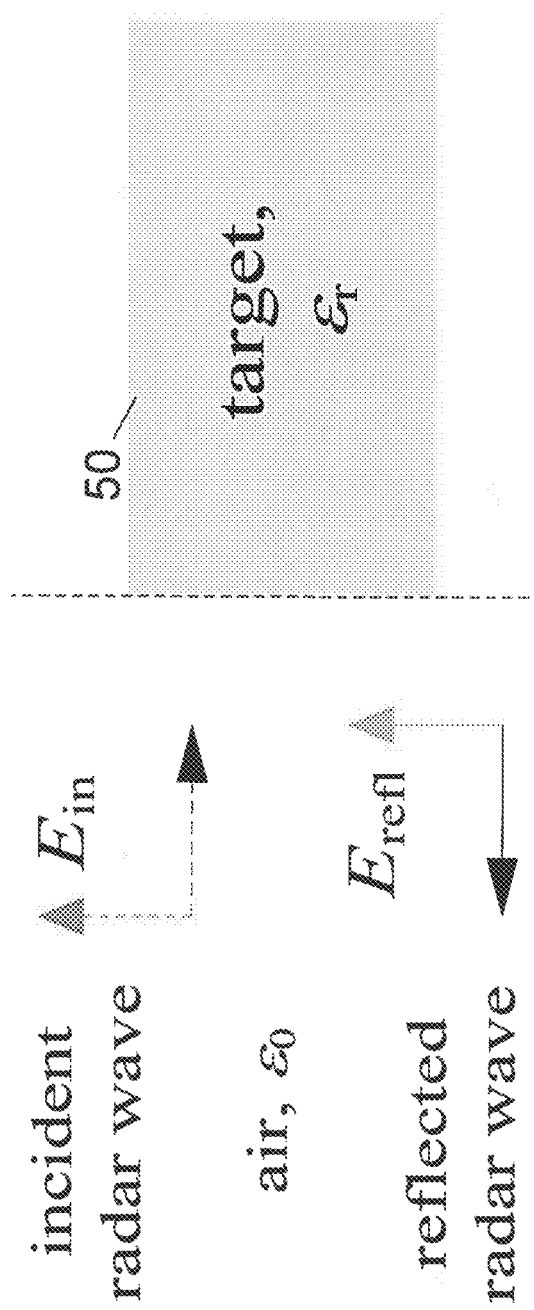
FIG. 11  Incident and reflected radar waves for propagation normal to target.

Linear radar waveform: impulse

Linear radar waveform: Stepped-frequency.

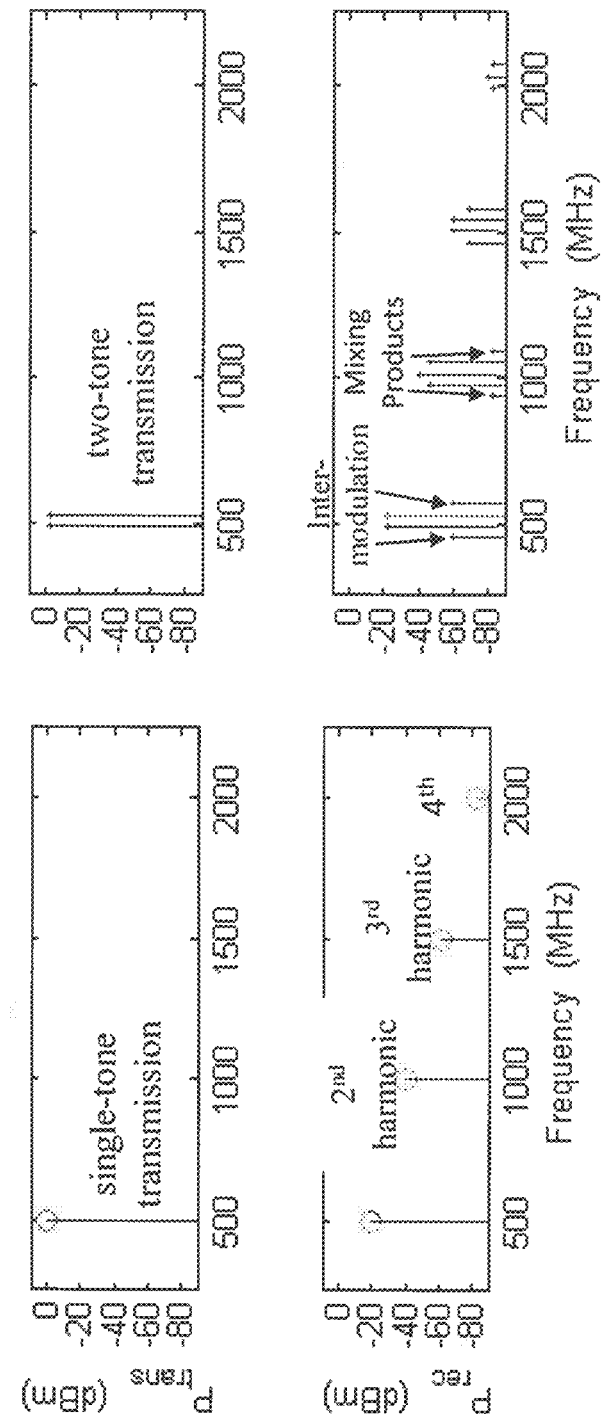
FIG. 13A  FIG. 13B
Nonlinear radar waveforms: (a) single-tone CW, (b) two-tone CW.

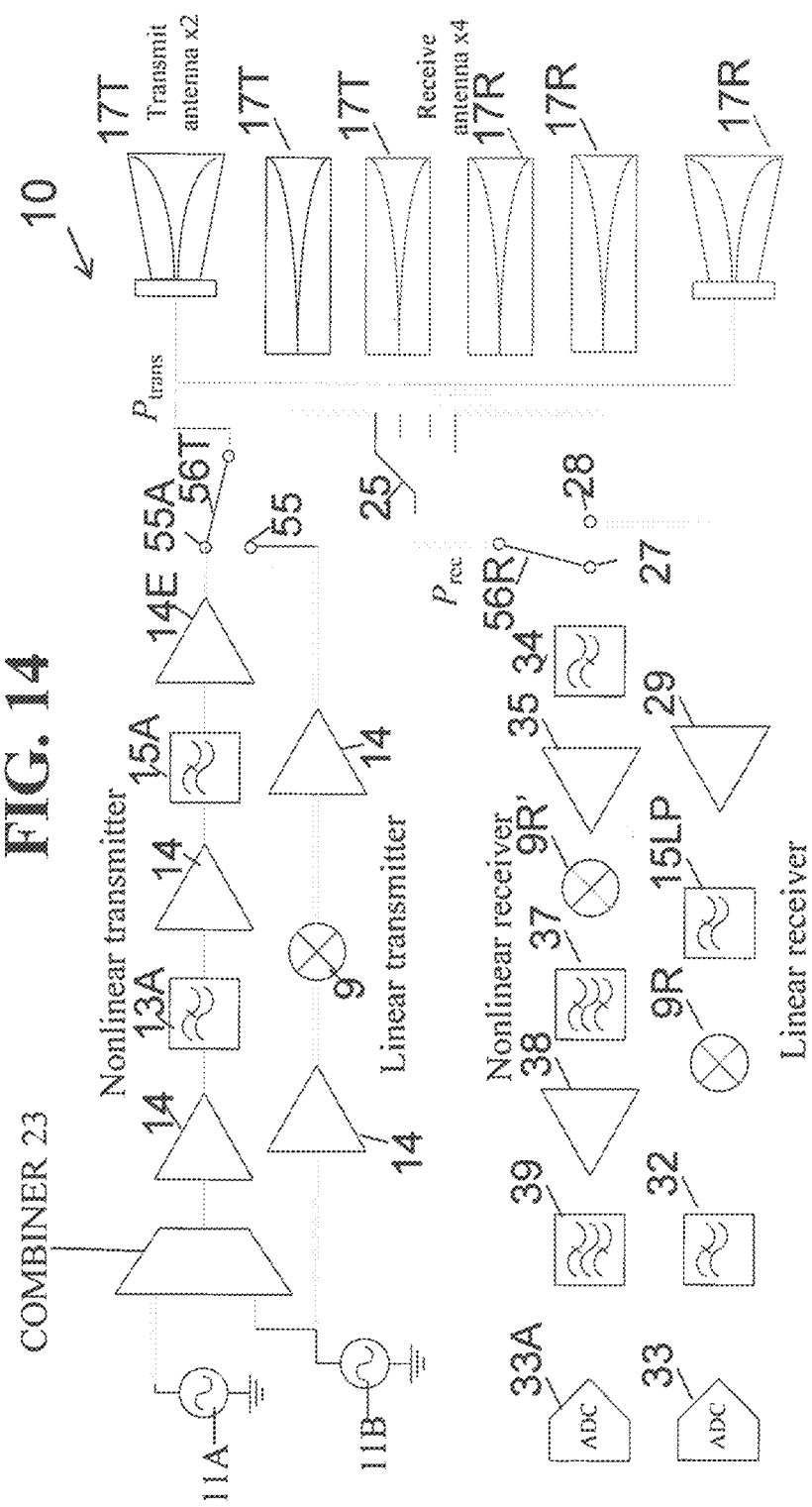

Imaging results for a nonlinear buried target: scene containing target and two (linear) clutter objects.

Combined radar for the detection of threats containing both linear and nonlinear components. A picture of the Synchronous Impulse Reconstruction (SIRE) radar mounted on a vehicle is provided.

FIG. 17 Single-tone RF pulse output by AWG: $f_{pulse} = 900$ MHz, $P_{env} = 0$ dBm, $T_{env} = 1$ μs, $D_c = 10\%$.

FIG. 18 Multitone RF pulse output by AWG: $N = 2$ tones, $f_c = 890$ MHz, $P_{tone} = -6$ dBm per tone, $T_{env} = 2$ μs, $D_c = 20\%$.

FIG. 19 Linear FM chirp pulse output by AWG: $f_{start} = 860$ MHz, $f_{end} = 900$ MHz, $P_{env} = -3$ dBm, $T_{env} = 4$ μs, $D_c = 50\%$.

FIG. 20 Stepped-frequency pulse output by AWG: $f_{start} = 870$ MHz, $f_{end} = 890$ MHz, $\Delta f = 1$ MHz, $P_{env} = 0$ dBm, $T_{env} = 2.5$ μs, $D_c = 25\%$.

FIG. 22  Transmitter amplifier and lowpass filters.

Directional coupler and linear/nonlinear receiver chain.

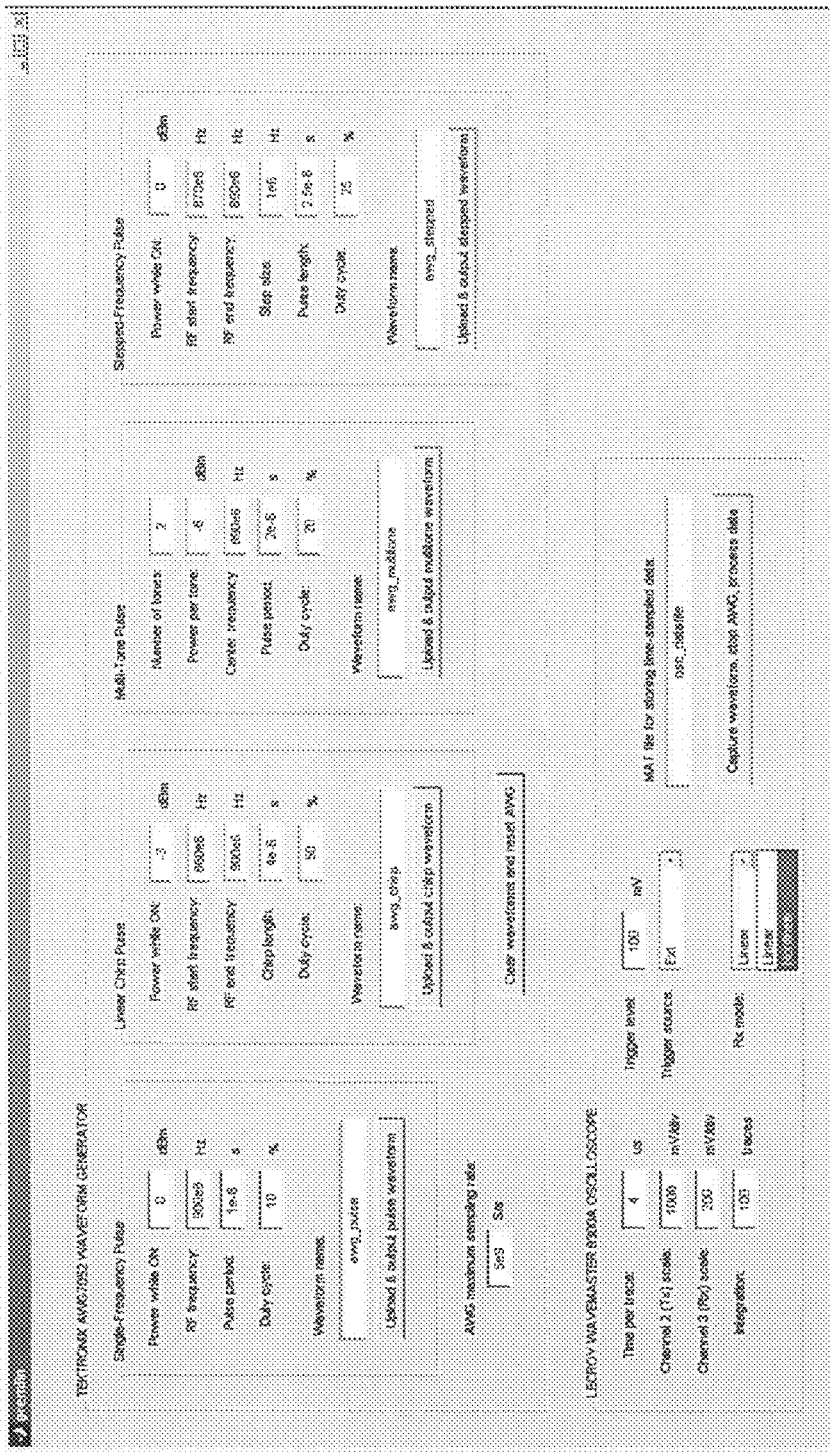
FIG. 24 Graphical user interface for experimental combined-radar system.

Radar data, chirp Tx waveform, linear Rx mode, open-circuit target: $f_{start} = 880$ MHz, $f_{end} = 920$ MHz, $P_{env} = 0$ dBm, $T_{env} = 1$ μs, $D_c = 10\%$,

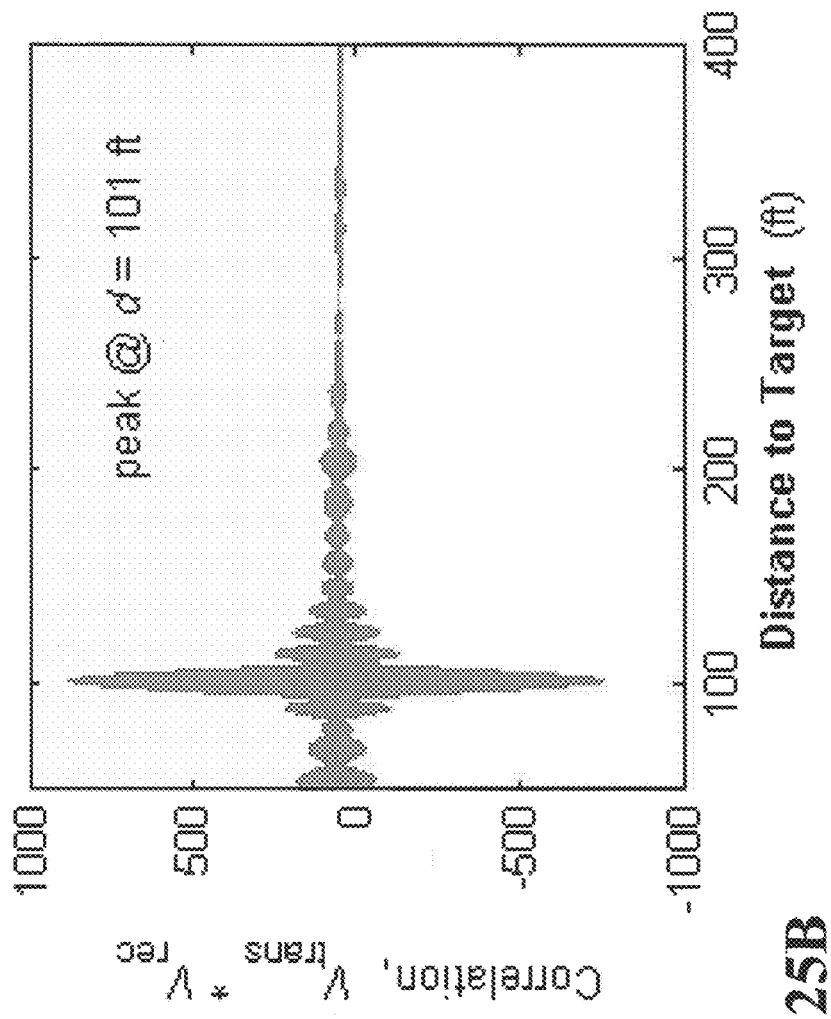
FIG. 25B Radar data, chirp Tx waveform, linear Rx mode, open-circuit target: $f_{start} = 880$ MHz, $f_{end} = 920$ MHz, $P_{env} = 0$ dBm, $T_{env} = 1$ μs, $D_c = 10\%$, Radar data, chirp Tx waveform, linear Rx mode: $f_{start}$ = 860 MHz, $f_{end}$ = 940 MHz, $P_{env}$ = 0 dBm, $T_{env}$ = 1 μs, $D_c$ = 10%.

Radar data, RF pulse Tx waveform, linear Rx mode, FRS radio target: $f_{pulse}$ = 900 MHz, $P_{env}$ = 0 dBm, $T_{env}$ = 1 μs, $D_c$ = 10%, FIG. 28 Tx and Rx frequency content, stepped-frequency Tx waveform, nonlinear Rx mode, FRS radio target: $f_{start}$ = 890 MHz, $f_{end}$ = 910 MHz, $\Delta f$ = 1 MHz, $P_{env}$ = 0 dBm, $T_{env}$ = 2 μs, $D_c$ = 20%, (a) raw data, complete time scale, (b) raw data, zoomed-in time scale.

Radar data, linear chirp Tx waveform, nonlinear Rx mode, FRS radio target.

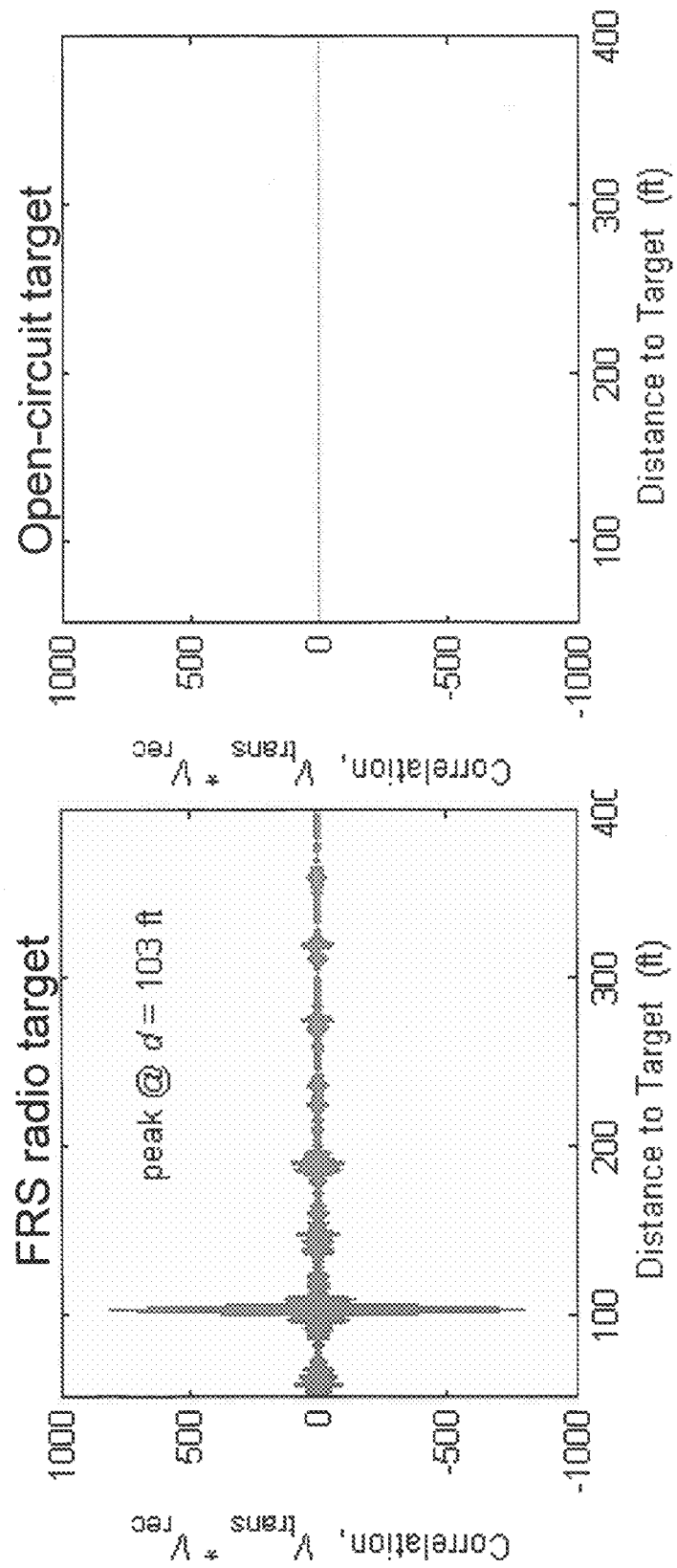
FIG. 30 Radar data, chirp Tx waveform, nonlinear Rx mode:

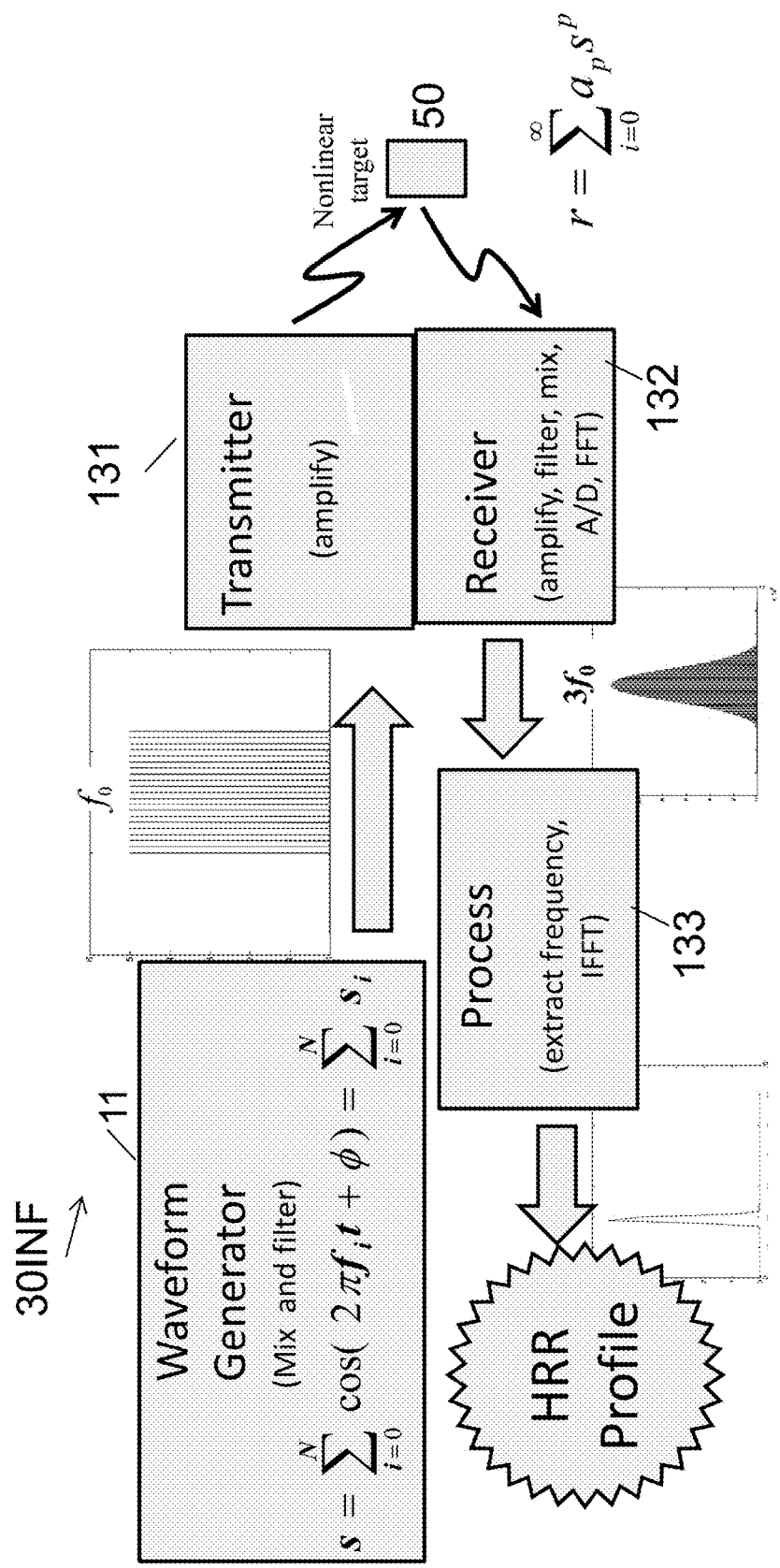
FIG. 31   Block diagram of Preferred Embodiment InSteF system.

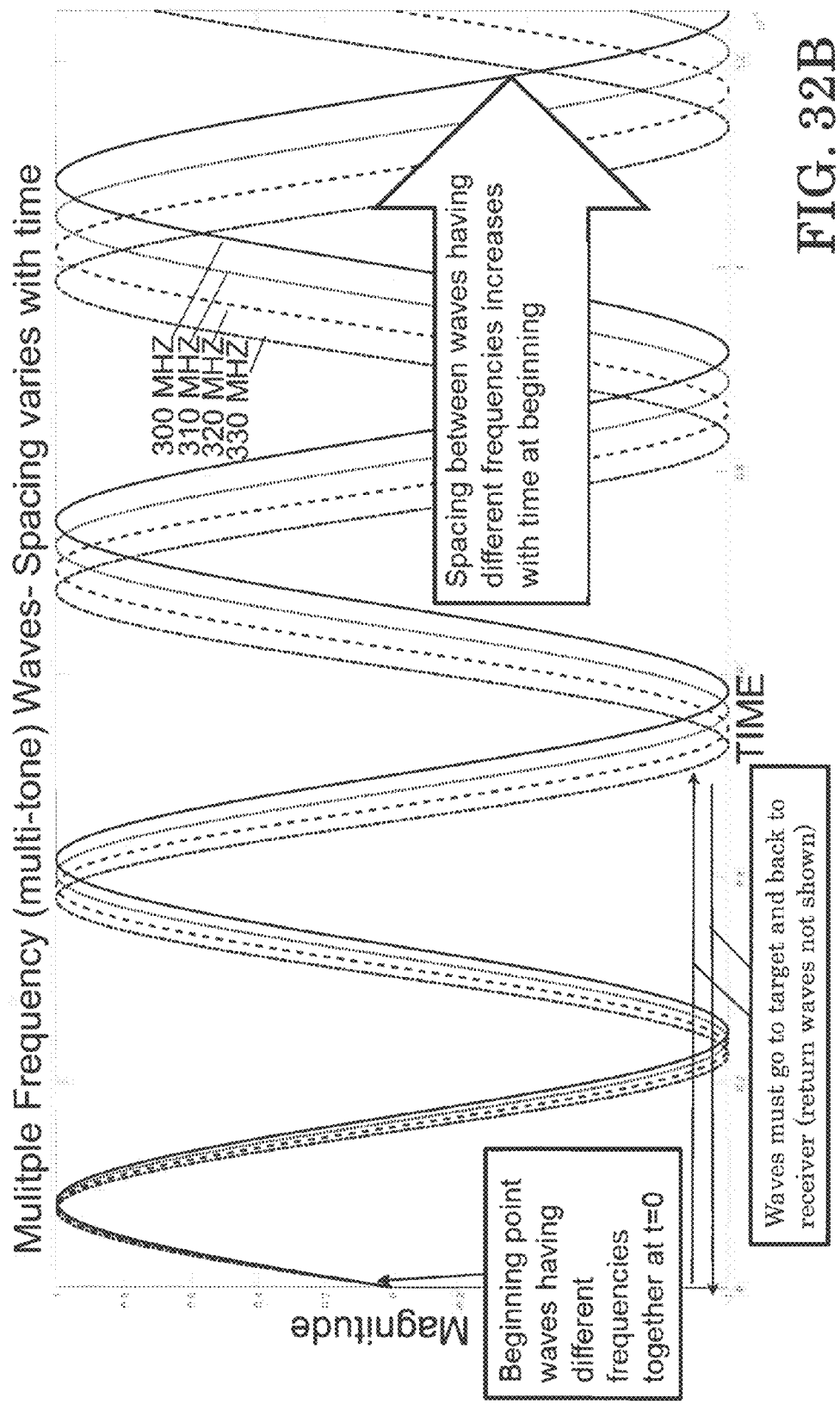

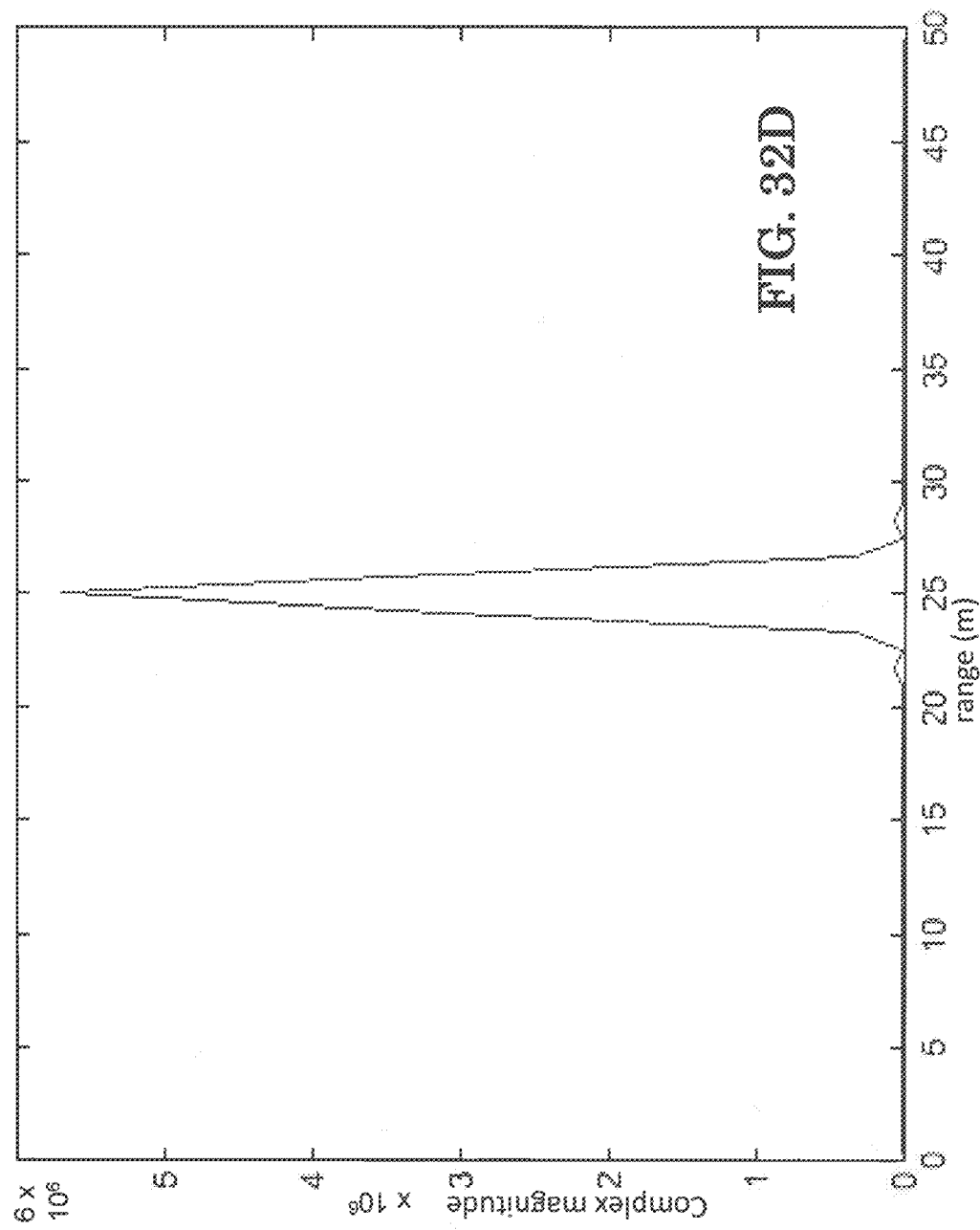

Coaxial-line experiment to collect simultaneous-frequency data from nonlinear electronic targets of interest The target is at a distance of 51ft. from the InSteF system, as illustrated in the dashed box labeled "Simulated Radar Environment".

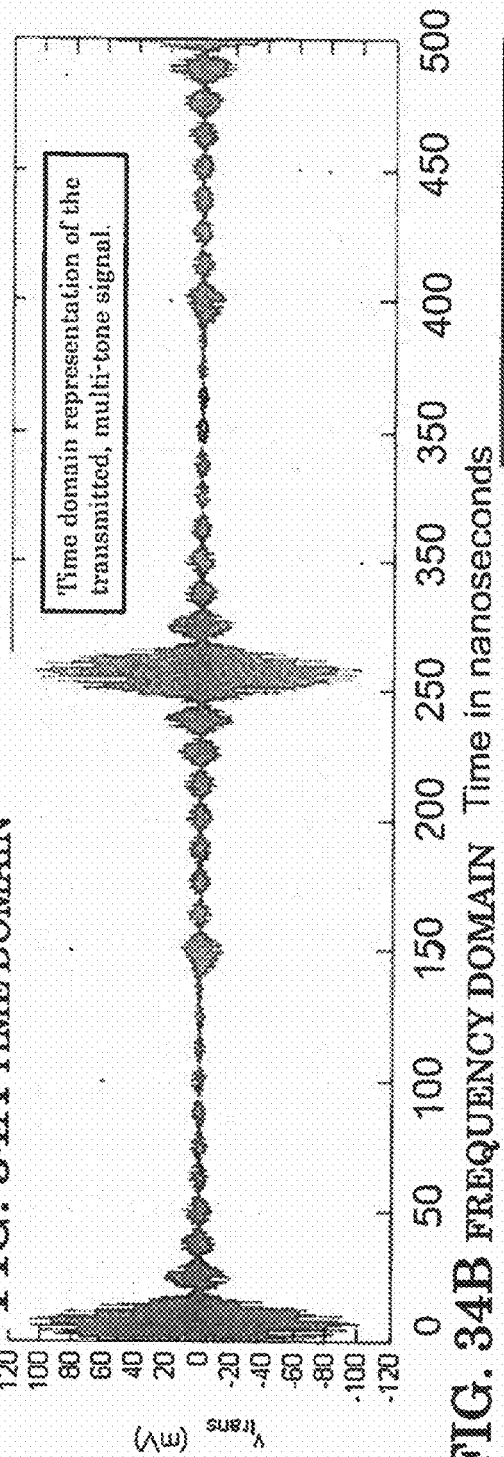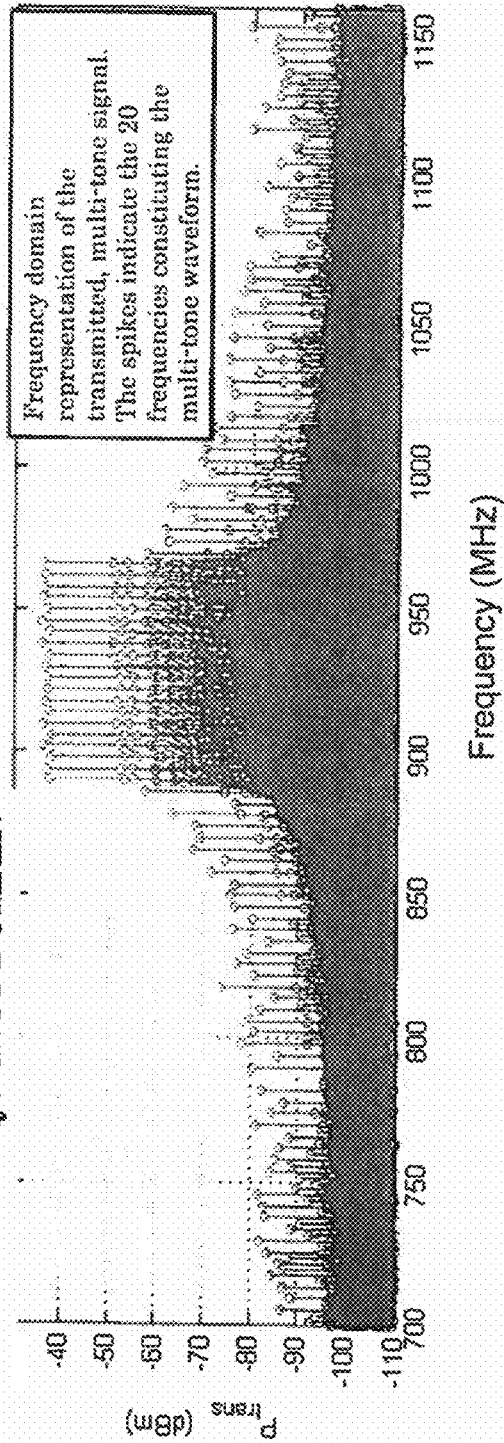
FIG. 34A TIME DOMAIN
FIG. 34B FREQUENCY DOMAIN

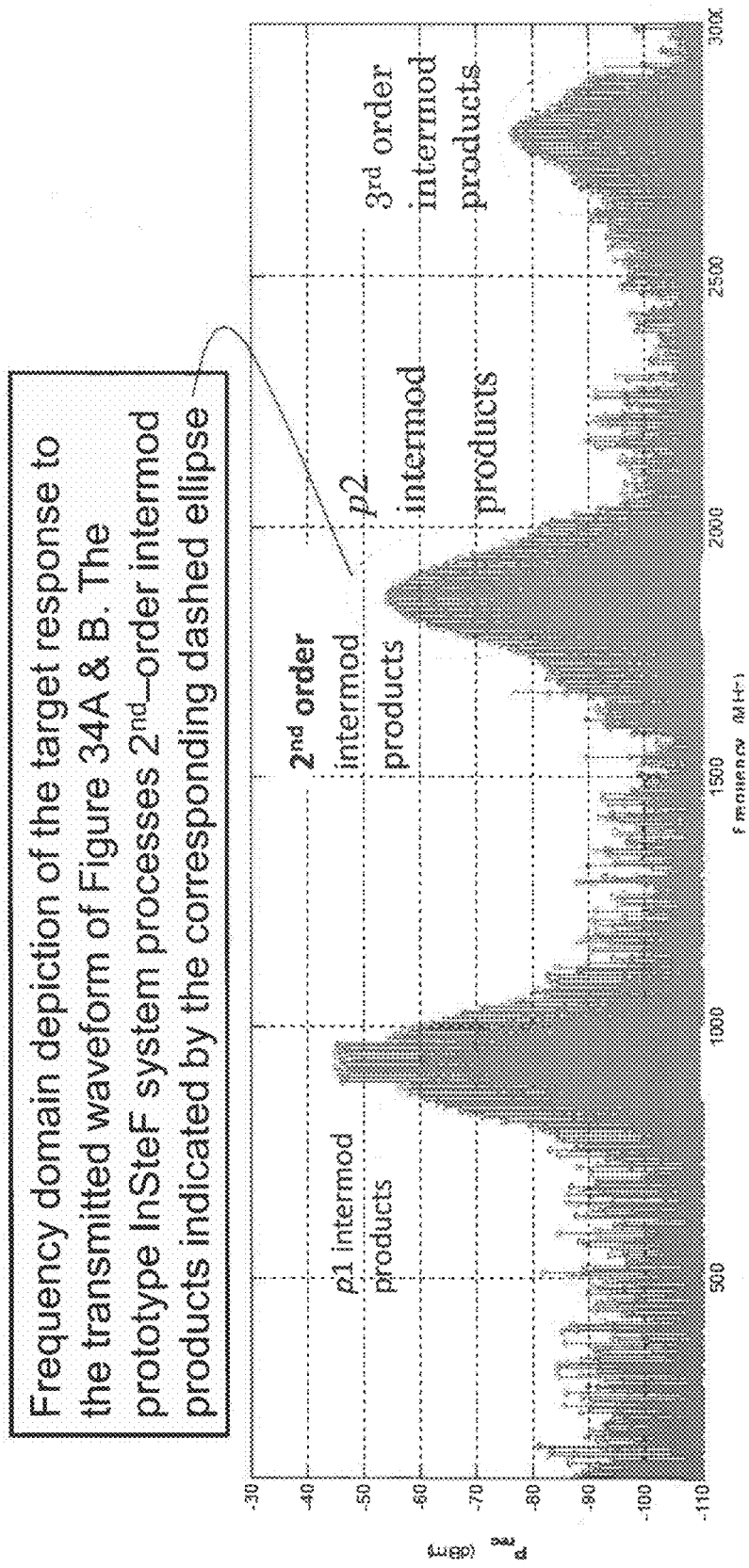
FIG. 34C FREQUENCY DOMAIN

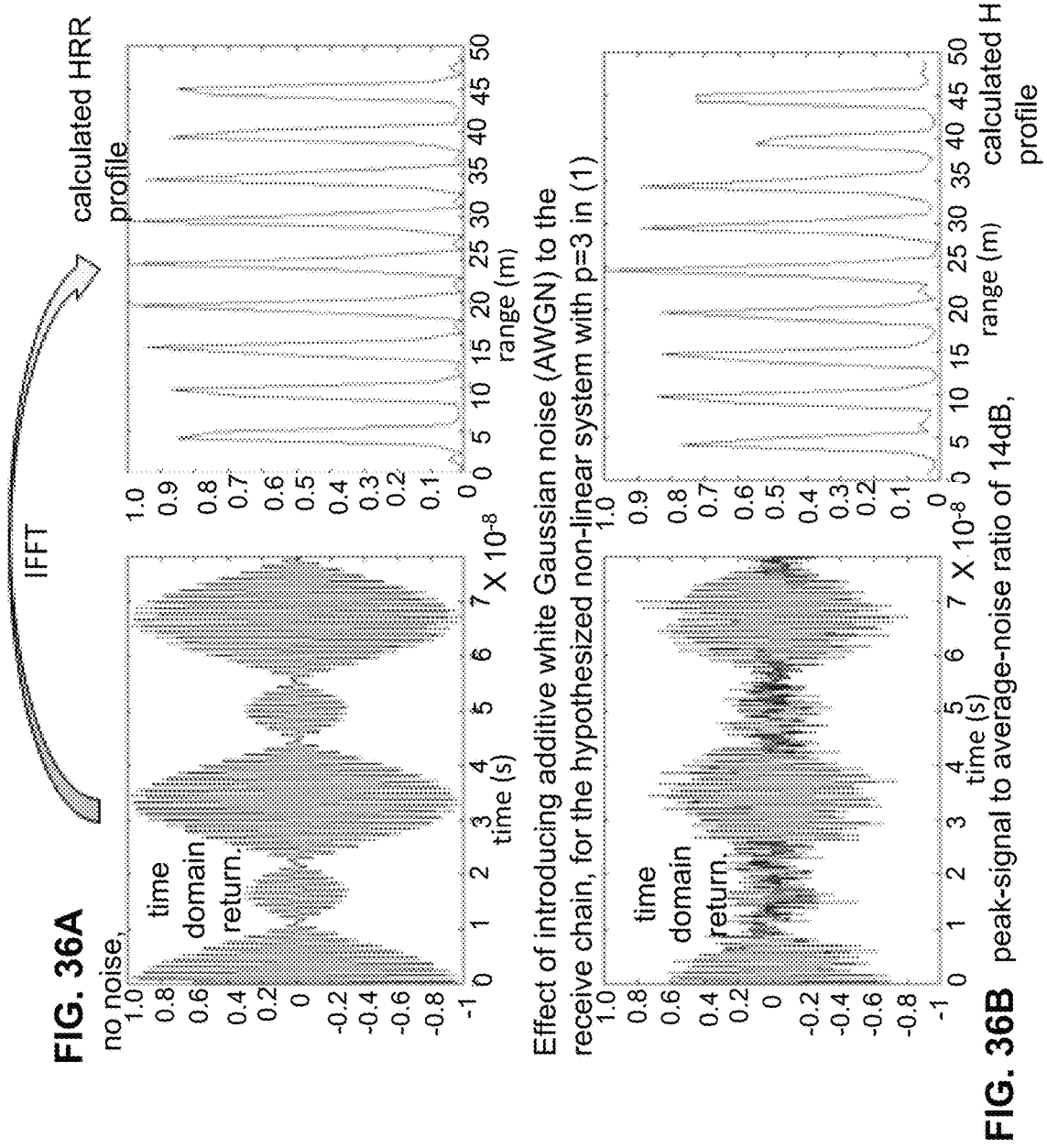
FIG. 36A no noise
FIG. 36B peak-signal to average-noise ratio of 14dB, Effect of introducing additive white Gaussian noise (AWGN) to the receive chain, for the hypothesized non-linear system with p=3 in (1)

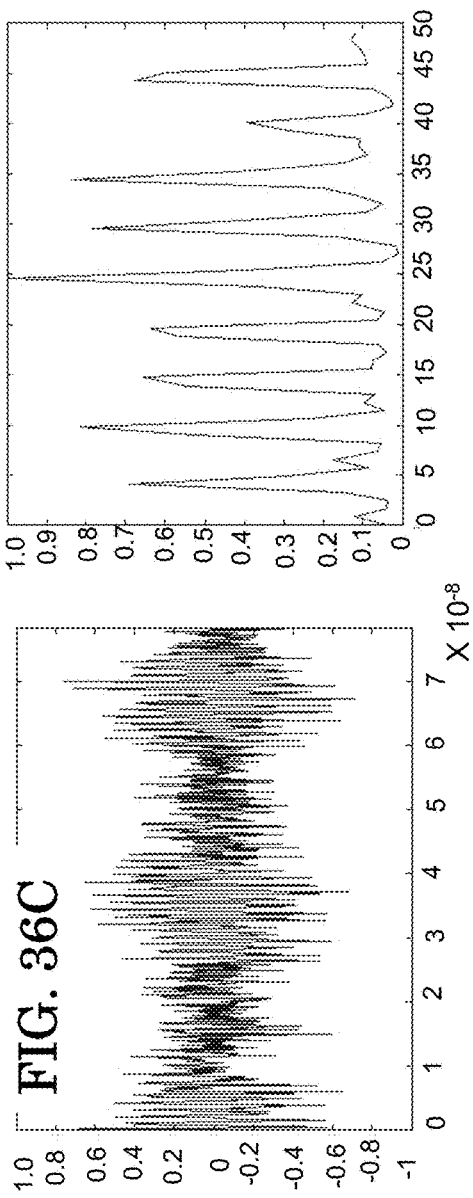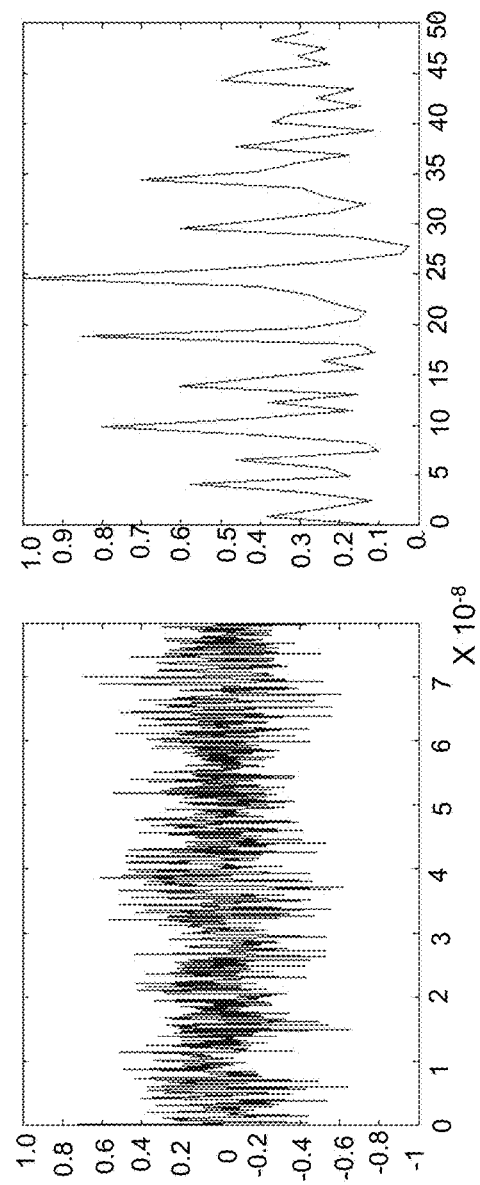

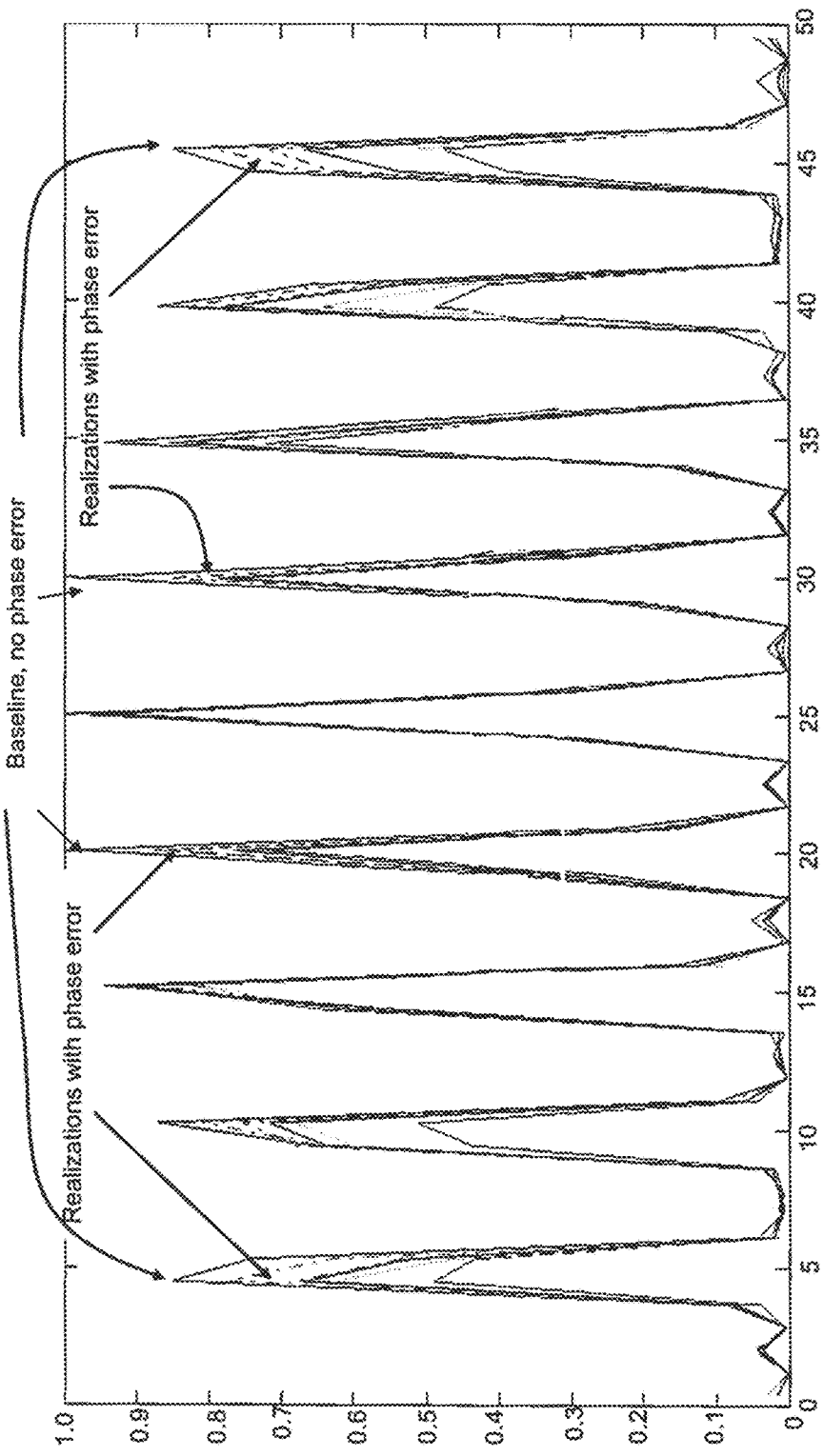

FIG. 37A  Introduction of random initial phase on frequency components of multi-tone signal. Initial phase selected from uniform distribution over the indicated phase interval.

Phase of each multi-tone frequency uniformly distributed between 0° and 45°. Baseline represents zero initial phase across all frequencies; remaining lines represent different realizations (i.e. random initial phases).

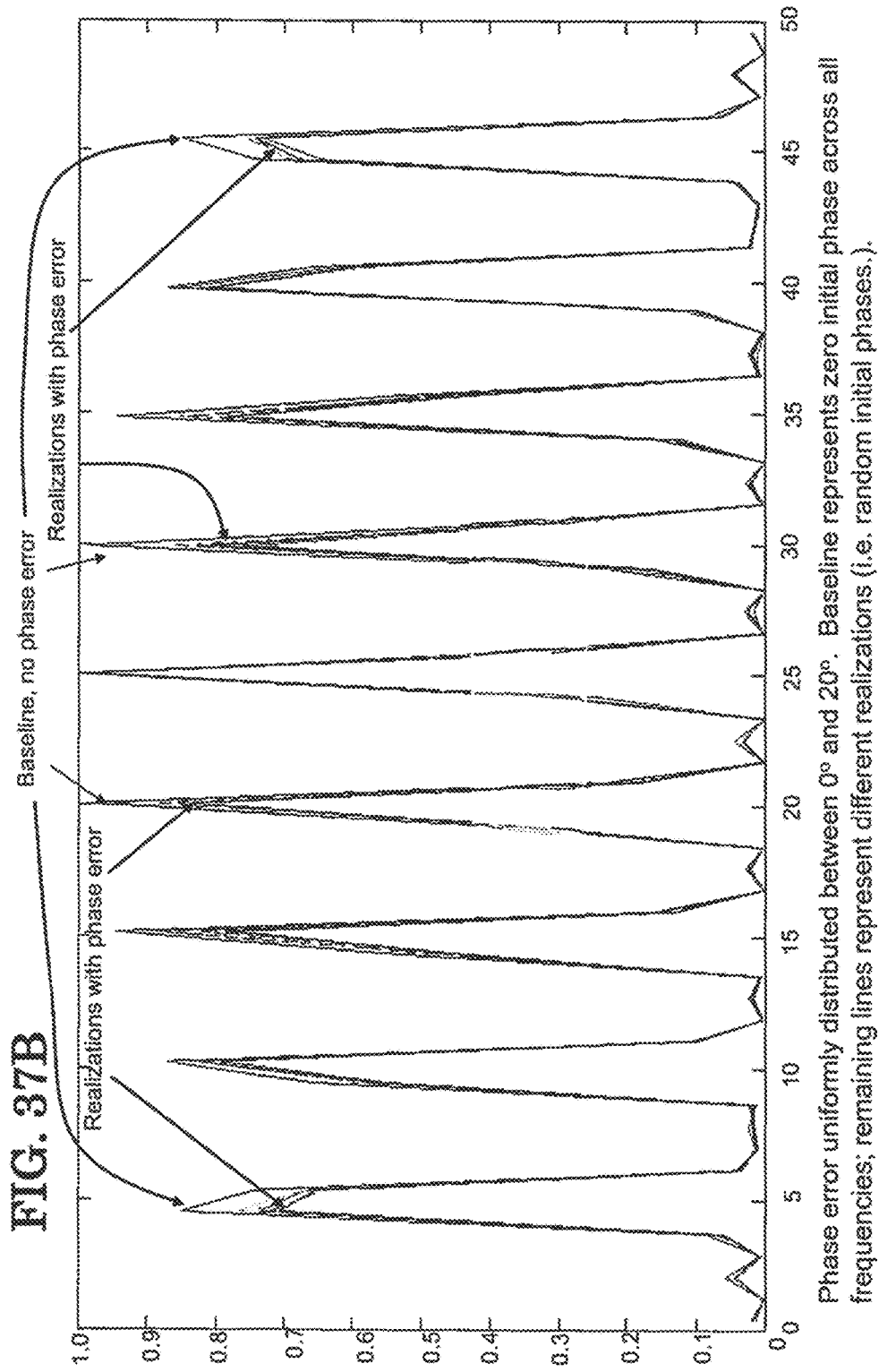

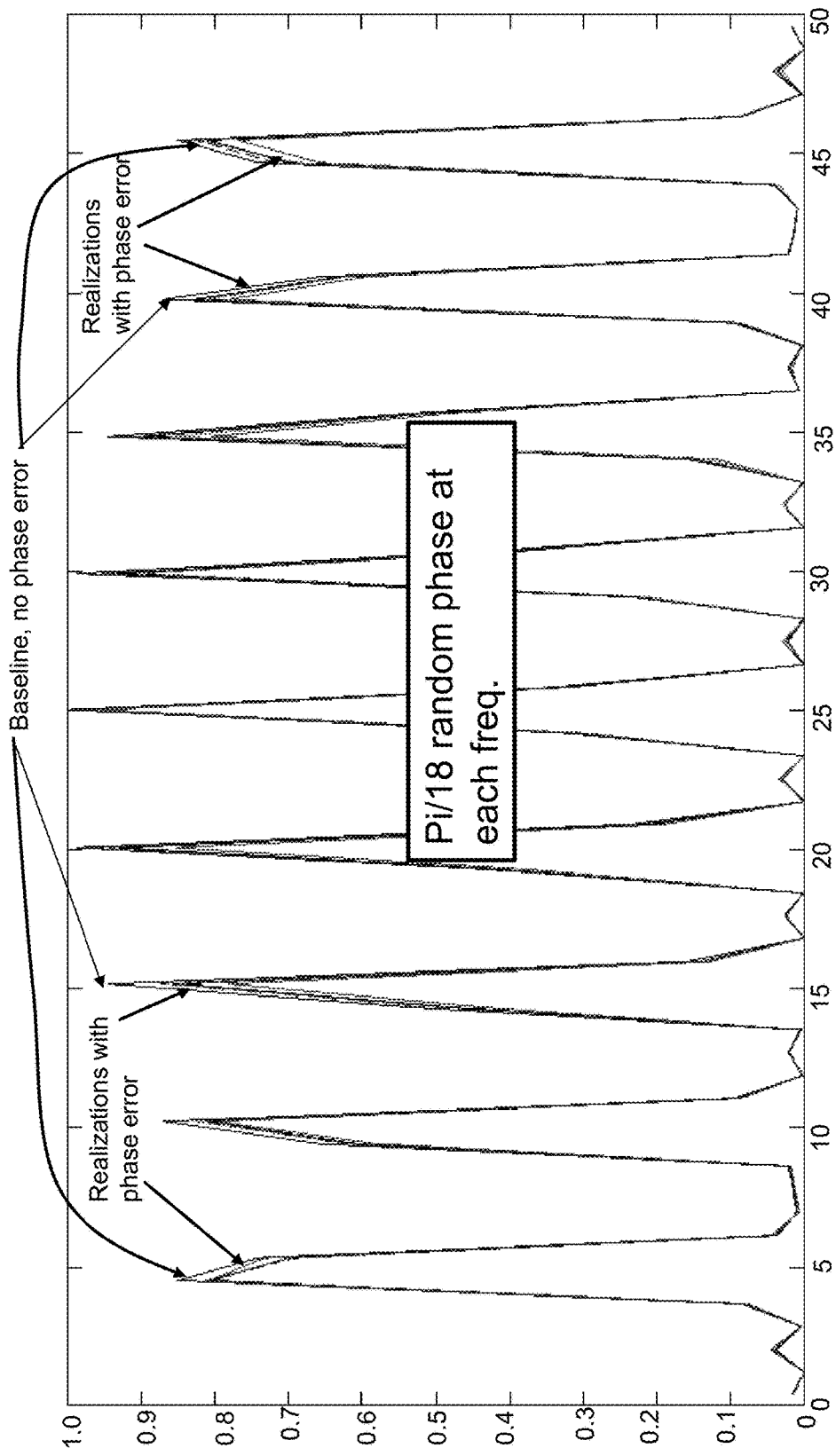
FIG. 37C Phase error uniformly distributed between 0° and 10°. Baseline represents zero initial phase across all frequencies; remaining lines represent different realizations (i.e. random initial phases).

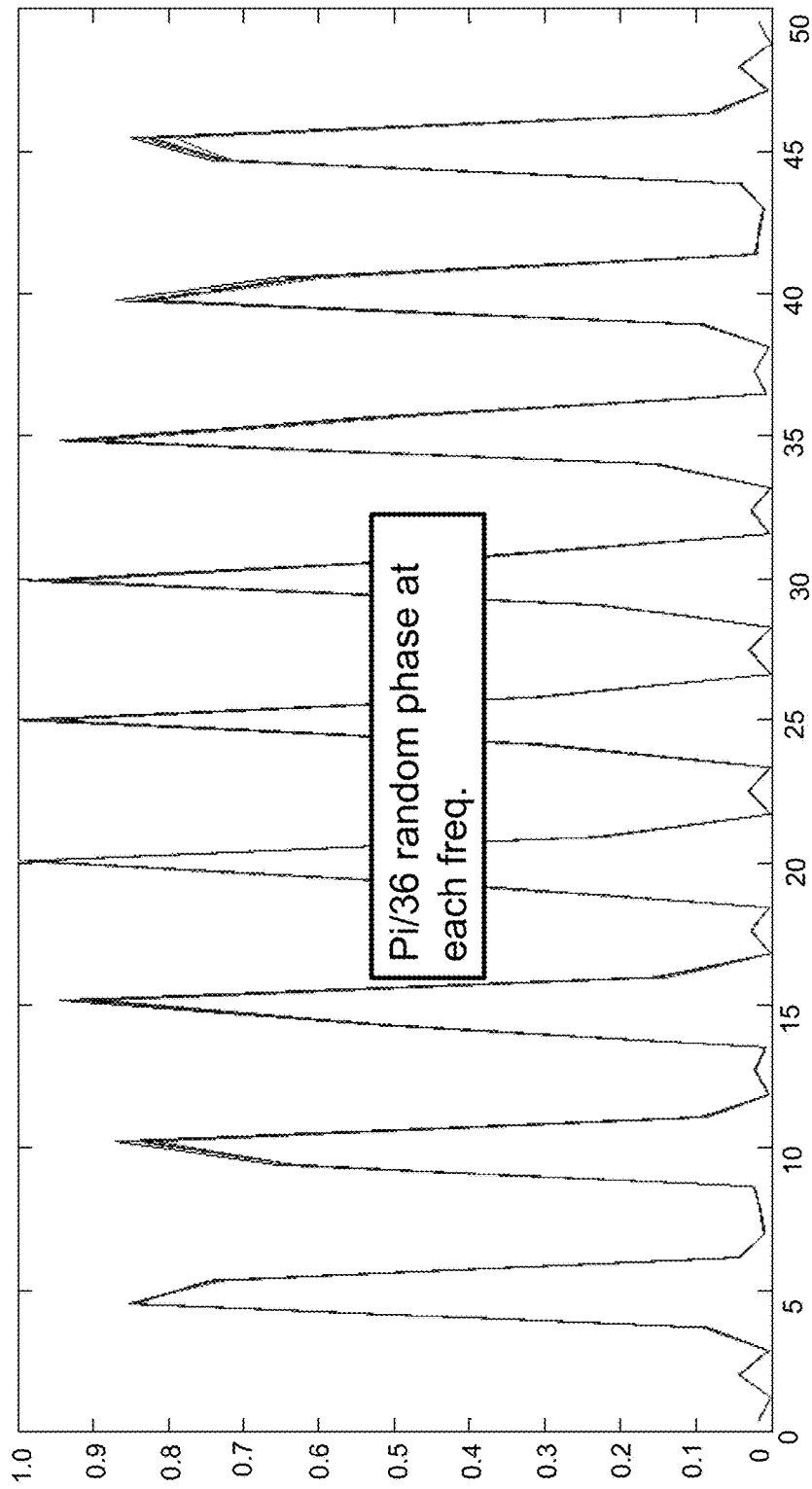
FIG. 37D Effects of the phase error are barely discernible.
Phase error uniformly distributed between 0° and 5°. Baseline represents zero initial phase across all frequencies; remaining lines represent different realizations (i.e. random initial phases).

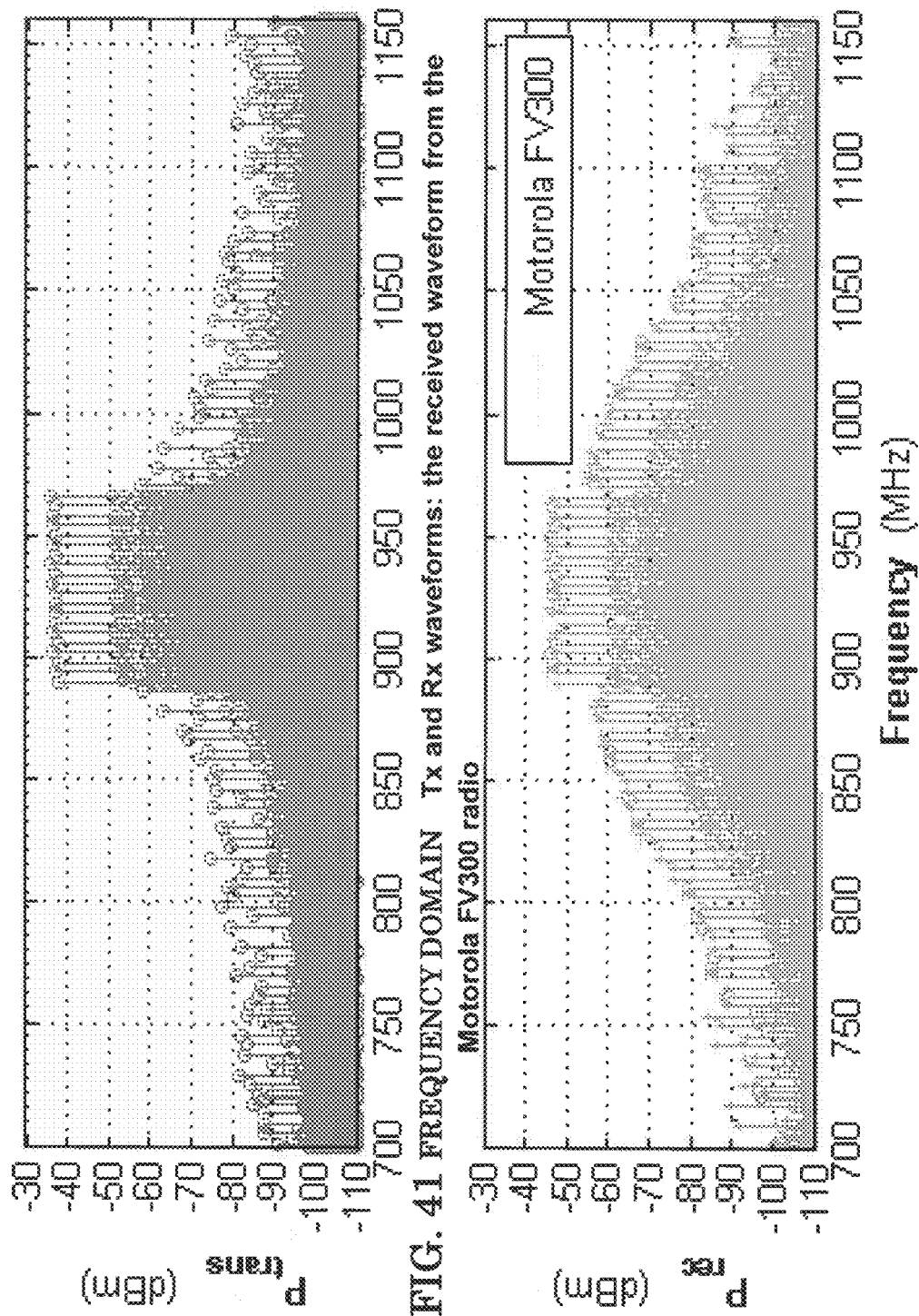
FIG. 41 FREQUENCY DOMAIN Tx and Rx waveforms: the received waveform from the Motorola FV300 radio

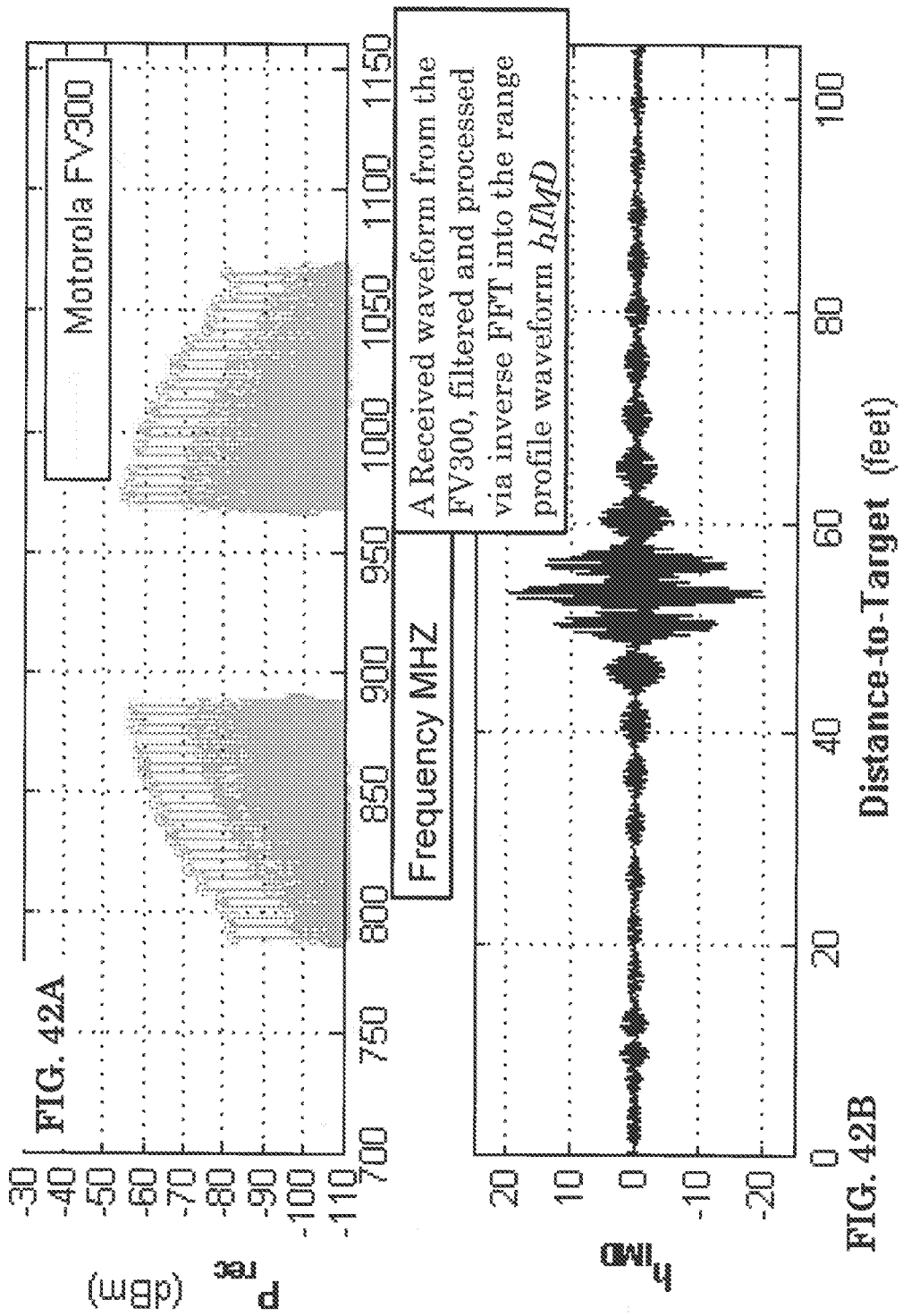

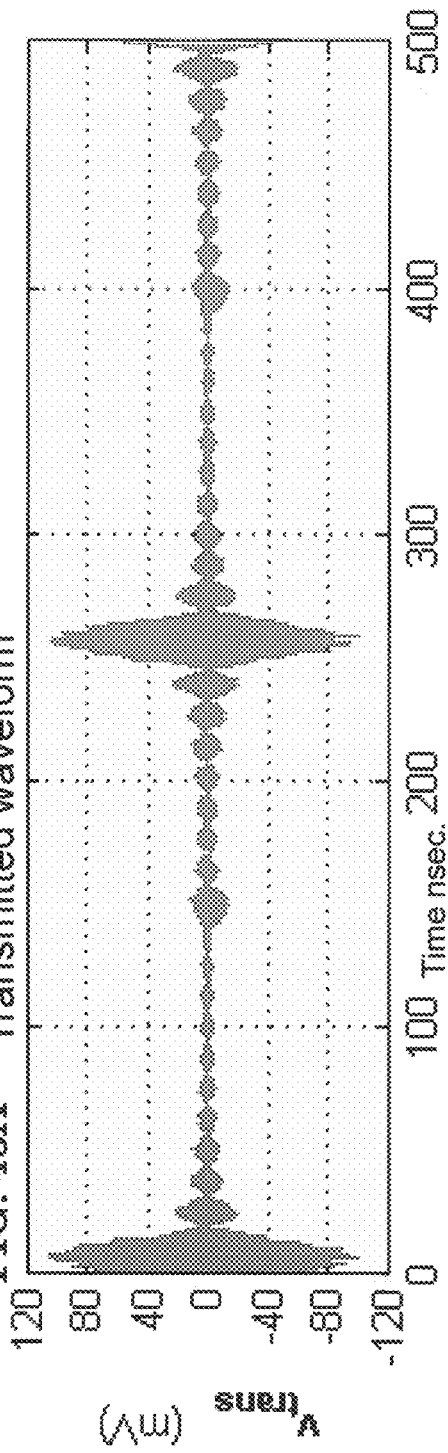
FIG. 43A  Transmitted waveform
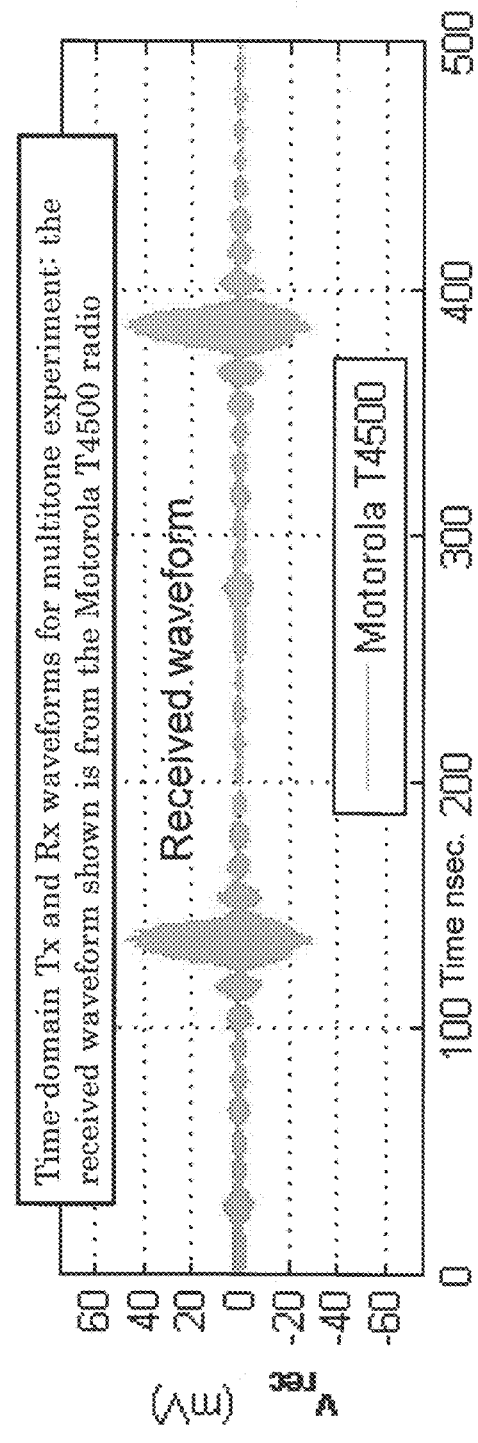
FIG. 43B  Received waveform shown is from the Motorola T4500 radio

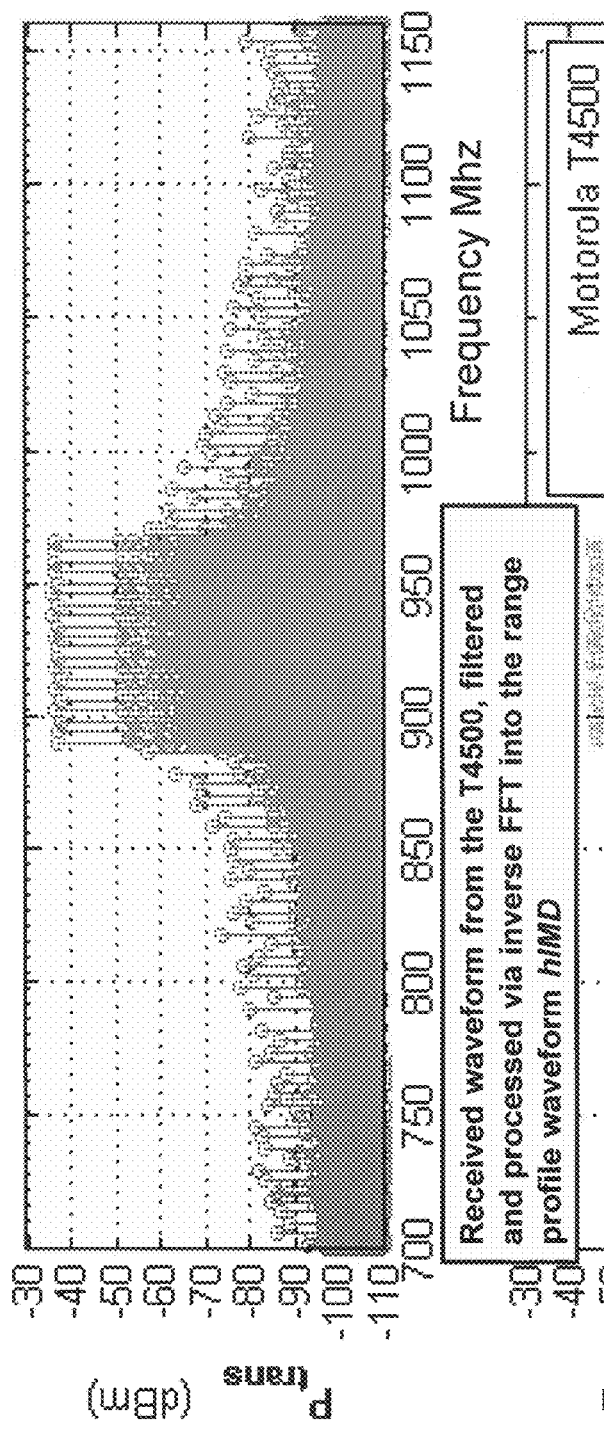
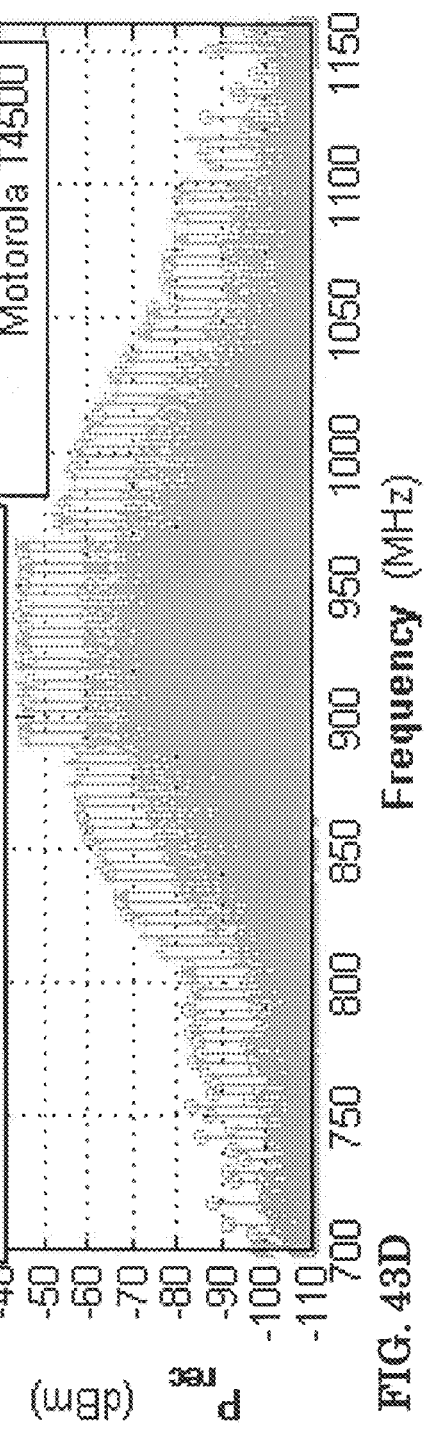
FIG. 43C
FIG. 43D

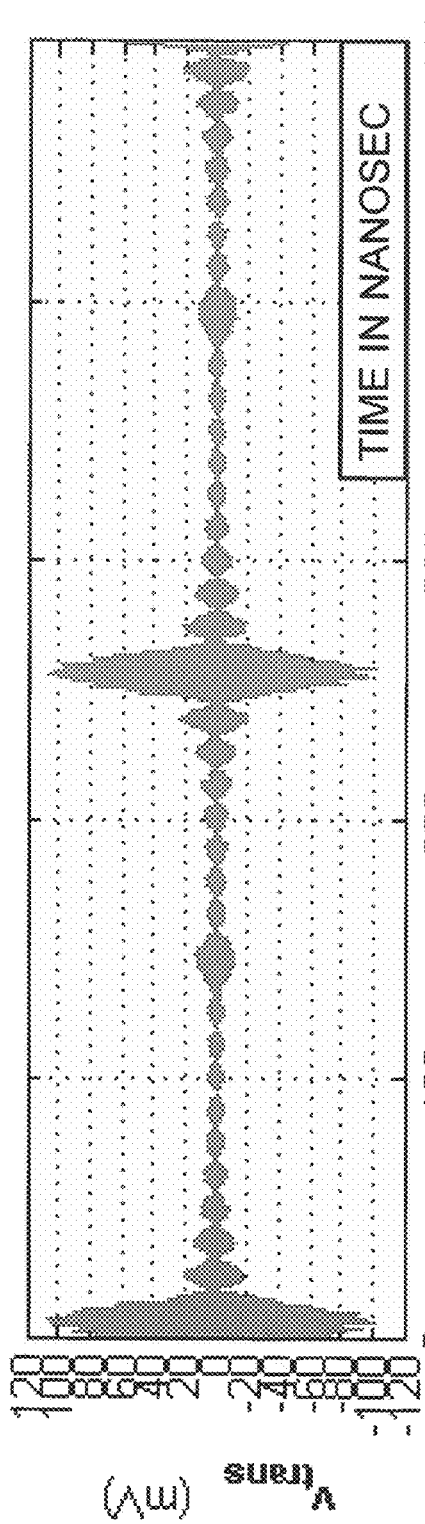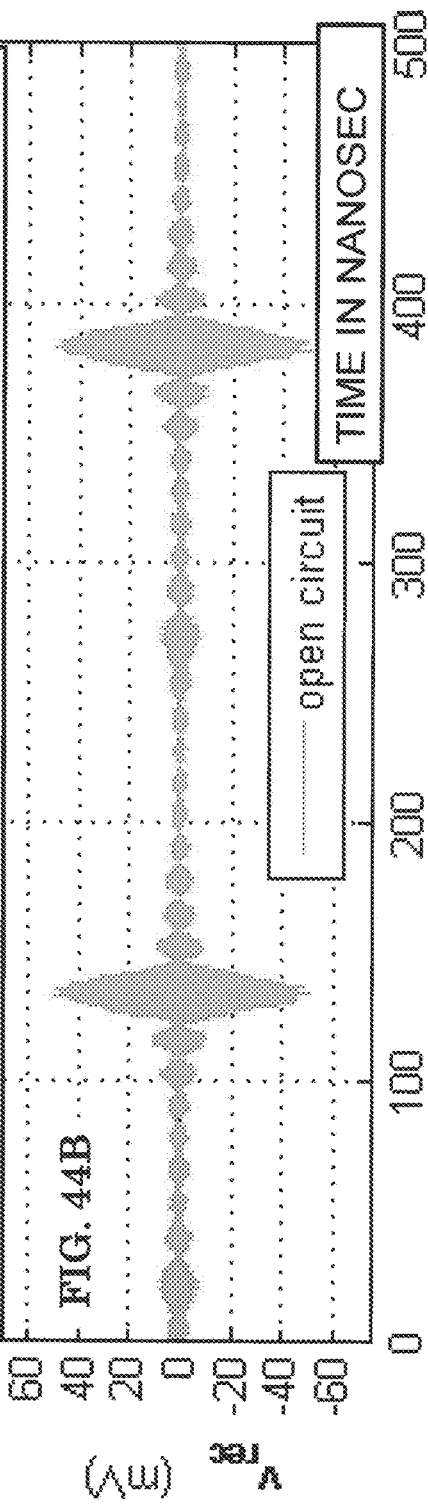
FIG. 44A
FIG. 44B
FIGS. 24 & 24B -Time-domain Tx and Rx waveforms for multitone experiment: the received waveform shown is from an open circuit at the end of the 51-ft cable

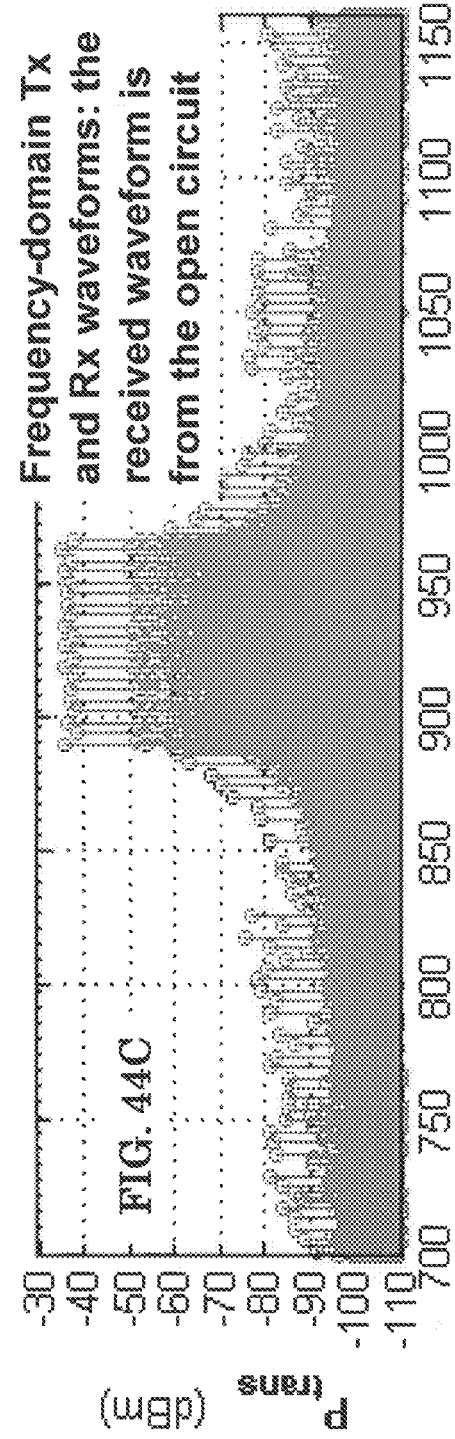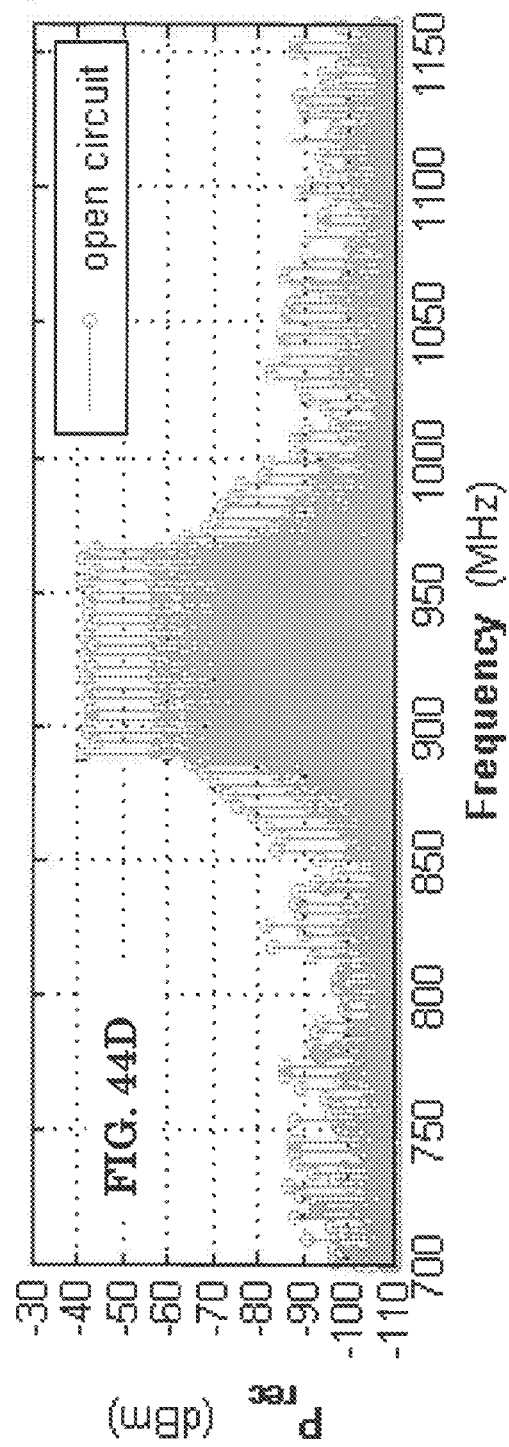
FIG. 44C
FIG. 44D

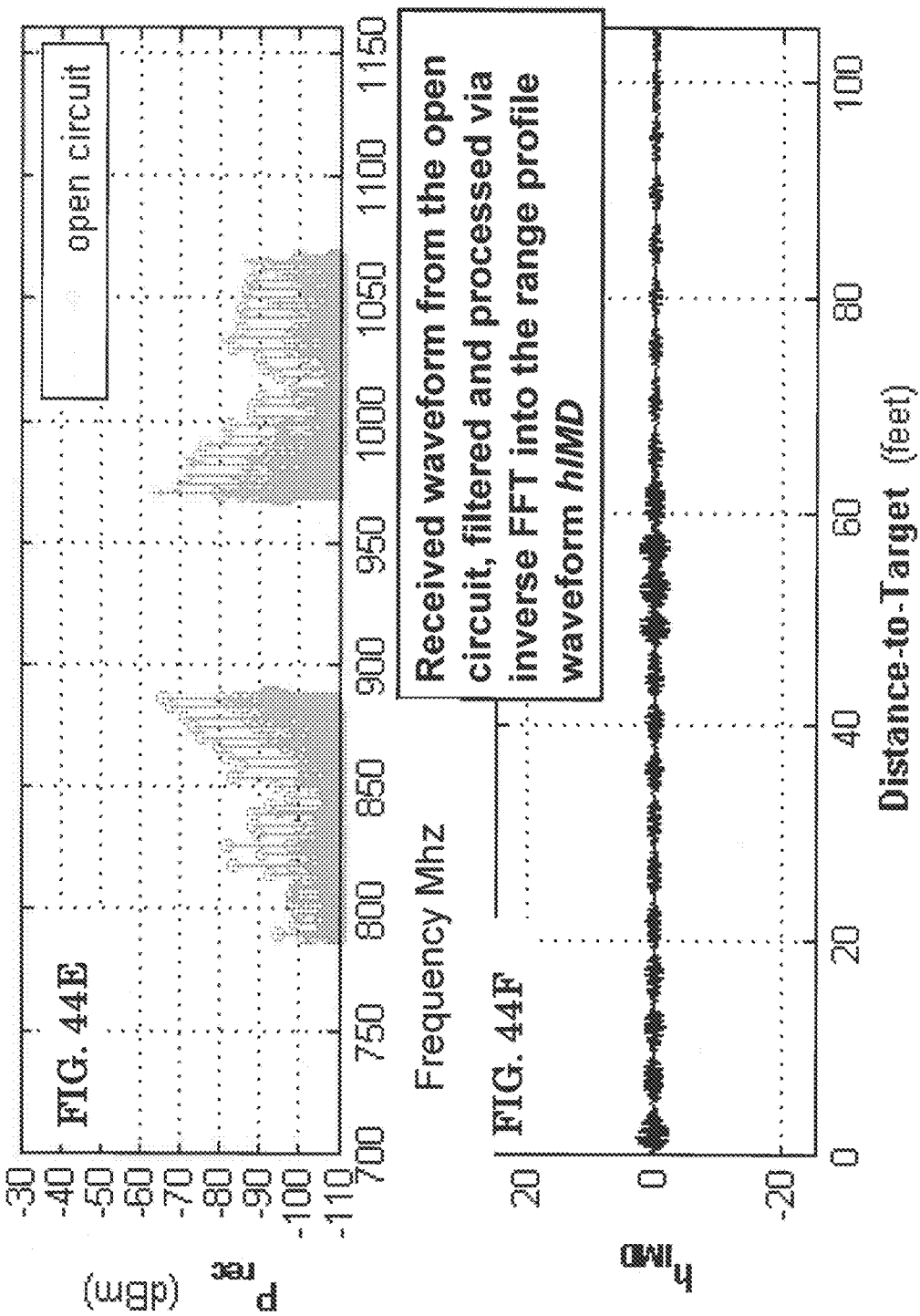

Frequency domain representation of target response. Dashed oval indicates the location of frequency domain samples used to form the HRR profile.

Zoomed view of the plot in Fig. 45 showing the location and separation of intermod product peaks used for downstream InSteF processing

FIG. 47B

Define and generate the time-domain version of a multi-tone waveform using a device such as an arbitrary waveform generator 11. Ensure that the initial phases are identical for all component frequencies.

Transmit the multi-tone waveform
$$s(t) = \sum_{i=1}^{M} \cos(2\pi f_i t + \phi) = \sum_{i=1}^{M} s_i(t)$$
Same initial phase; typically $\phi = 0$ initially Where $s(t)$ is the multi-tone signal, $f_i$ is the $i^{th}$ frequency, $s_i(t)$ is the multi-tone constituent signal at frequency $f_i$, $M$ is the number of frequencies, and $\phi$ is the (identical) initial phase (typically 0).

151 — Measure the non-linear target response (reflected from target to receiver).

152 — Convert the time-domain response to the frequency domain (via an FFT)
$$S(k) = \sum_{j=1}^{N} s(j) g(j) W_n^{(j-1)(k-1)}$$
where $W_n = e^{-2\pi i/n}$, $g(j)$ is the weighting window value, $j$ is the sample (time) index and $S(k)$ is the frequency domain representation of $s(t)$ 153 — APPLY FREQUENCY SELECTION MASK—Extract responses at frequencies corresponding to intermodulation products surrounding the pth harmonic (where p=2,3,...).

Windowed FFT becomes: $\hat{S}(k) = S(k)p(k)$, where $p(k)$ is the window function value 154 — Convert back to the time domain (via an inverse FFT)
$$\hat{s}(k) = \frac{1}{N} \sum_{j=1}^{N} \hat{S}(j) p(j) W_n^{-(j-1)(k-1)}$$

155 — Obtain the non-linear HRR profile. Target response occurs in bin:
$$\hat{k} = \arg\max_{k} \hat{s}(k)$$

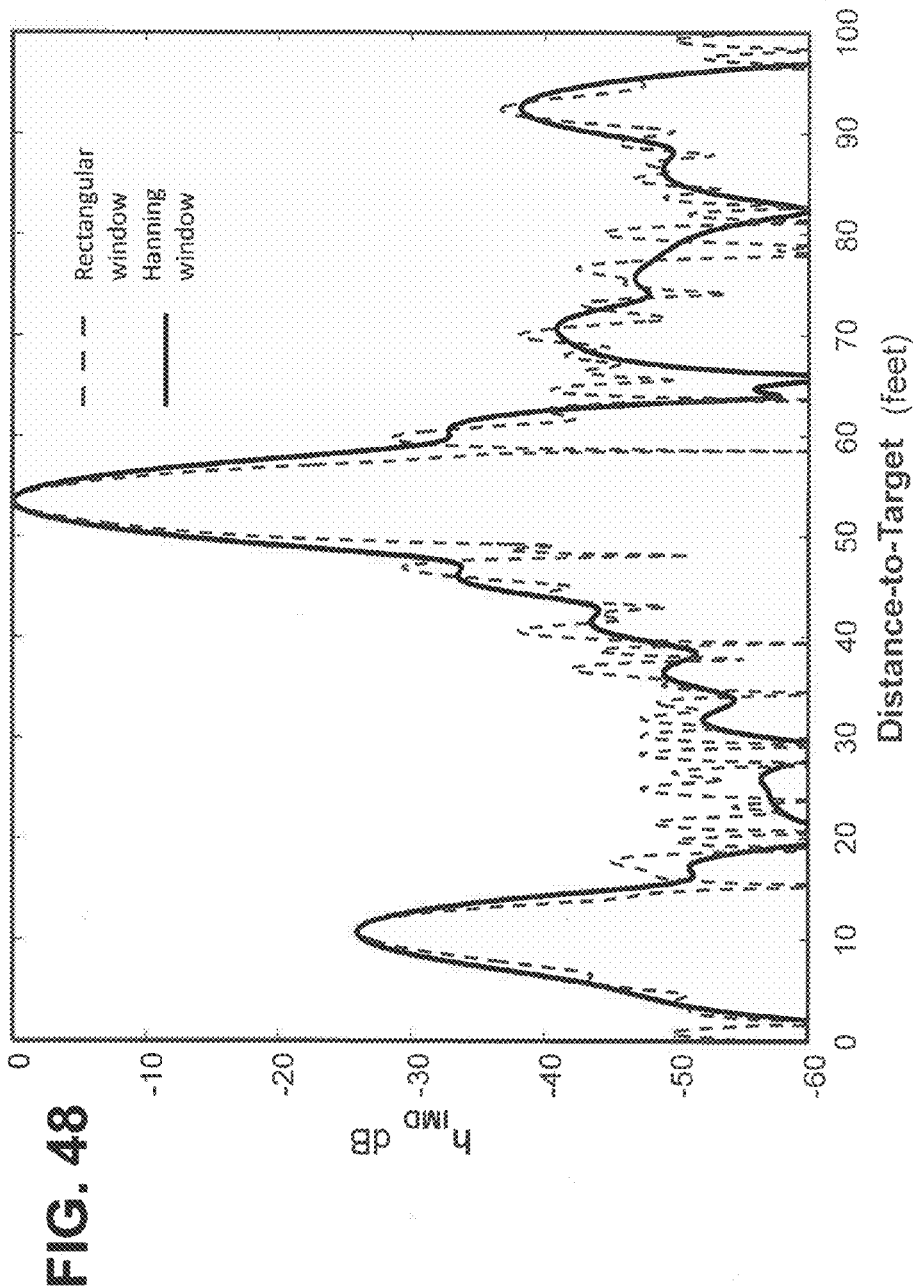
FIG. 48 HRR profiles calculated with and without application a Hanning window.

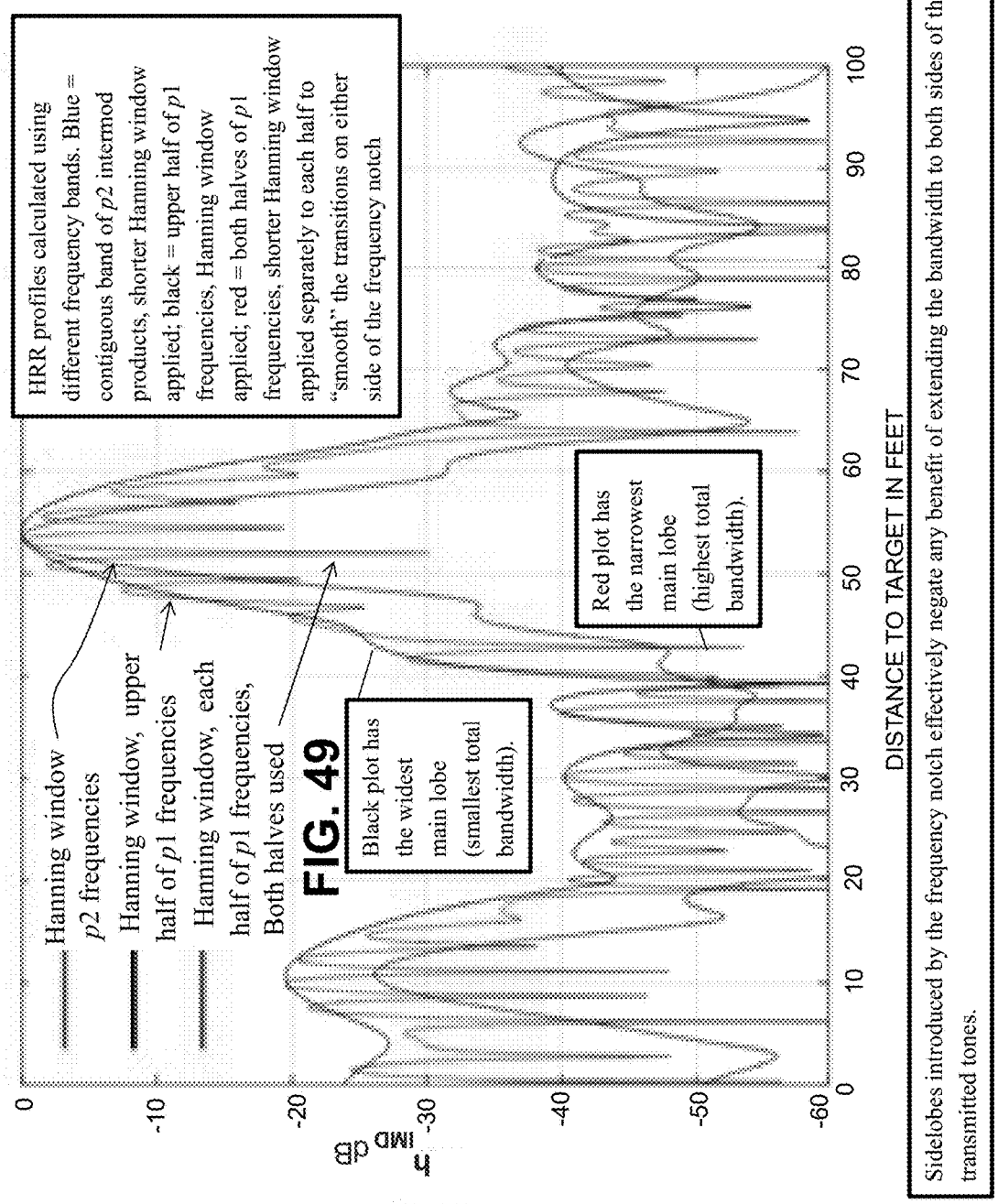

MULTITONE RADAR WITH RANGE DETERMINATION AND METHOD OF USE

CROSS REFERENCE TO RELATED APPLICATION

This application is a continuation-in-part application of and claims priority to U.S. patent application Ser. No. 13/870,519, entitled "Multitone Harmonic Radar and Method of Use," by Dr. Gregory J. Mazzaro, et al., filed Apr. 25, 2013, and U.S. patent application Ser. No. 14/032,387 entitled "Combined Radar Assembly With Linear and Nonlinear Radar," by Dr. Gregory J. Mazzaro, et al., filed Sep. 20, 2013, and published as US Patent Publication 2015/0084811 on Mar. 26, 2015, both of which are herein incorporated by reference in their entirety.

STATEMENT OF GOVERNMENT INTEREST

The invention described herein may be manufactured, used, and licensed by or for the United States Government without the payment of royalties.

REFERENCE TO COMPUTER PROGRAM LISTING APPENDIX

A computer program listing appendix, originally filed with U.S. patent application Ser. No. 14/032,387, has been submitted via EFS-Web labeled as "codeappendix" containing Appendices A through K. The material contained in the Appendices A through K is incorporated by reference herein as though rewritten fully herein.

BACKGROUND

Nonlinear radar exploits the difference in frequency between radar waves that illuminate electromagnetically nonlinear targets and the waves that reflect from those targets. Nonlinear radar differs from traditional linear radar by offering high clutter rejection when detecting a variety of man-made targets. Its disadvantage, compared with traditional linear radar, is that the power-on-target required to generate a comparable signal-to-noise ratio (SNR) is much higher. Nevertheless, nonlinear radar is particularly suited to the detection of devices containing metals and semiconductors that, while highly reflective, still possess a thin linear radar cross section.

Certain nonlinear targets may be tailored for maximum response in an intended frequency band Examples include tags for tracking insects, and tags worn by human beings for avoiding collisions with vehicles or for monitoring vital signs. Such tags contain a radio-frequency (RF) nonlinearity, often a Schottky diode, connected to an antenna that is sized for the intended frequencies of operation.

Other targets are not intended to respond to a nonlinear radar but do still respond because they contain nonlinearities inherent to their design, such as metal contacts, semiconductors, transmission lines, antennas, filters, connectors, and ferroelectrics RF electronic devices such as handheld radios and cellular telephones contain many nonlinear components and are therefore visible to a nonlinear radar, although the full range of frequencies at which a particular target responds is not known until that target is illuminated by RF energy in a controlled test A nonlinear radar tailored to a set of RF electronic responses would help law enforcement agents to locate devices whose emissions exceed those permitted by law, allow security personnel to detect unauthorized radio electronics in restricted areas, or enable first-responders to pinpoint personal electronics during emergencies such as immediately after an avalanche or earthquake.

In the theater-of-operations, warfighters encounter threats that contain RF electronics. Similarly, in the civilian world, there are instances when cellphones, smartphones, tablets and other "targets" are objectionable and/or dangerous Such RF electronic devices are generally small (man-portable) and may be buried or located close to the ground, making it difficult to distinguish from background clutter using traditional linear radar.

Whereas linear radar exploits the reflection from a target whose frequencies are the same as those transmitted, nonlinear radar exploits the electronic response from a target whose reflected frequencies are different from those transmitted Reception of frequencies that are not part of the transmitted probe distinguishes the received signal from a linear return that can be produced by clutter and indicates the presence of an electronic circuit. For the warfighter, the presence of an electronic circuit (in a location that typically does not contain an electronic circuit) implies the presence of a threat. Ultra-wideband (UWB) ground-penetrating radar (GPR) is a linear radar technology for detecting concealed targets such as landmines and other explosive devices. UWB GPR attempts to detect a threat set similar to that of the present invention. Since electronics and clutter both produce linear radar reflections, UWB GPR systems require a greater degree of signal processing to separate targets from clutter. By confining the detectable target response to nonlinear interactions, nonlinear radar is able to more easily separate targets from clutter.

Nonlinear radar is capable of detecting almost any unshielded electronics, whether the electronics are on or off. Nonlinear radar exploits the electronic response from a target whose reflected frequencies are different from those transmitted. Reception of frequencies that are not part of the transmitted probe distinguishes the received signal from a linear return produced by clutter and indicates the presence of electronics. Several devices and methods exist for identifying electronics and other manmade objects using the nonlinear responses of metal and semiconductor junctions. Some detectors tune to the harmonics of a single-frequency radar transmission, such as in U.S. Pat. No. 3,732,567 to Low. Other detectors tune to the intermodulation produced by the interaction of multiple frequencies at the target, such as discussed in "A practical superheterodyne-receiver detector using stimulated emissions," by C. Stagner, et al., in IEEE Trans. Instrum. Meas., vol. 60, no. 4, pp. 1461-1468 (April 2011) (herein incorporated by reference). In the Stagner, et al. paper, the unintended emissions of super heterodyne receivers are analyzed for the detection of radio-controlled explosives. Arbitrary signals are injected into a radio's unintended emissions using a relatively weak stimulation signal, referred to as stimulated emissions. Intermodulation products are generally the result of odd-order nonlinear interactions.

Several organizations have considered the application of radar to the problem of detecting electronic devices in secured areas. One approach envisions the use of portals to detect the unwanted devices before individuals can carry them into the restricted area See, http://tibbetts.challengepost.com/submissions/5983-vadum-transceiver-detection-for-physical-security. Other approaches consider the use of radar to detect the objects at greater distances, thereby eliminating the need for a portal. In both cases, however, the detection systems exploit a target device's non-linear, harmonic responses to a specific transmitted waveform. Since natural objects fail to produce this non-linear response, these new systems offer the opportunity to dramatically reduce the number of false alarms generated at a desired detection probability. They accomplish this through analysis of the complex magnitude of harmonics and inter-modulation (intermod) products produced by the target. In what follows attention is restricted to non-linear radar systems that are capable of detecting targets at a distance.

Researchers have recently developed radar systems capable of exploiting non-linear target responses to precisely locate targets in range. These systems typically achieve the bandwidth necessary for range resolution through transmission of either a stepped-frequency or chirped waveform. The second harmonic of the reflected waveform is then analyzed to isolate the non-linear target response. In other experiments, researchers have identified certain targets through the inter-modulation products they produce in response to a multi-tone stimulus. These experiments, however, do not exploit the phase information available in the inter-modulation products.

SUMMARY OF THE INVENTION

The present invention is directed to, inter alia, a method for exploiting both the magnitude and phase information available in the inter-modulation (intermod) products to create an "instantaneous" stepped frequency, non-linear target response. The new approach enables the operator to both maintain the unambiguous range dictated by the fundamental, multi-tone separation and obtain the entire target signature from a single transmitted waveform.

The present invention utilizes phase information from harmonics and intermod products, making it possible to measure the range to the target. In particular, the present invention records phase information for intermod products from many regularly spaced frequencies (i.e. a multi-tone system), to then create an "instantaneous" stepped-frequency waveform in the receive band (i.e. the harmonic band) of the radar. By considering the intermod products of order p, it is possible to simultaneously measure all of the frequency samples required by a stepped frequency radar system (at the expense of introducing a larger system bandwidth). Such intermod products occur around integer multiples of the transmitted frequencies-integer multiples determined by the order of the non-linearity, p. An embodiment of the present invention utilizes a formulated transmit waveform comprising the sum of N sine waves at regularly spaced frequencies and with appropriate initial phases.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 2 is an illustration showing a plot of the data captures for two DUTs at $f_0$=756 MHz, corresponding to the first row of Table 1.

FIG. 3 is a is a schematic illustration of another preferred embodiment block diagram comprising, inter alia, a plurality of sine wave generators 11A-11C.

FIG. 5A illustrates a sample harmonic-radar return for M=2 (number of tones) and N=7, (number of harmonics) simulated in Matlab. T1 and T2 denote the two frequencies transmitted by the radar. R1 through R7 denote seven received frequencies that may be used to detect and classify the target.

FIG. 5B is an illustration of an example of a single-tone nonlinear radar waveform showing the transmission of one tone and reception of harmonics of that tone.

FIG. 5C is an illustration of an example of a two-tone nonlinear radar waveform showing the transmission of two-tones and reception of harmonics well as mixing products near those harmonics.

FIGS. 5D and 5E are linear radar waveforms for impulse and stepped frequency, respectively.

FIG. 5D illustrates a single-cycle impulse and its spectrum.

FIG. 5E illustrates an alternative design that allows for more flexibility in the transmitted band is the stepped-frequency waveform. Both impulse (FIG. 5D) and stepped-frequency waveforms (FIG. 5E) are broadband. For the impulse, the peak power is high but the average power is low. For the continuous stepped-frequency signal, the peak power and the average power are the same. Either waveform will provide linear detection and ranging.

FIG. 6 is a graphical illustration depicting a harmonic radar return where the number of transmitted tones is four (M=4).

FIG. 7 is a graphical illustration depicting a harmonic radar return where the number of transmitted tones is eight (M=8).

FIG. 11 is a diagrammatic illustration of a target illuminated by a radar wave showing diagrammatically the incident and reflected radar waves for propagation normal to target.

FIG. 13A is an illustration of an example of a single-tone nonlinear radar waveform showing the transmission of one tone and reception of harmonics of that tone.

FIG. 13B is an illustration of an example of a two-tone nonlinear radar waveform showing the transmission of two-tones and reception of harmonics well as mixing products near those harmonics FIG. 14 is a schematic illustration of a preferred embodiment combined linear and nonlinear radar architecture.

FIG. 17 is an illustration of a Single-tone RF pulse output by an arbitrary waveform generator wherein $f_{pulse}$=900 MHz, $P_{env}$=0 dBm, $T_{env}$=1 µs, $D_c$=10%.

FIG. 18 is an illustration of a Multitone RF pulse output by an arbitrary waveform generator wherein N=2 tones, fc=890 MHz, Ptone=−6 dBm per tone, Tenv=2 µ s, Dc=20%.

FIG. 19 is an illustration of a Linear FM chirp pulse output by an arbitrary waveform generator wherein $f_{start}$=860 MHz, $f_{end}$=900 MHz, $P_{env}$=−3 dBm, $T_{env}$=4 µs, $D_c$=50%.

FIG. 20 is an illustration of a Stepped-frequency pulse output by an arbitrary waveform generator wherein $f_{start}$=870 MHz, $f_{end}$=890 MHz, Δf=1 MHz, $P_{env}$=0 dBm, $T_{env}$=2.5 µs, $D_c$=25%.

FIG. 24 is an illustration of a graphical user interface to the alternate preferred embodiment radar system.

FIG. 25A illustrates a plot of radar data, chirp Tx waveform, linear Rx mode, open-circuit target: fstart=880 MHz, fend=920 MHz, Penv=0 dBm, $T_{env}$=1 µs (time interval during which the frequency steps from $f_{start}$ to $f_{end}$), Dc=10% (the duty cycle of the waveform).

FIG. 25B illustrates a plot of the correlation of Tx and Rx waveform data shown in FIG. 25A.

FIG. 16A illustrates a plot of radar data, RF pulse Tx waveform, linear Rx mode, FRS radio target: fpulse=900 MHz, Penv=0 dBm, Tenv=1 is (time interval during which the frequency steps from $f_{start}$ to $f_{end}$), Dc=10% (the duty cycle of the waveform).

FIG. 28 illustrates a plot of Tx and Rx frequency content, stepped-frequency Tx waveform, nonlinear Rx mode, FRS radio target: fstart=890 MHz, fend=910 MHz, Δf=1 MHz, Penv=0 dBm, Tenv=2 µs, Dc=20%.

FIG. 29 (left) plots the raw Tx and Rx data. FIG. 29 (right) plots the cross correlation of the Tx and Rx signal. FIG. 29 illustrates a plot of radar data, linear chirp Tx waveform, nonlinear Rx mode, FRS radio target: fstart=880 MHz, fend=920 MHz, Penv=0 dBm, Tenv=1 µs, Dc=10%.

FIG. 30 illustrates results using a chirp Tx waveform using nonlinear Rx chain against a purely linear target in order to demonstrate that the transceiver does not indicate detection if the target is linear and the radar is listening for a nonlinear response. FIG. 30 illustrates a plot of radar data, chirp Tx waveform, nonlinear Rx mode: fstart=890 MHz, fend=910 MHz, Penv=0 dBm, Tenv=1 µs (time interval during which the frequency steps from $f_{start}$ to $f_{end}$), Dc=10% (the duty cycle of the waveform). The left side of FIG. 30 illustrates results from a FRS radio target and the right side is the result from an open circuit (a linear but highly reflective target).

FIG. 31 is a block diagram of a preferred embodiment InSteF system. The frequency steps in the multi-tone waveform could be generated at lower frequencies and then mixed to the desired operational band.

FIG. 32B illustrates multiple frequency (multitone) waves with the spacing varying with time.

FIG. 32D illustrates the HRR target response for the multitone waveform of FIG. 32A. More specifically, FIG. 32A discloses a multi-tone waveform for frequency components of 900 MHz-960 MHz in 3 MHz steps, as described in Equation (C-3). FIG. 32D illustrates an HRR profile for a single target at 25 m, calculated using the third order intermod products (p=3 in Equation (C-1)).

FIG. 34A is a depiction of the transmitted waveform utilized in conjunction with FIG. 33A in the time domain.

FIG. 34B is a depiction of the frequency domain representation of the transmitted waveform of FIG. 34A. The 20 component frequencies of the multi-tone waveform are clearly recognizable as "spikes" in the frequency domain plot of FIG. 34B.

FIG. 34C is an illustration showing a frequency domain representation of a preferred embodiment received signal showing the $2^{nd}$- and $3^{rd}$-order intermod products available for exploitation by an InSteF preferred embodiment system. The prototype system of FIG. 33A processes $2^{nd}$-order intermod products (i.e. p=2 in (Equation C-1)) indicated by the dashed ellipse in the plot of FIG. 34C to produce a high resolution range (HRR) profile (target signature).

FIGS. 36A to 36D show the results of adding white Gaussian noise (AWGN) to a multi-tone signal, progressing from the pristine for the hypothesized non-linear system with p=3 in (Equation C-1), no-noise case (FIG. 36A) to the case of approximately 2 dB, peak-signal-to-noise ratio. The plot on the left shows the time domain return.

FIG. 36A illustrates no noise in receive chain.

FIG. 36B illustrates peak-signal to average-noise ratio of 14 dB.

FIG. 36C illustrates peak-signal to average-noise ratio of 8 dB.

FIG. 36D illustrates peak-signal to average-noise ratio of 2 dB.

FIGS. 37 A-D introduce the concept of random initial phase on frequency components of multi-tone signal. Initial phase selected from uniform distribution over the indicated phase interval. The solid blue plots represent no noise, and the remaining plots represent different realizations with random phase variations incorporated. The plot on the right shows the calculated HRR profile.

FIG. 37A illustrates the phase of each multi-tone frequency uniformly distributed between 0° and 45°. Baseline represents zero initial phase across all frequencies; remaining lines represent different realizations (i.e. random initial phases).

FIG. 37B illustrates phase error uniformly distributed between 0° and 20° Baseline represents zero initial phase across all frequencies; remaining lines represent different realizations (i.e. random initial phases.).

FIG. 37C illustrates phase error uniformly distributed between 0° and 10°. Baseline represents zero initial phase across all frequencies; remaining lines represent different realizations (i.e. random initial phases).

FIG. 37D illustrates phase error uniformly distributed between 0° and 5°. Baseline represents zero initial phase across all frequencies; remaining lines represent different realizations (i.e. random initial phases.

FIG. 41 illustrates the frequency-domain Tx and Rx waveforms from the Motorola FV300 radio.

FIG. 42A illustrates a received waveform from the FV300, filtered and processed via inverse FFT into the range profile waveform hIMD.

FIG. 42B illustrates the range profile waveform hIMD of FIG. 42A.

FIG. 43A illustrates the time-domain Tx waveforms for multitone experiment for the Motorola T4500 radio FIG. 43B illustrates the time-domain receive waveform for multitone experiment: the received waveform shown is from the Motorola T4500 radio.

FIG. 43C illustrates the frequency domain transmitted (Tx) waveform for multitone experiment for the Motorola T4500 radio FIG. 43D illustrates the frequency domain receive waveform for multitone experiment: the received waveform shown is from the Motorola T4500 radio.

FIG. 44A illustrates the time-domain Tx waveforms for multitone experiment for the Motorola T4500 radio FIG. 44B illustrates the time-domain receive waveform for multitone experiment: the received waveform shown is from the open circuit configuration.

FIG. 44C illustrates the frequency domain transmitted (Tx) waveform for multitone experiment for the open circuit configuration.

FIG. 44D illustrates the frequency domain receive waveform for multitone experiment: the received waveform shown is for the open circuit configuration.

FIG. 44E illustrates the filtered received waveform from the open circuit configuration of FIG. 44D.

FIG. 44F illustrates the range profile waveform processed via inverse FFT into the range profile waveform hIMD for the open circuit configuration.

FIG. 47B is a block diagram illustration showing the steps of a preferred embodiment method.

FIG. 48 is an illustration showing HRR profiles calculated with and without application of a weighting window. Cyan=no window applied; black=Hanning window applied.

FIG. 49 is a graphical illustration showing HRR profiles calculated using different frequency bands. Blue=contiguous band of p2 intermod products, shorter Hanning window applied; black=upper half of p1 frequencies, Hanning window applied; red=both halves of p1 frequencies, shorter Hanning window applied separately to each half to "smooth" the transitions on either side of the frequency notch. Note that the black plot has the widest main lobe (smallest total bandwidth), while the red plot has the narrowest main lobe (highest total bandwidth). Sidelobes introduced by the frequency notch effectively negate any benefit of extending the bandwidth to both sides of the transmitted tones.

Figure 1A:
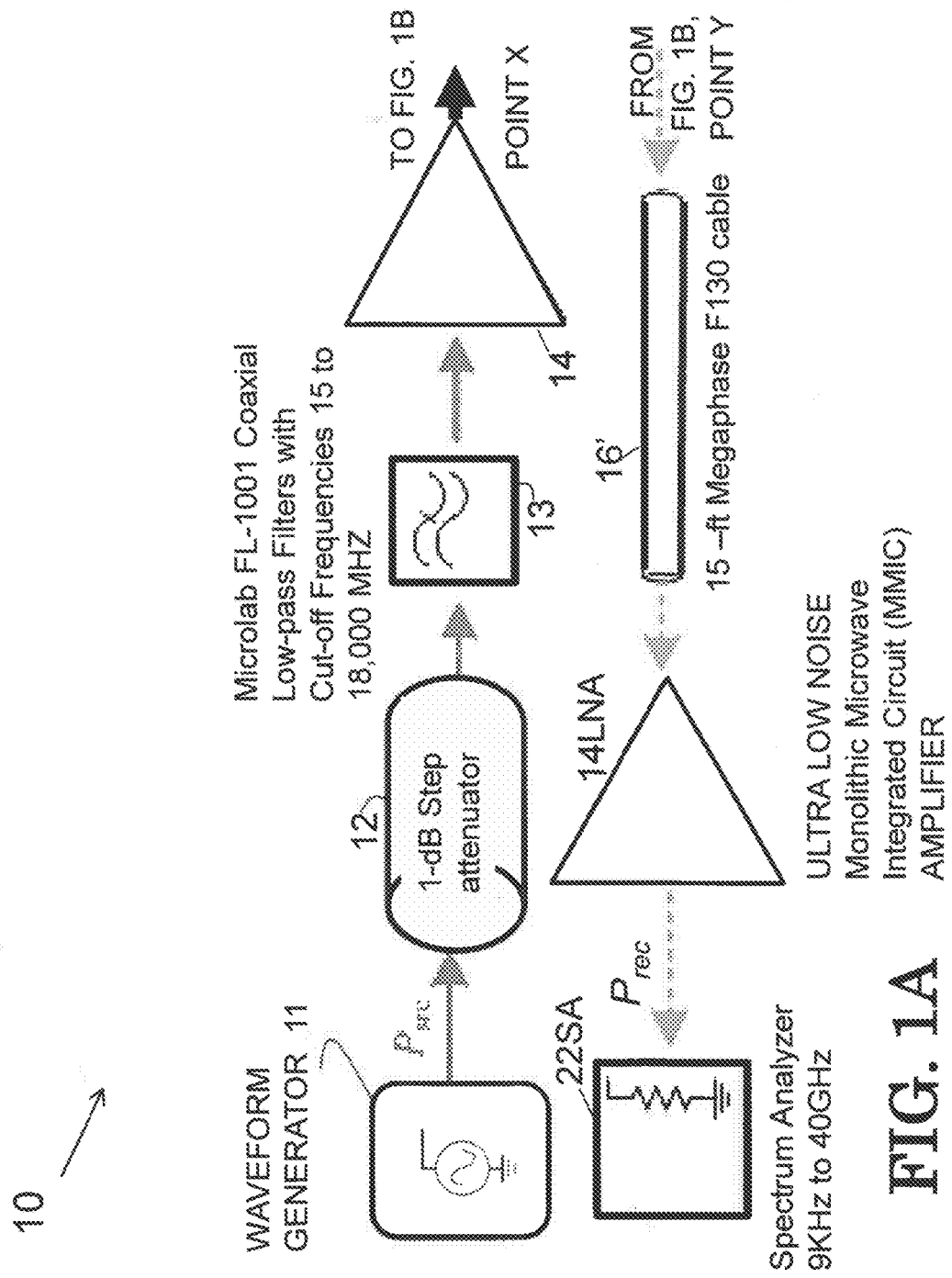
FIG. 1A is a schematic illustration of a preferred embodiment block diagram.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Several devices and methods exist for identifying electronics and other manmade objects using the nonlinear responses of metal and semiconductor junctions. The present invention has a number of advantages over these techniques: it enables a narrower-bandwidth antenna design while providing target information comparable to wider-bandwidth designs, it enables increased sensitivity and signal-to-interference ratio using three stages of filtering, and it allows a single-transmit-antenna design for generating and receiving mixing products ordinarily stimulated using multiple transmit antennas.

A preferred embodiment of the present invention may comprise transmission of at least two tones $f_1$ and $f_2$ and reception of not only a harmonic of the transmitted tones (e.g., $2f_1$ and $2f_2$) but also the mixing products of those tones near that harmonic (e.g., $3f_1-f_2$, $f_1+f_2$, $3f_2-f_1$). Such a technique enables target discrimination using a narrow receiver bandwidth centered on a single harmonic.

The present invention comprises mixing products at frequencies near a harmonic of the transmitted tones using data from commercially-available RF devices. Experiments focus on the second harmonic of the transmitted tones because that harmonic is the strongest of those observed for the RF devices of interest to this study. An original method for discriminating between devices, using at least two transmitted tones, is proposed. Design considerations for building a practical multitone harmonic radar are noted at the end of each section. Lastly, detection range is estimated for a novel pulsed two-tone harmonic radar that transmits at ultrahigh frequencies (UHF) and receives at L-band.

While earlier magnitude-based non-linear target detectors leverage harmonic responses—including intermod products—to reduce the number of false alarms, they fail to leverage the phase information also available in those harmonics and intermod products. If this additional information could be captured, then it should be possible to measure the range to the target. In particular, if the phase information could be recorded for intermod products from many regularly spaced frequencies (i.e. a multi-tone system), then it would be possible to create an "instantaneous" stepped-frequency waveform in the receive band (i.e. the harmonic band) of the radar. That is, by considering all of the intermod products of order p, it would be possible to simultaneously measure all of the frequency samples required by a stepped frequency radar system (at the expense of introducing a larger system bandwidth). These intermod products would occur around integer multiples of the transmitted frequencies-integer multiples determined by the order of the non-linearity, p. All that would be required is a carefully formulated transmit waveform comprising the sum of N sine waves at regularly spaced frequencies and with appropriate initial phases.

An embodiment of the present invention provides a multi-tone system that increases data acquisition speed in two ways. First, the multi-tone transmitted waveform includes N frequencies, increasing speed by a factor of N over a conventional stepped-frequency system. It is noted that generally the conventional system must transmit N frequencies sequentially, not simultaneously. Second, for a transmit frequency step size of $\Delta$ and a non-linearity of order p, the received non-linear frequency step size in a conventional stepped frequency system is $p\Delta$. See in this regard, G. Mazzaro, K. Gallagher, A. Martone, R. Narayanan, "Stepped-frequency nonlinear radar simulation," Proceedings of SPIE, vol. 9077, id. 90770U 10 pp. (2014), herein incorporated by reference in its entirety as though fully reprinted herein. The intermod products from the non-linear multi-tone system, however, retain the frequency spacing of $\Delta$. Thus, to maintain the same received frequency step size in both the instantaneous stepped frequency (i.e., intermod) non-linear system and conventional (i.e., sequential) stepped frequency non-linear system, the conventional system's frequency step size must be reduced by a factor of p. This could result in a corresponding reduction in data acquisition speed. When all factors are considered, the "instantaneous" stepped-frequency waveform could increase data acquisition speed by a factor of approximately $p(N-1)+1$.

In the following section describing the "Instantaneous Stepped Frequency System," the terminology an initial "instantaneous" stepped frequency (InSteF) system is defined and simulated data from the hypothesized system is examined. The various restrictions are noted on the transmit waveform that are stipulated by a preferred embodiment system implementation, and consideration is given to what happens when these restrictions are violated. System performance is considered under pristine (noiseless) conditions, and, signal distortions is introduced to observe system degradation.

Introduction

Receiving multiple harmonics requires the design of a broadband antenna or an antenna that is tunable to multiple harmonics. A preferred embodiment of the present invention tunes to a particular harmonic of the original frequencies, so that the receive antenna need only be designed to accommodate a bandwidth large enough to encompass the mixing products near that harmonic.

A preferred embodiment disclosed in ARL 12-43, application Ser. No. 13/870,519, entitled Multitone Harmonic Radar and Method of Use, herein incorporated by reference, uses a low pass filter before the transmit antenna, but it substitutes a high-pass filter and a bank of band-pass filters for the harmonic filter. The signal-to-interference ratio of the system is improved by increasing the out-of-band rejection for the high-pass filter and for the band pass filters. The sensitivity of the system is improved by narrowing the bandwidth of each band-pass filter.

As stated in ARL 12-43, application Ser. No. 13/870,519, some prior art detectors tune to the harmonics of a single-frequency radar transmission. See for example, U.S. Pat. No. 3,732,567 to Low et al., herein incorporated by reference. Low discloses an apparatus for locating an electrically nonlinear object and determining the distance to the object by transmitting an FM signal in the vicinity of the nonlinear object causing a signal of a higher harmonic to be reflected by the nonlinear object. A receiver is provided for receiving the higher harmonic reflected signal and comparing such with the initial exciting signal so as to produce a signal, the amplitude of which is directly proportional to the distance to the object.

Receiving multiple harmonics requires the design of a broadband antenna or an antenna that is tunable to multiple harmonics. An embodiment disclosed in ARL 12-43, application Ser. No. 13/870,519, tunes to a particular harmonic of the original frequencies; so that the receive antenna need only be designed to accommodate a bandwidth large enough to encompass the mixing products near that harmonic. Other detectors tune to the intermodulation produced by the interaction of multiple frequencies at the target. See, for example U.S. Pat. No. 6,765,527 to Jablonski, et al., herein incorporated by reference. These intermodulation products are a result of odd-order nonlinear interactions. The invention disclosed in ARL 12-43, application Ser. No. 13/870,519, is able to receive and process odd-order or even-order information, depending upon the harmonic to which the receiver is tuned. Some of the prior art devices attempt to eliminate system-generated nonlinear products whose frequencies are the same as those intended to be received. These system-generated products degrade the signal-to-interference ratio of the radar, lower its sensitivity, and obscure the responses of electronic targets. One approach for minimizing these products is to transmit a linearly-polarized beam from one antenna and receive the target information on an orthogonal polarization from a second antenna, as disclosed in U.S. Pat. No. 3,781,897 to Staras, et al., herein incorporated by reference. Another approach, for harmonics, is to use a low-pass filter just before the transmit antenna and a harmonic filter just after the receive antenna, as disclosed in U.S. Pat. No. 3,972,042 to Johnson, herein incorporated by reference. A popular approach for eliminating system-generated mixing products is to use a separate antenna for each transmit frequency.

Although the low-pass and high-pass filtering scheme of an embodiment disclosed in ARL 12-43, application Ser. No. 13/870,519, does not allow for the reception of intermodulation, the invention disclosed in ARL 12-43, application Ser. No. 13/870,519, does enable the generation and reception of mixing products—centered on a harmonic of the transmit frequencies—using a single transmit antenna.

The present invention relates to, inter alia, radar technologies for detecting concealed threats. One technology that is well-suited for the detection of threats containing RF electronics is nonlinear radar, which exploits the electronic response from a target whose reflected frequencies are different from those transmitted. Reception of frequencies that are not part of the transmitted probe distinguishes the received signal from a linear return produced by clutter and indicates the presence of electronics. The presence of electronics in a location that typically does not contain electronics implies the presence of a threat.

An embodiment disclosed in ARL 12-43, application Ser. No. 13/870,519, is directed to a type of nonlinear radar that transmits multiple frequencies and listens for a harmonic of these frequencies as well as other frequencies near that harmonic. The multitone harmonic radar is a unique form of nonlinear radar, which detects and classifies radio-frequency (RF) electronic devices at standoff ranges. The embodiment disclosed in ARL 12-43, application Ser. No. 13/870,519, has several advantages over existing nonlinear radars. It enables a narrower-bandwidth antenna design while providing target information comparable to wider-bandwidth designs, it enables increased sensitivity and signal-to-interference ratio using multiple stages of filtering, and it allows a single-transmit-antenna design for generating and receiving mixing products that are usually stimulated from a target using multiple transmit antennas.

Nonlinear Radar

Nonlinear radar differs from traditional linear radar by offering high clutter rejection when detecting a variety of man-made targets. See in this regard, M. A. Flemming, et al., "Harmonic Radar Detection Systems," Proceedings of the IEE International Conference RADAR-77, pp. 1223-1231 (October 1977). Its disadvantage, compared to traditional linear radar, is that the power-on-target required to generate a comparable signal-to-noise ratio (SNR) is much higher. Nevertheless, nonlinear radar is particularly suited to the detection of devices containing metals and semiconductors that, while highly reflective, still possess a thin linear radar cross section.

Most nonlinear targets are not intended to respond to a nonlinear radar but do still respond because they contain electromagnetic nonlinearities inherent to their design, such as metal contacts, semiconductors, transmission lines, antennas, filters, connectors, and ferroelectrics. RF electronic devices such as handheld radios and cellular phones contain many of these nonlinear components.

A number of detection techniques have already been developed to exploit the nonlinear responses of RF electronics. One popular technique is to transmit a single frequency $f_0$ and receive the target response at the second harmonic of the transmitted tone, $2f_0$. Another technique is to transmit two tones $f_1$ and $f_2$ and receive the intermodulation tones $2f_1-f_2$ and $2f_2-f_1$. A preferred embodiment of the present invention transmits at least two tones and receives not only a harmonic of the transmitted tones (e.g. $2f_1$ and $2f_2$) but also the nonlinear products of those tones near that harmonic (e.g. $3f_1-f_2$, $f_1+f_2$, $3f_2-f_1$). This technique enables target discrimination using a narrow receiver bandwidth centered on a single harmonic. For example, to enable use with an antenna that transmits a powerful signal within a narrow band, first a signal range is selected based upon prior knowledge as to how certain electronic devices, such as cell phones, will respond to the transmitted signals. For instance, if the targeted electronic devices are cell phones, the predetermined selected frequency range will be a range in which return signal will enable identification of cellphones. For example, if two frequencies are used and the $\Delta f$ is approximately 40 kHz, the predetermined selected frequency range will be selected to enable return signals within the range of $Cf_1 \pm Df_2$, where C and D are integer values selected such that the combination is within the predetermined selected frequency range. For example, when the predetermined selected frequency range comprises return signals in the vicinity of $2f_1$ and $2f_2$, the return signals in the range include $(f_1+f_2)$, $(3f_1-f_2)$, $(3f_2-f_1)$, $(4f_1-2f_2)$, $(4f_2-2f_1)$, $(5f_2-3f_1)$, $(6f_2-4f_1)$, etc. Likewise, in the vicinity of $3f_1$ and $3f_2$, the return signals in this predetermined selected frequency range include $(2f_1+f_2)$, $(4f_1-f_2)$, $(4f_2-f_1)$, $(5f_1-2f_2)$, $(5f_2-2f_1)$, $(6f_2-3f_1)$, $(7f_2-4f_1)$, etc. Moreover, the selection of the range of interest is narrow so as to permit the usage of a single, narrow-band antenna and usage of portable equipment that can transmit signals within the range and varying the power of the transmitted signals so as to enable detection and classification of the electronic device. A preferred method disclosed in ARL 12-43, application Ser. No. 13/870,519, comprises varying the intensity or power of $f_1$ and $f_2$, and measuring the power or amplitude of the return signal components. Based upon the rate of the change in power or intensity of $f_1$ and $f_2$, and the relative change in the amplitude of the frequency components of the return signals, the type of electronic device can be determined, such as for example a cell phone. The method and device can be used in medical facilities to determine whether or not cell phones are being operated in the vicinity of medical equipment susceptible to interference from cellphones. Upon detection of a cell phone, the operators of the medical equipment may be alerted and the cell phone user told to remove the cell phone. As another example, the method and device disclosed in ARL 12-43, application Ser. No. 13/870,519, may be utilized aboard an airline where the planes equipment is susceptible to interference from cellphones and/or internet devices such as laptops, tablets, etc. Using the device to detect such electronic devices may avoid interference with the plane's electronics during, for example, take-off or landing of the plane.

Experiments conducted focused on the second harmonic of the transmitted tones because that harmonic tends to be the strongest of the received harmonics for the RF devices-of-interest to this study. A preferred method disclosed in ARL 12-43, application Ser. No. 13/870,519, is utilized for discriminating between devices, using at least two transmitted tones.

Harmonic Radar Theory

A harmonic radar is a radio-frequency (RF) sensor that exploits the nonlinear electromagnetic response of a target to an incident radar wave. The transmitted linear radar waveform contains a known set of frequencies:

$F_T = \{f_1, f_2, f_3, f_4, f_5 \ldots\}$

When this transmission illuminates a target containing nonlinear electromagnetic properties, the original waveform is distorted. This distortion produces a reflected waveform whose frequencies span the set of integer multiples, sums, and differences of the original frequencies:

$$F_R = \left\{ \sum_{i=1}^{M} m_i f_i; m_i \in \mathbb{Z} \right\}.$$

Integer multiples of the original frequencies (e.g. $2f_1$, $3f_1$, $4f_1$) are harmonics. All other integer sums are mixing products. Those mixing products that are nearest to the original tones (e.g. $2f_1-f_2$, $2f_2-f_1$) are intermodulation.

Many physical sources of nonlinear electromagnetic distortion have been identified. See in this regard, U.S. Pat. No. 7,830,299, herein incorporated by reference. Small threats are typically very difficult to detect since they are of low radar cross-section, may be slow moving, or perhaps static, and may be situated in an environment of clutter interference. For example, of importance is the detection of electronic hardware or circuits associated with small classes of weapons and unmanned vehicles. This is especially true in the detection of small UAV systems. In such circumstances, conventional radars that depend upon primary (or direct mirror-like) radio reflections of their transmitted wave forms are relatively non-effective detectors of man-made devices and of such threats. In a conventional radar system, difficulty arises when increasing the illuminating signal power and correspondingly the energy returned from such objects within a radar beam to achieve improved transmission/range. RF electronics contain several of these nonlinear electromagnetic distortion sources, such as semiconductor junctions, metal-metal contacts, and antennas. Clutter objects in rural and desert environments generally do not contain sources of electromagnetic nonlinearity, with the exception of ferromagnetic materials. By transmitting a known set of frequencies into such an environment and listening for frequencies that are not part of the original probe set, the presence or absence of RF electronics in that environment may be determined. If frequencies different from the original transmission are received by the radar, the presence of RF electronics is implied.

To predict the reflected response of an electronic device to incident RF radiation, a memoryless Taylor series model is assumed for nonlinearity:

$$E_{ref1}(t) = \sum_{p=1}^{\infty} a_p E_{in}^p(t) \quad (1)$$

where $E_{in}$ is the electric field incident on the device-under-test (DUT), $\alpha_p$ are complex power-series coefficients, and $E_{ref1}$ is the electric field reflected by the device. The value of $\alpha_1$ is the linear response of the device; the values $\{\alpha_2, \alpha_3, \ldots\}$ depend upon the nonlinear properties of the device. In general all of the coefficients $\alpha_p$ depend upon device orientation (i.e., with respect to the apparatus used to excite and capture RF radiation from the device), ground effects, and nearby clutter objects, Each term inside the infinite sum is $$E_m(t) = \alpha_m E_{in}^m(t). \quad (2)$$

In the frequency domain, $E_1$ and $E_2$ are $$\tilde{E}_1(f) = a_1 \tilde{E}_{in}(f) \quad (3)$$

$$\tilde{E}_2(f) = a_2[\tilde{E}_{in}(f) * \tilde{E}_{in}(f)] = \frac{a_2}{a_1}[\tilde{E}_{in}(f) * \tilde{E}_1(f)].$$

where $E_2$ was computed from $E_1$ by convolution of $E_1$ with the input field $E_{in}$. Likewise, the result for each successive $E_m(f)$ may be computed by the recursive convolution of $E_{m-1}(f)$ with $E_{in}(f)$:

$$\tilde{E}_m(f) = \frac{a_m}{a_{m-1}}[\tilde{E}_{in}(f) * \tilde{E}_{m-1}(f)]. \quad (4)$$

For a single-tone sinusoidal input with frequency $f_0$ and amplitude $E_0$, $$\tilde{E}_{in}(f) = \frac{E_0}{2}[\delta(f - f_0) + \delta(f + f_0)], \quad (5)$$

the electric field reflected from the device computed using (4) is $$\tilde{E}_{refl}(f) = \sum_{M=1}^{\infty} \frac{E_M}{2}[\delta(f - Mf_0) + \delta(f + Mf_0)] \quad (6)$$

$$E_M = \sum_{k=1}^{\infty} \binom{2k+M-2}{k-1} \frac{a_{2k+M-2}}{2^{2k+M-3}} E_0^{2k+M-2}.$$

This result, converted back into the time domain, is $$E_{refl}(t) = \sum_{M=1}^{\infty} |E_M| \cos(2\pi \cdot Mf_0 \cdot t + \phi\{E_M\}) \quad (7)$$

which is a sum of sinusoids at harmonics $M$ of $f_0$, each with amplitude $|E_M|$ and phase $\phi\{E_M\}$. Note $E_o$ is amplitude, $f_o$ is frequency and $\phi_o$ is an arbitrary initial phase. The frequency-domain representation of this sinusoid is two Dirac delta peaks at $+/-f_o$. If instead of a single probe tone, two simultaneous sinusoids $f_1$ and $f_2$ are transmitted, the electric field incident upon the DUT is $$\tilde{E}_{in}(f) = \frac{E_0}{2\sqrt{2}}[\delta(f - f_2) + \delta(f - f_1) + \delta(f + f_1) + \delta(f + f_2)]. \quad (8)$$

The amplitudes of both sinusoids is $E_0/\sqrt{2}$ such that the total signal power in the two-tone waveform is the same as the power of the single-tone waveform given by (5). The reflected electric field computed using Equation (4) is then $$\tilde{E}_{refl}(f) = \sum_{P=1}^{\infty} \sum_{Q=1}^{\infty} \frac{E_{PQ}}{2} [\delta(f - Pf_1 - Qf_2) + \delta(f + Pf_1 + Qf_2)] \quad (9)$$

$$E_{PQ} = \sum_{k=1}^{\infty} \binom{2k+P+Q-2}{k-1}$$

$$\binom{2k+P+Q-2}{k+Q-1} \left(\frac{a_{2k+P+Q-2}}{2^{2k+P+Q-3}}\right) \left(\frac{E_0}{\sqrt{2}}\right)^{2k+P+Q-2}. \quad (10)$$

P and Q are integers that allow Equation 9 to span all the possible frequency combinations produced by repeatedly multiplying pairs of sinusoids together. If only the two strongest electric-field components from (10) are considered (k=1, 2), the amplitudes of the reflected tones are $$E_{PQ} = \binom{P+Q}{Q} \frac{a_{P+Q}}{2^{P+Q-1}} \left(\frac{E_0}{\sqrt{2}}\right)^{P+Q} + \binom{P+Q+2}{1} \binom{P+Q+2}{Q+1} \left(\frac{a_{P+Q+2}}{2^{P+Q+1}}\right) \left(\frac{E_0}{\sqrt{2}}\right)^{P+Q+2}. \quad (11)$$

Let $f_0 = (f_1+f_2)/2$ and $\Delta f = f_2 - f_1$. Near $2f_0(P+Q=2)$, (11) simplifies to $$E_{PQ} = \binom{2}{Q} \frac{a_2}{4} E_0^2 + \binom{4}{Q+1} \frac{a_4}{8} E_0^4. \quad (12)$$

For tones separated from $2f_0$ by $\Delta f$, $Q \in \{0, 1, 2\}$, the first term of Equation (12) dominates as $E_0 \rightarrow 0$ (i.e. at standoff range, well below device saturation). The reflected power density—related to the amplitude of the electric field as $P_D = E^2/2\eta$ where $\eta$ is the wave impedance—is $$P_{D,refl}(Pf_1 + Qf_2) = \binom{2}{0}^2 \frac{|a_2^2|}{32} \frac{E_0^4}{\eta}. \quad (13)$$

The amplitude of the spectral content at $2f_0$ and at $2f_0 \pm \Delta f$ is governed by the DUT parameter $\alpha_2$. The ratio of $P_D$ reflected at the $2^{nd}$ harmonic tones (P=0, Q=2) to $P_D$ reflected at the sum tone (P=1, Q=1) is −6 dB. This ratio is the same regardless of the value of $\alpha_2$ or the value of any other device parameter $\alpha_p$.

For tones separated from $2f_0$ by $2\Delta f$, $Q \in \{-1, 3\}$, the first term of Equation (12) is zero and the reflected power density at $2f_0 \pm 2\Delta f$ is $$P_{D,refl}(Pf_1 + Qf_2) = \frac{|a_4^2|}{128} \frac{E_0^8}{\eta}. \quad (14)$$

The spectral content at $2f_0 \pm 2\Delta f$ is governed by the DUT parameter $\alpha_4$. Extension of Equation (12) to include k=3, 4, etc. shows that the spectral content at $2f_0 \pm 3\Delta f$ is governed by $\alpha_6$, the spectral content at $2f_0 \pm 4\Delta f$ is governed by $\alpha_8$, and so on. Since the coefficients $\alpha_p$ are device-dependent, the set of nonlinear products received at different multiples of $\Delta f$ away from $M \cdot f_0$ between different DUTs provides a way to distinguish nonlinear DUTs from each other.

Embodiments Disclosed in ARL 12-43, Application Ser. No. 13/870,519

Figure 1B:
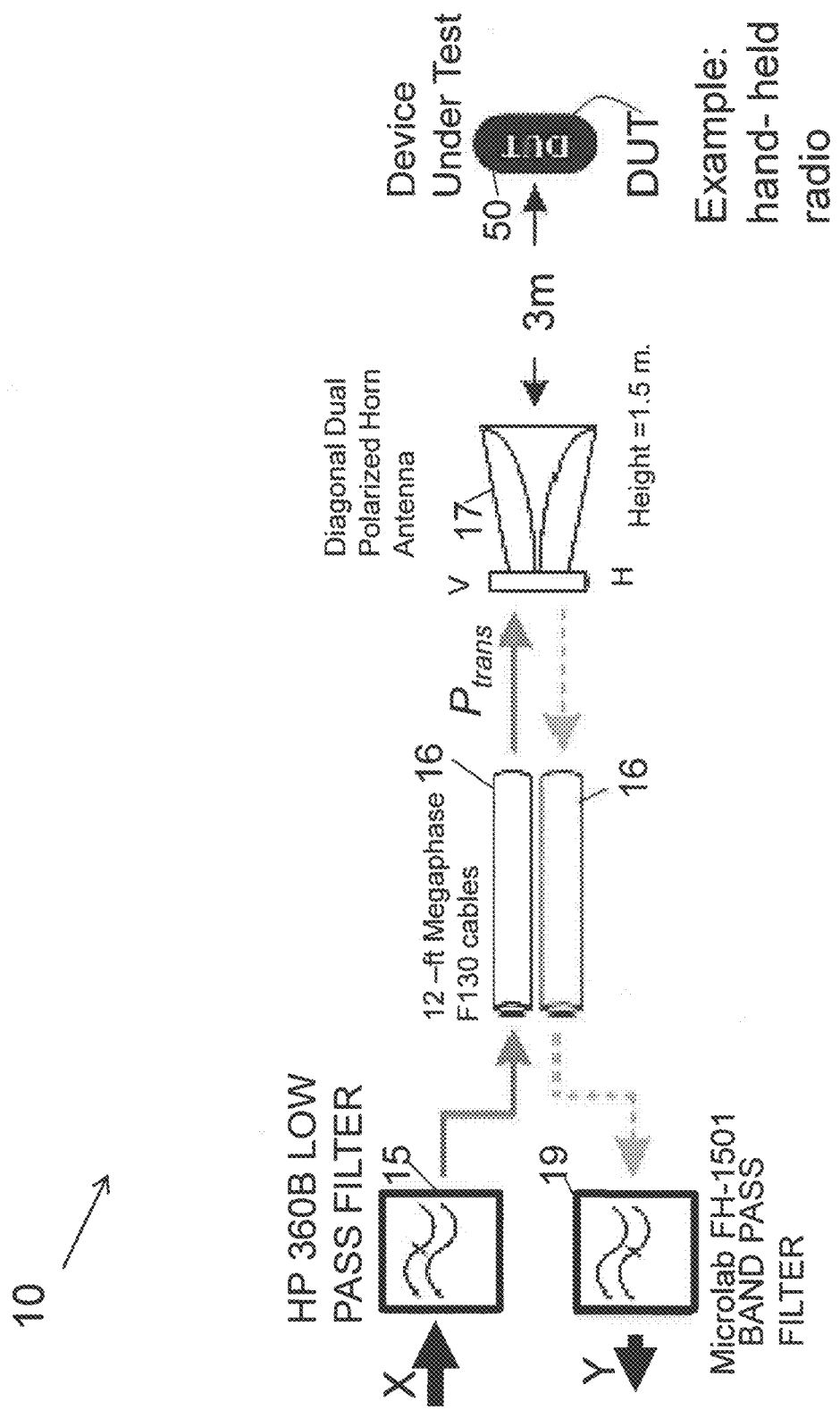
FIG. 1B is a schematic illustration showing a continuation of the preferred embodiment block diagram of FIG. 1A.

The architecture of the two-tone harmonic radar disclosed in ARL 12-43, application Ser. No. 13/870,519, is repeated in FIGS. 1A and 1B, which, when combined, illustrate a single electronics circuit. Shown in FIG. 1A is a waveform generator 11 which is used as a signal source. The waveform generator may be for example, a Tektronix AWG7052 arbitrary waveform generator. A step attenuator 12 is used to adjust the transmit signal power in 1-dB increments. A low pass filter or band pass filter 13, such as, for example, the Microlab FL-1001 low pass filter, attenuates system-generated harmonics before amplification. Note that any sort of filter or the like could be substituted for low pass filter 13, such as a filter which allows only certain frequencies to pass, without departing from the scope of the invention Amplifier 14, such as for example, the Amplifier Research 10W1000 amplifier, boosts the transmit signal to a level sufficient to generate a nonlinear response from the DUT. A low pass filter 15 (or band pass filter), such as, for example, the Hewlett Packard 360B low pass filter, attenuates system-generated harmonics after amplification. Note that any type of filter or the like could be substituted for low or band pass filter 15, such as a filter which allows only certain frequencies to pass, without departing from the scope of the invention. The transmit signal is fed to the "vertical" polarization of an antenna 17, such as the ETS Lindgren 3164-03 dual-polarized horn antenna, through a cable 16, such as, for example, a 12-ft low-distortion Megaphase F130 cable. In the experimental set-up of a preferred embodiment shown in FIGS. 1A-1B, the horn antenna 17 is placed at a height of 1.5 meters and turned 45° to the DUT 50. As shown schematically in FIG. 1B, the DUT 50 stands vertically and faces the antenna 17.

The "horizontal" polarization of the antenna receives the reflected DUT 50 response. A band pass filter 19, which can be for example, a Microlab FH-1501 filter, attenuates linear reflections at the transmit frequency while passing the harmonic reflections. Note that any sort of filter or the like could be substituted for band pass filter 19, such as a filter which allows only certain frequencies to pass, without departing from the scope of the invention A 15 ft. Megaphase F130 cable connects to a low noise amplifier 14LNA, which may be for example a MiniCircuits PSA-545+ low-noise amplifier, boosts the received signal for capture by the analyzer 22 SA, which may be, for example, a Rohde & Schwarz FSP-40 spectrum analyzer. An appropriate resolution bandwidth for the spectrum analyzer is 100 Hz.

Table 1 provides the results of a two-tone radar test conducted at three transmit frequencies $f_0=756$, 778, 802 MHz, and using two different DUTs: the Motorola T4500 and Motorola FV200 handheld radios. The transmit power was set to $P_{trans}=31$ dBm per tone (approximately 2.5 W total). Each pair of transmitted tones was separated by $\Delta f=40$ kHz. The power received $P_{rec}$ was recorded at $2f_0$, $2f_0\pm\Delta f$ and $2f_0\pm2\Delta f$, and compared between the DUTs.

Second. $P_{rec}$ at $2f_0\pm\Delta f$ is consistently 6 dB below $P_{rec}$ at $2f_0$ for a particular device and different transmit frequencies. This result matches well with the ratio derived from Equation (13).

Third, $P_{rec}$ at $2f_0\pm2\Delta f$ varies by more than 10 dB between different devices, depending upon the transmit frequencies.

Although the difference in the peak of the nonlinear response at $2f_0$ implies a difference between $\alpha_2$ of the two DUTs in this test, a fielded radar may not be able to distinguish between the difference in response caused by propagation loss or other factors that depend on the emplacement of the target versus the difference in response caused by the target property $\alpha_2$. The difference between the peak response at $2f_0$ and the response at $2f_0\pm2\Delta f$, however, depends strongly on the relative levels of the target properties $\alpha_2$ and $\alpha_4$ and is thus a more robust discriminator between two targets.

Although target discrimination is possible by transmitting a single tone $f_0$ and forming a device signature from the received amplitudes of several harmonics, reception of such a frequency set requires either a wideband receive antenna or an antenna that is tunable to each harmonic. Transmitting two closely-spaced tones ($\Delta f<1$ MHz) and receiving the mixing products near $2f_0$ removes this requirement. Using the proposed two-tone target discrimination scheme, the receive antenna need only be designed to operate in a narrow band centered at $2f_0$.

Referring now to FIG. 3, repeated from ARL 12-43, application Ser. No. 13/870,519, a block diagram of the multitone harmonic radar, which comprises a transmitter 30 and a receiver 40, which, although shown side-by-side, may be separated. One of ordinary skill in the art would appreciate that portions transmitter 30 and receiver 40 could be integrated together.

Inside the transmitter 30 are sine-wave generators 11A-11C, a combiner 23, an amplifier 14A, a low-pass filter 15, and an antenna 17T. The M sine-wave generators 11A, 11B and 11C produce each of the M frequencies that comprise

TABLE 1

Two-tone harmonic radar data: DUTs = Motorola T4500 and Motorola FV200, $\Delta f = 40$ kHz, $P_{trans} = 31$ dBm per tone. $P_{rec}$ at $2f_0 \pm \Delta f$ is approximately −6 dBc for both DUTs, which is predicted by Equation (13). $P_{rec}$ at $2f_0 \pm 2\Delta f$ differs between the DUTs, by as much as 11.5 dB depending upon the transmitted frequency.

| $f_0$ | $P_{rec}$ at $2f_0$, T4500 (dBm) | $P_{rec}$ at $2f_0$, FV200 (dBm) | $\Delta P_{rec}$ at $2f_0$ (dB) | $P_{rec}$ at $2f_0 \pm \Delta f$, T4500 (dBc) | $P_{rec}$ at $2f_0 \pm \Delta f$, FV200 (dBc) | $\Delta P_{rec}$ at $2f_0 \pm \Delta f$ (dB) | $P_{rec}$ at $2f_0 \pm 2\Delta f$, T4500 (dBc) | $P_{rec}$ at $2f_0 \pm 2\Delta f$, FV200 (dBc) | $\Delta P_{rec}$ at $2f_0 \pm 2\Delta f$ (dB) |
|---|---|---|---|---|---|---|---|---|---|
| 756 MHz | −71.2 | −81.5 | 10.3 | −6.4 | −5.7 | −0.7 | −20.7 | −32.2 | 11.5 |
| 778 MHz | −81.2 | −74.1 | −7.1 | −6.4 | −5.9 | −0.5 | −31.4 | −27.9 | −3.5 |
| 802 MHz | −87.9 | −71.9 | −16.0 | −6.2 | −6.4 | +0.2 | −30.5 | −26.6 | −3.9 |

FIG. 2, also disclosed in ARL 12-43, application Ser. No. 13/870,519, is a plot of the data captures for $f_0=756$ MHz. Specifically, FIG. 2 illustrates the nonlinear response recorded from two DUTs at $f_0=756$ MHz, corresponding to the first row of Table 1.

From Table 1 and FIG. 2, three results are noteworthy: First, $P_{rec}$ at $2f_0$ between the two DUTs can differ by more than 15 dB, which means that the strengths of the radar returns from two different nonlinear devices (of the same type) illuminated by the same frequency at the same position and in the same orientation can vary by more than an order of magnitude.

the RF transmission. The transmitted frequencies are contained within a bandwidth B and this bandwidth is centered on a frequency fc.

The transmitted frequencies are spaced close enough to each other so that they may be efficiently transmitted by a single antenna (17T), but they are spaced far enough away from each other so that the reflected frequencies may be filtered and passed individually (by a bank of filters, in the receiver). The M-port combiner 23 splices the frequencies of sine wave generators 11A, 11B & 11C together into one RF wave. The amplifier 14A boosts the power of the wave before transmission.

The low-pass filter 15, which may be any type of filter which passes specific frequencies, achieves a reduction in system-generated harmonics by attenuating frequencies at the output of the amplifier 14A that are well above the highest transmitted freq $f_M$. The antenna 17T broadcasts the RF transmission into the environment of interest Inside the receiver 40 are an antenna 17R, a high-pass filter 19, a low-noise amplifier 14E(LNA), a bank of band-pass filters 21, a bank of detectors 22, and a classifier 18. The antenna 17R receives the RF reflections from the environment; it is tuned to a particular harmonic of the transmitted frequencies, $\alpha f_c$ ($\alpha$=2, 3, 4, . . . ). The high-pass filter 19, which may be any type of filter which passes predetermined frequencies, achieves a reduction in system-generated harmonics by attenuating frequencies received by the antenna that are well below the lowest transmitted frequency $f_1$. The LNA 14L boosts the received signal to a level that is adequate for the detectors 22 and classifier 18. Each bandpass filter 21 is tuned to a different integer-multiple sum of the transmitted frequencies and passes that particular frequency to its detector 22. The band-pass filters 21 can be narrow (<100 kHz) for high receiver sensitivity. The detectors 22 register the amplitude of each received frequency and indicate the presence or absence of a nonlinear target if the received amplitude exceeds a given threshold. The classifier 18 compares the set of received amplitudes against amplitude information collected from nonlinear targets (prior to the in-situ data collection) and indicates a match if one is found.

FIG. 5A, repeated from ARL 12-43, application Ser. No. 13/870,519, shows a sample harmonic-radar return for M=2 and N=7, simulated in Matlab. T1 and T2 denote the two frequencies transmitted by the radar. R1 through R7 denote seven received frequencies that may be used to detect and classify the target. In general, the multitone electric field input to the target Ein may be written in the time domain $$E_{in}(t) = \sum_{i=1}^{M} E_i \cos(2\pi f_i t + \phi_i) \quad (3A)$$

and in the frequency domain $$\tilde{E}_{in}(f) = \frac{1}{2}\sum_{i=1}^{M} \tilde{E}_i e^{i\phi_i}[\delta(f - f_i) + \delta(f + f_i)]. \quad (4A)$$

A simple mathematical model assumed for an electronic target illuminated by RF power is that of a memory less nonlinearity:

$$E_{ref1}(t) = \sum_{j=1}^{K} a_j E_{in}^j(t) * h(t) \quad (5A)$$

where $E_{ref1}(t)$ is the electric field reflected by the device, $\alpha_j$ are complex power series coefficients, and h(t) is a linear response term that accounts for any gain/filtering imparted onto the target response immediately after the nonlinear interactions. The value of $\alpha_1$ is the linear response of the target; the values of $a_2$ through $\alpha_K$ depend upon the nonlinearities of the target.

For an input waveform with M=2, $E_1=E_2$ and $\phi_1=\phi_2=\phi_0$, Equation 3 becomes $$E_{in}(t)=E_0\{\cos(2\pi f_1 t)+\cos(2\pi f_2 t)\}. \quad (6A)$$

Substituting (6A) into (5A) and assuming that (at least) the terms $\alpha_2$, $\alpha_4$, and $\alpha_6$ are non zero yields $$E_{ref1}(t) = \quad (7A)$$

$$\begin{cases} \frac{a_2}{2}E_0^2\{\cos[2\pi(2f_1)t] + 2\cos[2\pi(f_1+f_2)t] + \cos[2\pi(2f_2)t]\} + \\ \frac{a_4}{8}E_0^4\{4\cos[2\pi(3f_1-f_2)t] + 4\cos[2\pi(3f_2-f_1)t]\} + \\ \frac{a_6}{32}E_0^6\{15\cos[2\pi(4f_1-2f_2)t] + 15\cos[2\pi(4f_2-2f_1)t]\} + \dots \end{cases} * h(t)$$

which in the frequency domain becomes $$|\tilde{E}_{in}(f)| = \frac{a_2}{4}E_0^2 \cdot \begin{cases} |H(2f_1)|\cdot\delta[f-(2f_1)] + \\ 2|H(f_1+f_2)|\cdot\delta[f-(f_1+f_2)] + \\ |H(2f_2)|\cdot\delta[f-(2f_2)] \end{cases} + \quad (8A)$$

$$\frac{a_4}{16}E_0^4 \cdot \begin{cases} |H(3f_1-f_2)|\cdot\delta[f-(3f_1-f_2)] + \\ |H(3f_2-f_1)|\cdot\delta[f-(3f_2-f_1)] \end{cases} + \dots +$$

$$\frac{a_6}{64}E_0^6 \cdot \begin{cases} |H(4f_1-2f_2)|\cdot\delta[f-(4f_1-2f_2)] + \\ |H(4f_2-2f_1)|\cdot\delta[f-(4f_2-2f_1)] \end{cases}$$

where |H(f)| is the magnitude of the frequency-domain equivalent of h(t). These seven frequency-domain peaks correspond to the "target reflection" points R1 . . . R7 in FIG. 5.

The power-series coefficients $\alpha_1$ . . . $\alpha_K$ and the transfer function H(f) vary between different devices; thus, the amplitudes of the tones received at $2f_1$, $2f_2$, etc. vary between different devices. The received tone amplitudes at these frequencies are a signature that may be assigned to each target-of-interest.

One advantage of a stepped-frequency design, however, is that its underlying switched-frequency signal source is likely able to dwell on a single frequency for a long period of time. As dwell time increases while transmitting the same average power in a tone or a series of tones, the side lobes caused by interrupting the transmission (e.g. turning the source off or switching to another tone) diminish. This extended dwell time is necessary in order to minimize reflected linear sidelobes from nonlinear reflections, which are usually very weak.

Nonlinear radar can also be implemented in different ways. One popular technique is to transmit a single frequency $f_0$ and receive the target response at the second harmonic of the transmitted tone, $2f_0$, as described in U.S. patent application Ser. No. 13/870,519 to Dr. Gregory J. Mazzaro, et al. entitled "Multitone Harmonic Radar and Method of Use," herein incorporated by reference. A slight variation of this technique tracks a Doppler shift at $2f_0$ for moving targets. See for example, A. Singh and V. Lubecke, "Respiratory monitoring and clutter rejection using a CW Doppler radar with passive RF tags," *IEEE Sensors*, vol. 12, no. 3, pp. 558-565, March 2012, herein incorporated by reference. Other variations chirp (see for example, C. Stagner, A. Conrad, C. Osterwise, D. G. Beetner, and S. Grant, "A practical superheterodyne-receiver detector using stimulated emissions," *IEEE Trans. Instrum. Meas.*, vol. 60, no. 4, pp. 1461-1468, April 2011) or digitally-modulate (see for example, V. Polacek and R. Pavlik, "The use of digital modulation signals in radar system for detection of nonlinear scatterers," in *Proc. Int. Radar Symp.*, IRS, pp. 743-747, September 2011) the transmit waveform for greater noise rejection. Another common technique is to transmit two tones $f_1$ and $f_2$ and receive the intermodulation tones $2f_1-f_2$ and $2f_2-f_1$ (see for example A. F. Martone and E. J. Delp, "Characterization of RF devices using two-tone probe signals," in *Proc. 14th Workshop on Stat. Sig. Process., IEEE/SP*, pp. 161-165, August 2007). A technique recently developed at Army Research Laboratory (ARL) transmits at least two tones and receives not only a harmonic of the transmitted tones (e.g. $2f_1$ and $2f_2$) but also the mixing products of those tones near that harmonic (e.g. $3f_1-f_2$, $f_1+f_2$, $3f_2-f_1$) as described in U.S. patent application Ser. No. 13/870,519 to Dr. Gregory J. Mazzaro, et al. entitled "Multitone Harmonic Radar and Method of Use," herein incorporated by reference. FIG. 5B illustrates examples of transmit and receive spectra for a nonlinear radar that transmits one tone and receives harmonics of that tone. FIG. 5C shows examples of spectra for a radar that transmits two tones and receives harmonics as well as mixing products near those harmonics.

FIGS. 5D and 5E are linear radar waveforms for impulse and stepped frequency, respectively. A single-cycle impulse and its spectrum are illustrated in FIG. 5D. An alternative design that allows for more flexibility in the transmitted band is the stepped-frequency waveform illustrated in FIG. 5E. Both impulse and stepped-frequency waveforms are broadband. For the impulse, the peak power is high but the average power is low. For the continuous stepped-frequency signal, the peak power and the average power are the same. Either waveform will provide linear detection and ranging.

Additional tones may be used to generate more unique information about each target. FIGS. 6 and 7, repeated from ARL 12-43, application Ser. No. 13/870,519, illustrate the received spectral content for radar transmissions containing 4 and 8 tones, respectively. In FIG. 6 there are 19 received frequencies (spanning a2, a4, a6, . . . , a18) and in FIG. 7 there are 41 points of information (spanning $a_2$, $a_4$, $a_6$, . . . , $a_{40}$).

The multi-tone approach generates the key information or features, in the target needed for identification. Detection and classification of these features is therefore generalized to standard methodologies. Common target detection methodologies include match filter, Bayesian decision theory, Generalized Likelihood Ratio Test (GLRT), and constant false alarm rate (CFAR) processing as described in E. Axell, et al., "Spectrum Sensing for Cognitive Radio," *IEEE Signal Processing Magazine*, Vol. 29, No. 3, pp. 101-116 (May 2012) herein incorporated by reference. Once the features are detected, they are classified to identify a target type (i.e. model of the RF device). Common classification methodologies include Bayesian discriminate functions, nearest neighbor classifiers, support vector machines (SVM), neural networks, tree-based algorithms, and unsupervised learning algorithms.

Figure 4:
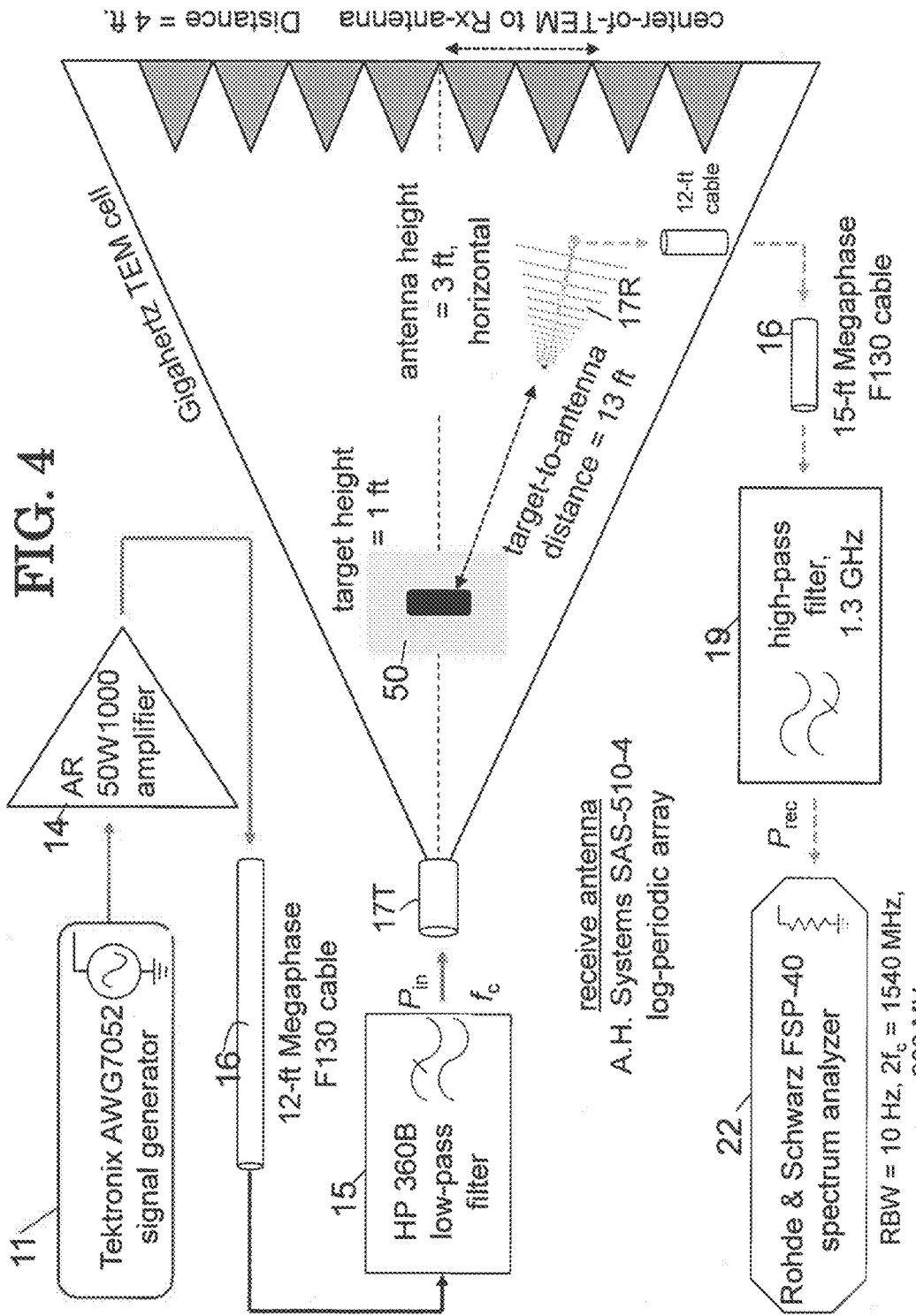
FIG. 4 is a schematic illustration of another preferred embodiment block diagram comprising, inter alia, a detached receiving antenna 17R.
Figure 8B:
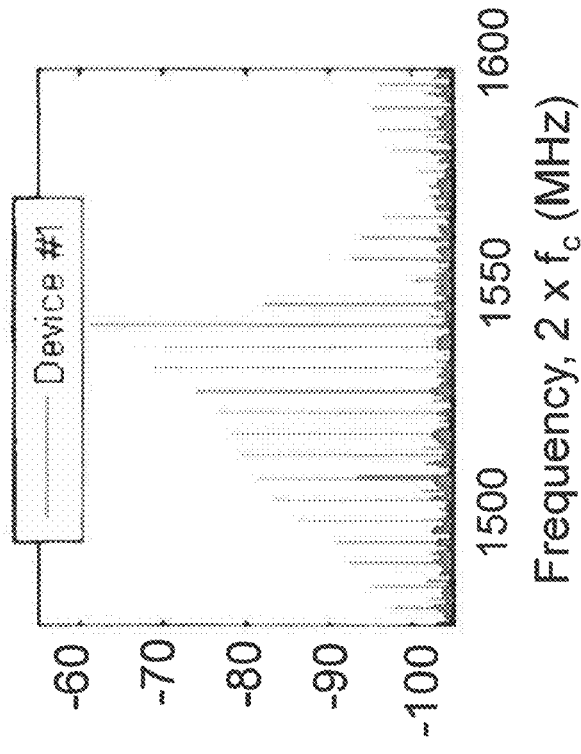
FIG. 8B is a graphical illustration depicting a harmonic radar return where M equals 2 tones with a first target device.
Figure 8A:
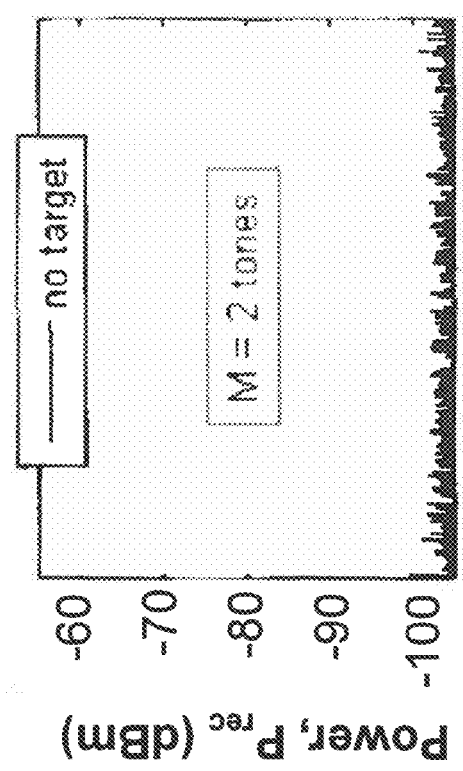
FIG. 8A is a graphical illustration depicting a harmonic radar return where the number of transmitted tones (M) equals 2 with no target.
Figure 9:
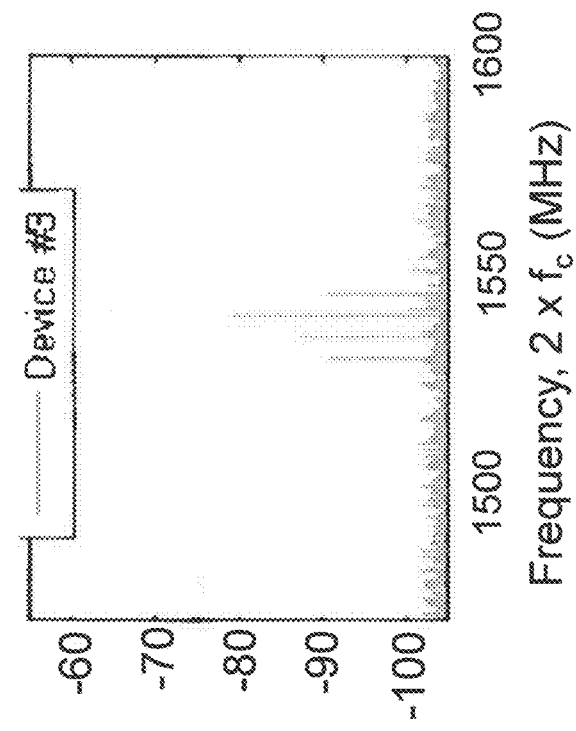
FIG. 9 is a graphical illustration depicting a harmonic radar return where M equals 2 tones with a second target device.
Figure 10:
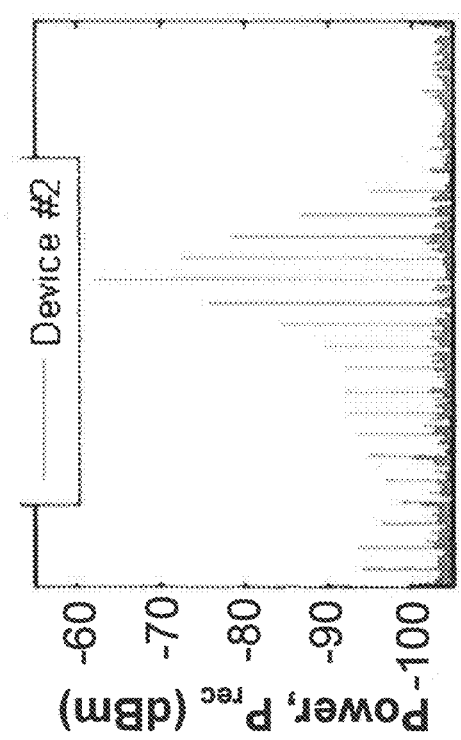
FIG. 10 is a graphical illustration depicting a harmonic radar return where M equals 2 tones with a third target device.

An embodiment disclosed in ARL 12-43, application Ser. No. 13/870,519, was constructed at the Army Research Laboratory and it demonstrated the multitone radar concept as depicted in FIG. 4 (repeated from ARL 12-43, application Ser. No. 13/870,519) The Tektronix AWG7052 signal generator 11 outputs two combined simultaneous frequencies (M=2). These tones are centered on fc=770 MHz and are separated by $f_{sep}$=5 MHz, although the invention is not limited to the selection of these tones or this number of tones. In the example, the frequencies have equal amplitudes (−6 dBm per tone). The Amplifier Research AR50W1 000 amplifier 14 increases the multi tone signal power by approximately 50 dB. The HP 360B low-pass filter 15 rejects frequencies above 1200 MHz. Megaphase F 130 low-distortion cable 16 minimizes system-generated nonlinear spectral content.

The multitone waveform is applied to the output of a Gigahertz Transverse Electromagnetic (GTEM) cell, which is a large waveguide capable of applying transverse EM waves with a nearly-vertical electric field to the samples inside of it. A target sits on a 1-foot-high block of foam. The receiver antenna, the A. H. Systems SAS-510-4 log-periodic array, faces the target, 13 feet away from it. The antenna 17R sits on a 3-foot-high tripod.

The received signal is fed to a high-pass filter which rejects frequencies below 1300 MHz. The Rohde & Schwarz FSP-40 spectrum analyzer 22SA functions as the filter-bank and detector. The resolution bandwidth (RBW) of the analyzer is set to 10 Hz to illustrate the sensitivity that can be achieved using a bank of 10-Hz band-pass filters in the receiver.

Data from which detection and classification are possible is shown in FIGS. 8A-8D. Multitone responses were collected from three RF electronic targets. A comparison of the responses, as well as the received signal from the "no target" case (i.e. when there is no device on the block of foam) is possible (see FIG. 8A).

From FIGS. 8A-8D, repeated from ARL 12-43, application Ser. No. 13/870,519, detection can be made visually. For example, the detection threshold can be set to −100 dBm at a received frequency of 1540 MHz. Reception of a device response above this threshold (e.g. −62 dBm for Device #1, −62 dBm for Device #2, or −80 dBm for Device #3) registers a detection for all three targets. As the shapes of the received spectra (illuminated by the same waveform, at the same power, and observed at the same standoff distance) are different between the targets, a signature may be assigned to each target. One possible basis for this signature is a pairing between received frequency and received amplitude.

The advantages of multitone harmonic radar, as utilized in the preferred embodiments disclosed herein, as compared to existing nonlinear radars, are as follows:

(1) It enables a narrower-bandwidth front-end design (antenna) while providing target information comparable to wider-bandwidth designs.

(2) It provides high sensitivity and high signal-to-interference ratio when implemented using multiple stages of filtering.

(3) It allows a single-transmit-antenna design for generating and receiving nonlinear products that are usually (ordinarily) stimulated from a target using multiple transmit antennas.

Since preferred embodiments of the present invention tune to a particular harmonic of the original frequencies, the receive antenna need only be designed to accommodate bandwidth large enough to encompass the mixing products near the harmonic; i.e., the receive antenna need only be designed to accommodate a bandwidth large enough to encompass the nonlinear products near that harmonic.

Some nonlinear detectors tune to the harmonics of a single-frequency radar transmission to perform device discrimination. Receiving multiple harmonics requires the design of a broadband antenna or an antenna that is tunable to multiple harmonics In the embodiments described in ARL 12-43, application Ser. No. 13/870,519, system-generated nonlinear products whose frequencies are the same as those intended to be received are reduced or eliminated. These system-generated products degrade the signal-to-interference ratio of the radar, lower its sensitivity, and obscure the responses of electronic targets. Although the low-pass and high-pass filtering scheme does not allow for the reception of intermodulation, the present invention does enable the generation and reception of mixing products—centered on a harmonic of the transmit frequencies—using a single transmit antenna.

In addition to orthogonal polarizations, the multitone radar disclosed in ARL 12-43, application Ser. No. 13/870, 519, and shown in FIGS. 1A-1B implements a low pass filter before the transmit antenna and a high pass filter after the receive antenna. The signal-to-interference ratio of the system is improved by increasing the out-of-band rejection for these filters. To achieve high sensitivity, a bank of band pass filters can be inserted in the receive chain after the high pass filter, each tuned to one of the desired harmonic tones (e.g. $2f_0$, or $2f_0-2\Delta f$).

Although the low pass and high pass filtering scheme presented here does not allow for the reception of intermodulation, it does enable the exploitation of target-generated nonlinear products and the elimination of system-generated nonlinear products using a single transmit antenna.

The difference in signal strengths between different devices recorded at the same frequency interval away from the $2^{nd}$ harmonic (and illuminated by the same transmit power and the same transmit frequencies, in the same position and orientation) provides a way to distinguish between those devices.

Other detectors tune to the intermodulation produced by the interaction of multiple frequencies at the target. These intermodulation products are a result of odd-order nonlinear interactions. The preferred embodiments of the invention disclosed in ARL 12-43, application Ser. No. 13/870,519, are able to receive and process odd-order or even-order information, depending upon the harmonic to which the receiver is tuned.

The system disclosed in ARL 12-43, application Ser. No. 13/870,519, was directed to a ranging (imaging) method and is formulated using a "signal subspace" and requires expensive matrix calculations. In comparison the ranging method of the preferred embodiment as depicted in FIG. 31, inter alia, is a direct extension of linear processing techniques to non-linear systems and is fast and much more computationally efficient, requiring only a Fast Fourier Transform.

Due to the differences in the proposed methods, the mathematical expressions used to calculate target range are completely different. The method of the preferred embodiment shown in FIG. 31, inter alia, preserves phase information, enabling additional coherent processing "downstream" (e.g. formation of synthetic aperture radar imagery, moving target indication (via Doppler processing), and coherent change detection). The output of ARL 13-09, (U.S. patent application Ser. No. 14/032,387 entitled "Combined Radar Assembly With Linear and Nonlinear Radar," by Dr. Gregory J. Mazzaro, et al., filed Sep. 20, 2013, and published as US Patent Publication 2015/0084811) indicates that the output is a complex magnitude. The second ranging method proposed in ARL 13-09 (Application No. 3, application Ser. No. 13/870,519, (FIGS. 19 and 20) utilizes a correlation-based technique, which differs fundamentally from the method in FIG. 31 (which utilizes a Fourier transform and provides a flexible, computationally efficient way to locate the target in range.

Combined Linear and Nonlinear Radar

Referring now to U.S. application Ser. No. 14/032,387, linear radar is well-suited to the detection of a target whose complex permittivity $\hat{\varepsilon}$ contrasts greatly with that of its surroundings:

$$\hat{\varepsilon} = \varepsilon' - j\varepsilon'' \tag{B1}$$

where $\varepsilon'$ is the "real" part and $\varepsilon''$ is the "imaginary" part of the permittivity. The permittivity of a material relative to that of free space is its dielectric constant $\hat{\varepsilon}_r$:

$$\hat{\varepsilon}_r = \frac{\hat{\varepsilon}}{\varepsilon_0} = \frac{\varepsilon'}{\varepsilon_0} - j\frac{\varepsilon''}{\varepsilon_0} = \varepsilon'_r - j\cdot\varepsilon''_r. \tag{B2}$$

$$\varepsilon_0 = 8.854 \cdot 10^{-12} F/m \tag{B3}$$

$$\varepsilon_r = |\hat{\varepsilon}_r|$$

As repeated from U.S. application Ser. No. 14/032,387, FIG. 11 is a diagrammatic illustration of a target illuminated by a radar wave showing diagrammatically the incident and reflected radar waves for propagation normal to target. The electric field of the incident wave $E_{in}$ is represented by a single-tone sinusoid of frequency $f_0$ and amplitude $E_0$:

$$E_{in}(t) = E_0 \cos(2\pi f_0 \cdot t). \tag{B4}$$

Assuming normal incidence (i.e. the direction of propagation of the wave is normal to the boundary of the target), the reflected wave is:

$$E_{refl}(t) = |E_1|\cos(2\pi \cdot f_0 \cdot t + \phi\{E_1\}) \tag{B5}$$

$$E_1 = \Gamma \cdot E_0 \tag{B6}$$

$$\Gamma = \frac{\sqrt{\varepsilon_{r1}} - \sqrt{\varepsilon_{r2}}}{\sqrt{\varepsilon_{r1}} + \sqrt{\varepsilon_{r2}}} = \frac{1 - \sqrt{\varepsilon_r}}{1 + \sqrt{\varepsilon_r}}$$

The frequency of the reflected wave is the same as that of the incident wave, but its amplitude is scaled by the reflection coefficient $\Gamma$. For $\varepsilon_r=1$, $\Gamma=0$; the target is transparent to the radar wave traveling in air and there is no reflection.

As the contrast in $\varepsilon_r$ between a target and that of the medium through which the radar wave is propagating increases, the strength of the radar reflection from that target increases. The value of $\varepsilon''_r$ for a typical conductor (e.g. aluminum) is greater than $10^7$ S/m. Thus, conductive targets are very detectable, even if they are buried or obscured by insulators. For insulators, $\varepsilon''_r$ is near zero but $\varepsilon'_r$ can take on a wide range of values, from $\varepsilon'_r \approx 1$ for dry foam up to $\varepsilon'_r=80$ for distilled water. Thus, insulating targets are not as detectable, as their radar reflections depend much more strongly on $\varepsilon'_r$.

Nonlinear radar exploits a completely different phenomenon: it relies on the nonlinear electromagnetic properties of a target to convert a portion of the incident radar wave into a reflected wave at a different frequency. Most materials found in nature are electromagnetically linear (with the exception of ferromagnetics), while many man-made materials are electromagnetically nonlinear. Semiconductor devices, such as radios and cell phones, are highly nonlinear.

A simple model for radio-frequency (RF) electromagnetic nonlinearity is the memoryless power series given by:

$$E_{refl}(t) = a_1 E_{in}(t) + a_2 E_{in}^2(t) + a_3 E_{in}^3(t) + \ldots = \sum_{n=1}^{N} a_n E_{in}^n(t) \tag{B7}$$

where $\alpha_n$ are complex power-series coefficients, and $E_{refl}$ is the electric field reflected by the target. The value of $\alpha_1$ is the linear response of the target, Γ; the values $\{\alpha_2, \alpha_3, \ldots\}$ depend upon the nonlinear properties of the target. If a nonlinear target is illuminated by the radar wave given by the above equations, the reflected wave is $$E_{refl}(t) = \sum_{M=1}^{\infty} |E_M|\cos(2\pi \cdot M \cdot f_0 \cdot t + \phi\{E_M\}) \quad \text{(B8)}$$

$$E_M = \sum_{k=1}^{\infty} \binom{2k+M-2}{k-1} \frac{a_{2k+M-2}}{2^{2k+M-3}} E_0^{2k+M-2} \quad \text{(B9)}$$

which is a sum of sinusoids at harmonics M of $f_0$, each with amplitude $|E_M|$ and phase $\phi\{E_M\}$. If the radar measures $E_M=0$ for all M>1, then no nonlinear target is detected. If the radar measures $E_M$ for some M>1, however, a nonlinear target is detected.

The embodiment first disclosed in U.S. application Ser. No. 14/032,387 combined radar detects targets using linear as well as nonlinear reflective responses. The linear radar detects targets whose permittivity contrasts with that of the background, while the nonlinear radar detects targets whose electromagnetic properties produce a change in frequency between the incident and reflected waves.

Implementation

Figures 12A, 12B:
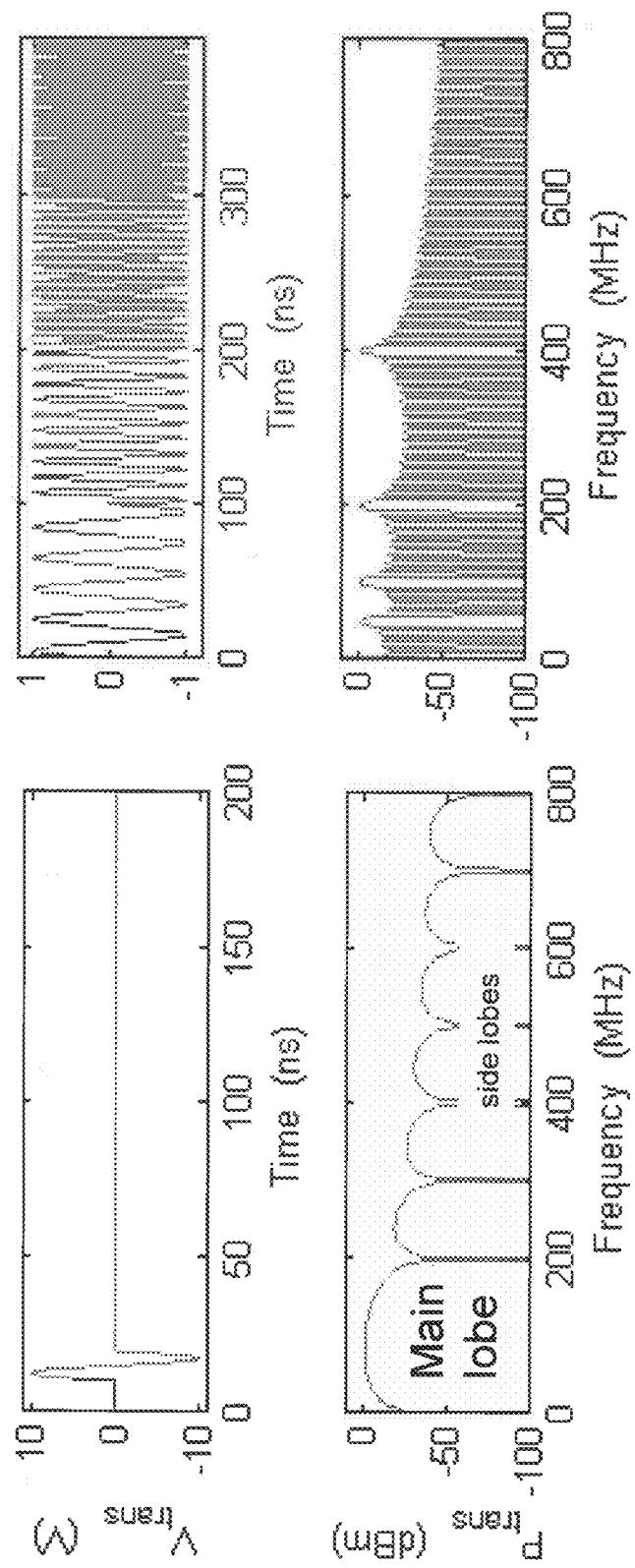
FIG. 12A is an illustration of a single-cycle impulse linear radar waveform and its spectrum.
FIG. 12B is an illustration of a stepped-frequency waveform, which is an alternative linear waveform design that allows for more flexibility in the transmitted band.

Linear radar can be implemented in different ways, commonly designated by the transmit waveform, such as continuous-wave (CW), pulsed single-tone, or chirp. To achieve an ultra-wide bandwidth for ground penetration as well as imaging resolution, the Army Research Laboratory (ARL) designed the Synchronous Impulse Reconstruction (SIRE) radar as described in F. Koenig, M. Ressler, G. Smith, L. Nguyen, and R. Harris, "Synchronous Impulse Reconstruction (SIRE) radar sensor," U.S. Army Research Laboratory, Adelphi, Md., Technical Report ARL-TR-4661, November 2008, herein incorporated by reference. The SIRE radar uses a single-cycle impulse waveform, two transmit antennas, 16 receive antennas, and multiple data traces collected while the radar platform is in motion in order to form high-resolution images of surface and shallow-buried targets. As first disclosed in U.S. application Ser. No. 14/032,387, FIGS. 12A and 12B are linear radar waveforms for impulse and stepped frequency, respectively. A single-cycle impulse and its spectrum are illustrated in FIG. 12A. An alternative design that allows for more flexibility in the transmitted band is the stepped-frequency waveform illustrated in FIG. 12B. Both impulse and stepped-frequency waveforms are broadband. For the impulse, the peak power is high but the average power is low. For the continuous stepped-frequency signal, the peak power and the average power are the same. Either waveform will provide linear detection and ranging.

One advantage of a stepped-frequency design, however, is that its underlying switched-frequency signal source is likely able to dwell on a single frequency for a long period of time. As dwell time increases while transmitting the same average power in a tone or a series of tones, the side lobes caused by interrupting the transmission (e.g. turning the source of for switching to another tone) diminish. This extended dwell time is necessary in order to minimize reflected linear sidelobes from nonlinear reflections, which are usually very weak.

Nonlinear radar can also be implemented in different ways. One popular technique is to transmit a single frequency $f_0$ and receive the target response at the second harmonic of the transmitted tone, $2f_0$, as described in U.S. patent application Ser. No. 13/870,519 to Dr. Gregory J. Mazzaro, et al. entitled "Multitone Harmonic Radar and Method of Use," herein incorporated by reference. A slight variation of this technique tracks a Doppler shift at $2f_0$ for moving targets. See for example, A. Singh and V. Lubecke, "Respiratory monitoring and clutter rejection using a CW Doppler radar with passive RF tags," IEEE Sensors, vol. 12, no. 3, pp. 558-565, March 2012, herein incorporated by reference. Other variations chirp (see for example, C. Stagner, A. Conrad, C. Osterwise, D. G. Beetner, and S. Grant, "A practical superheterodyne-receiver detector using stimulated emissions," IEEE Trans. Instrum. Meas., vol. 60, no. 4, pp. 1461-1468, April 2011) or digitally-modulate (see for example, V. Polacek and R. Pavlik, "The use of digital modulation signals in radar system for detection of nonlinear scatterers," in Proc. Int. Radar Symp., IRS, pp. 743-747, September 2011) the transmit waveform for greater noise rejection. Another common technique is to transmit two tones $f_1$ and $f_2$ and receive the intermodulation tones $2f_1-f_2$ and $2f_2-f_1$ (see for example A. F. Martone and E. J. Delp, "Characterization of RF devices using two-tone probe signals," in Proc. 14th Workshop on Stat. Sig. Process., IEEE/SP, pp. 161-165, August 2007). A technique recently developed at ARL transmits at least two tones and receives not only a harmonic of the transmitted tones (e.g. $2f_1$ and $2f_2$) but also the mixing products of those tones near that harmonic (e.g. $3f_1-f_2$, $f_1+f_2$, $3f_2-f_1$) as described in U.S. patent application Ser. No. 13/870,519 to Dr. Gregory J. Mazzaro, et al. entitled "Multitone Harmonic Radar and Method of Use," herein incorporated by reference. As first described in U.S. application Ser. No. 14/032,387, FIG. 13A illustrates examples of transmit and receive spectra for a nonlinear radar that transmits one tone and receives harmonics of that tone. FIG. 13B shows examples of spectra for a radar that transmits two tones and receives harmonics as well as mixing products near those harmonics.

A common architecture for transmitting and receiving waveforms for both linear and nonlinear radar is necessary in order to minimize the size, weight, and power of the combined radar system. One preferred embodiment combines a wideband stepped-frequency approach with a narrowband two-tone nonlinear approach is given in FIG. 14.

The signal sources are two stepped-frequency waveform generators 11A, 11B. As an alternative, the generators 11A, 11B may be pulsed. For linear transmission, a single source 11B is amplified by amplifier 14A, mixed by mixer 9, amplified by amplifier 14, and applied to the transmit antennas at terminal 55. Mixer 9 is an upconverting mixer for the transmitter. Its function is to change the frequency of the original baseband (low frequency) signal to an appropriate radio-frequency (high frequency) signal for transmission and excitation of the nonlinear response from a target.

For nonlinear transmission, the outputs of the two sources 11A, 11B are combined, filtered by filters 17, 19 and amplified by amplifiers 63, 63A, and applied via terminal 55 and switch 56 to the transmit antennas 17T. Note that the switch 56 alternates between contact with terminal 55A (to transmit nonlinear radar) to terminal 55 (to transmit linear radar).

At the receiving end, for linear reception, the signal is received by receiver antennas 17R and switch 25 selects the output of one of the receiver antennas 17R, and passes the signal to the base of switch 56R. Switch 56R alternates between terminals 27 and 28. For linear reception, the signal is amplified by amplifier 29 and lowpass filtered by low pass filter 15LP, and downconverted by mixer 9R, filtered at filter 32 and inputted to an analog-to-digital converter 33. Mixers 9R and 9R' are downconverting mixers. Their function is to change the incoming radio-frequency signal to a baseband signal suitable for digitization (and ultimate decision as to the presence of a target). For nonlinear reception, the signal is highpass filtered by filter 34, amplified by amplifier 35, downconverted by mixer 9R', and filtered by bandpass filters 37, 39 (with an amplifier 38 therebetween). Separate analog-to-digital converter (ADC) units 33, 33A are used for linear and nonlinear signal capture. The ADC in the linear chain will likely be wideband at a lower bit-resolution in order to determine precise ranging for linear responses. The ADC 33A in the nonlinear chain will likely be narrowband at a higher bit-resolution in order to maintain a high dynamic range in the receiver to detect weak nonlinear responses. A pair of RF switches 56T, 56R—switch 56T in the transmitter and switch 56R in the receiver, switched in tandem—adjust the mode-of-operation of the radar between linear and nonlinear. Transmitting from more than one antenna 17T (e.g. the two depicted in FIG. 4) increases the overall aperture for illuminating targets-of-interest. Receiving from more than one antenna 17R (e.g. the four depicted in FIG. 14) improves signal-to-noise ratio (SNR) and allows for the angle-of-arrival to the target to be determined. Stepping and/or pulsing the transmit waveform (from 11A, 11B) allows the range to the target to be determined.

The embodiment first described in U.S. application Ser. No. 14/032,387 comprises a transceiver comprising a transmit chain that generates waveforms that are appropriate for both linear and nonlinear modes of operation and a switchable receive chain, which captures either linear or nonlinear responses from a radar target. The response to be exploited by the nonlinear receiver may, for example, be the second harmonic of the transmitted waveform.

Target Localization

Figure 15A:
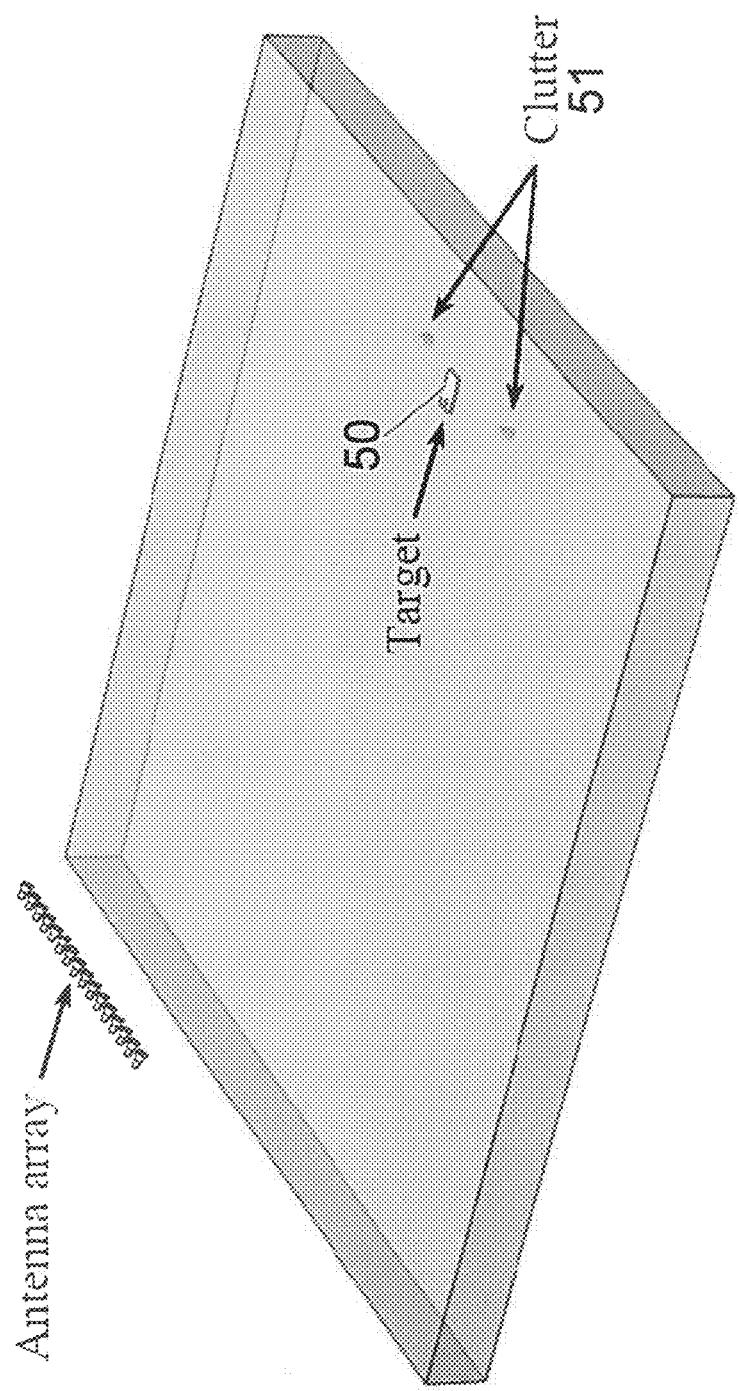
FIG. 15A is a schematic illustration of a nonlinear buried target scene containing a target and two (linear) clutter objects.
Figures 15B, 15C:
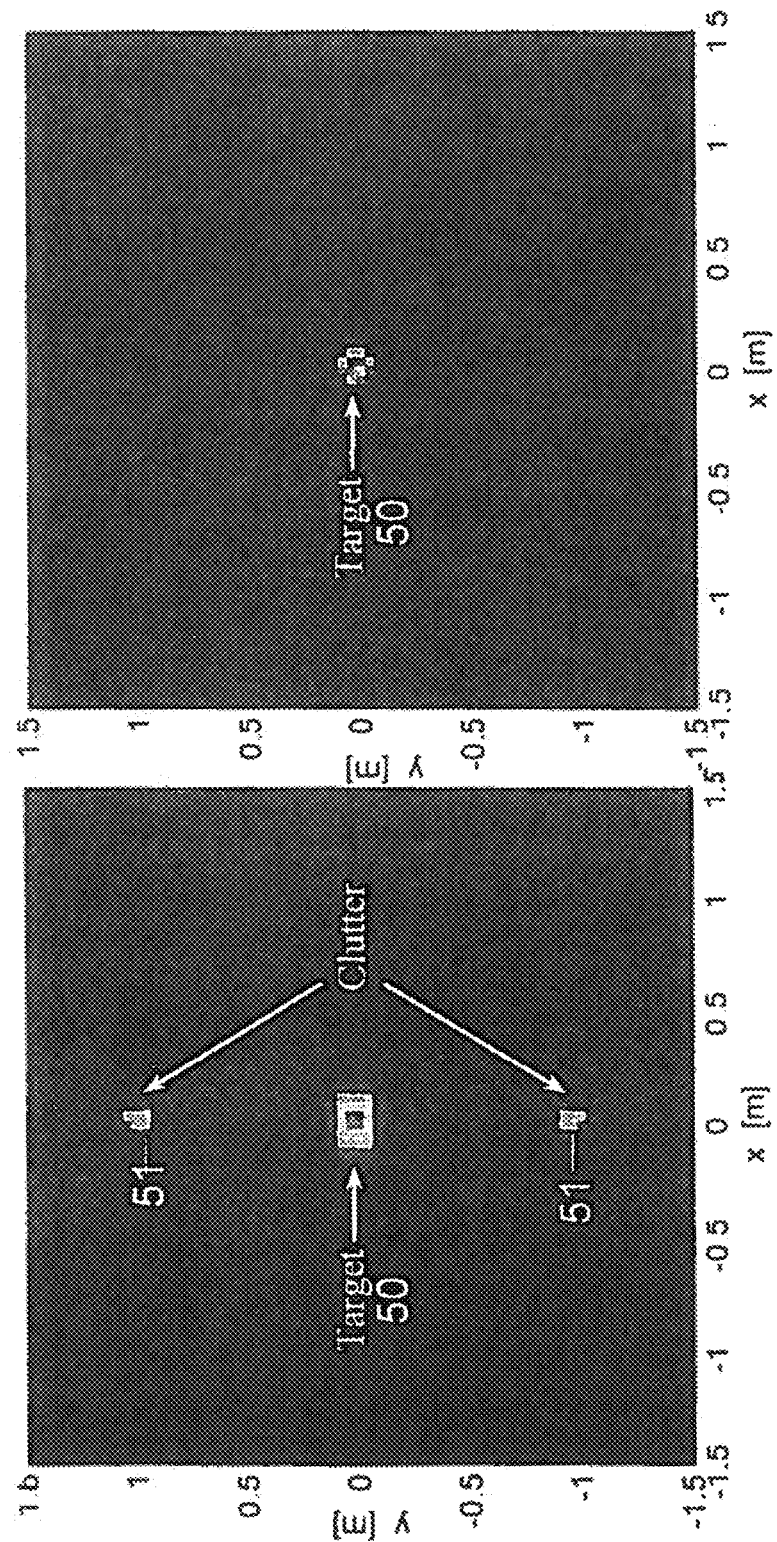
FIG. 15B is an illustration of an image of the target of FIG. 15A generated using harmonic multi-static received signal matrices at $f_0$=840 MHz.
FIG. 15C is an illustration of an image of the target of FIG. 15A generated using harmonic multi-static received signal matrices 2f0=1680 MHz.

After the transmit waveform has reflected from the target and been received, an imaging algorithm can be used to process the reflections for localization. A time-reversal-based multiple-signal classification (TR-MUSIC) algorithm is proposed to generate the images using the steady-state harmonic response as described in D. Liao, "A hybrid approach for characterizing linear and nonlinear electromagnetic scattering: Theory and applications," U.S. Army Research Laboratory, Adelphi, Md., Technical Report ARL-TR-6261, November 2012, herein incorporated by reference. For M nonlinear targets and N transmit/receive antennas, the received signal at frequency $f_s$ received at the array due to excitation at frequency $f_i$ by the n-th transmitter is $$\dot{s}_{sn}(f_s, f_i) = \sigma_{s1}(f_s, f_i)G(\vec{r}_{s1}, \vec{r}_n, f_i)\vec{G}(\vec{r}_{s1}, f_s) +$$
$$\sigma_{s2}(f_s, f_i)G(\vec{r}_{s2}, \vec{r}_n, f_i)\vec{G}(\vec{r}_{s2}, f_s) + \ldots +$$
$$\sigma_{sM}(f_s, f_i)G(\vec{r}_{sM}, \vec{r}_n, f_i)\vec{G}(\vec{r}_{sM}, f_s) \quad (B10)$$

where $\vec{r}_n$ (n=1, 2, ..., N) is the location of the n-th array element, $\vec{r}_m$ (m=1, 2, ..., M) is the location of the m-th target, $\sigma_{sm}(f_s, f_i)$ is the scattering coefficient of the m-th target, and $G(\vec{r}, \vec{r}', f)$ is the Green's function of the radar environment. From the above equations the signal subspace is spanned by the Green's function vectors $\vec{G}(\vec{r}_{s1}, f_s)$, $\vec{G}(\vec{r}_{s2}, f_s), \ldots, \vec{G}(\vec{r}_{sM}, f_s)$; i.e. the target locations are encoded within the subspace representation of the received signal. After invoking reciprocity, the frequency-domain N×N multi-static matrix for the antenna array can be written $$K(f_s, f_i) = \sum_{m=1}^{M} \sigma_{sm}(f_s, f_i)\vec{G}(\vec{r}_{sm}, f_s)\vec{G}^T(\vec{r}_{sm}, f_i) \quad (B11)$$

in which $^T$ represents the transpose operation, and the matrix element $K_{pq}(f_s, f_i)$ is the response at the p-th array element due to excitation at the q-th array element. In practice, $K(f_s, f_i)$ is simply the measurement matrix. For image generation, the signal subspace of $K(f_s, f_i)$ is computed using singular value decomposition:

$$K(f_s, f_i) = U(f_s, f_i)\Lambda(f_s, f_i)V(f_s, f_i)^H \quad (B12)$$

where $U(f_s, f_i)$ and $V(f_s, f_i)$ are unitary matrices, $\Lambda(f_s, f_i)$ contains the singular values of $K(f_s, f_i)$, and $^H$ denotes the conjugate transpose operation. The column vectors of $U(f_s, f_i)$ supply the singular vectors $u_p(f_s, f_i)$ (p=1, 2, ..., N). Assuming that the received signal subspace is spanned by the singular vectors corresponding to the first L non-zero singular values and the null subspace is spanned by the remaining singular vectors corresponding to singular values equal to zero, an imaging functional can be constructed:

$$O(\vec{r}, f_s, f_i) = \left( \sum_{p=L+1}^{N} |\langle u_p(f_s, f_i), \vec{G}(\vec{r}, f_s)\rangle|^2 \right)^{-1} \quad (B13)$$

where the Green's function vector $\vec{G}(\vec{r}, f_s)$ can be computed using numerical or analytical methods. The imaging functional in the above equations peaks at the target locations. This functional is employed for imaging in the scenario displayed in FIG. 15A. The scene consists of a nonlinear-circuit-loaded target 50 buried in the ground, along with two (linear) clutter objects 51. The sensing array is composed of N=16 transceivers distributed over a 2-m-wide aperture with a standoff distance of 6.6 m. Here single-tone CW excitation is assumed (e.g., step-frequency excitation with a single frequency). The harmonic multistatic received signal matrices at $f_0$ (the excitation frequency) and $2f_0$ (the second harmonic) are calculated using a hybrid solver as described within the aforementioned reference by D. Liao. The images at the two frequencies are displayed in FIGS. 15B and 15C. The target 50 is accurately localized for both the $f_0$ and $2f_0$ images. The clutter objects 51 do not appear in the image at $2f_0$.

Figure 16:
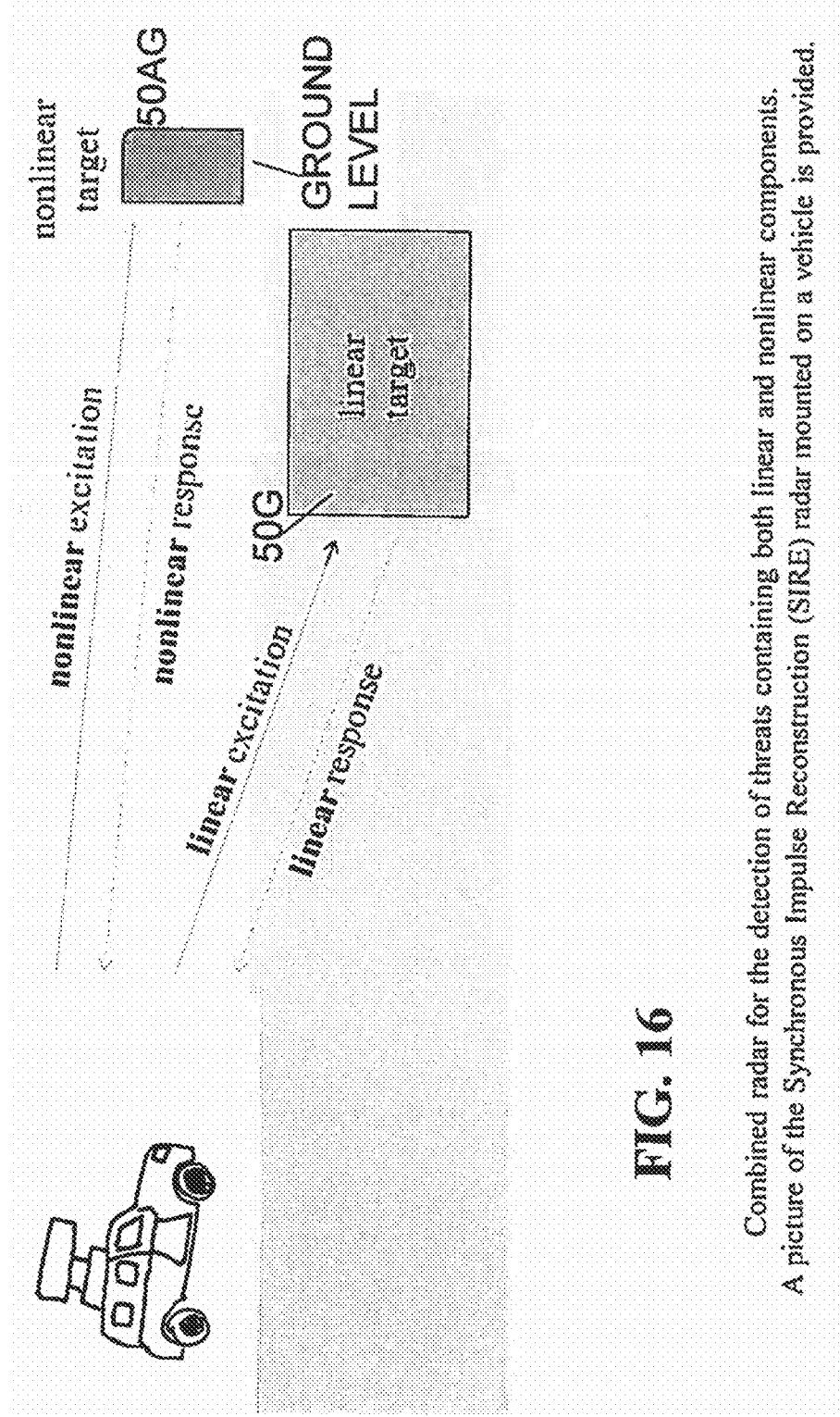
FIG. 16 is a depiction of combined radar for the detection of threats containing both linear (depicted by a picture of the Synchronous Impulse Reconstruction (SIRE) radar) and also depicting nonlinear components.

As first described in U.S. application Ser. No. 14/032,387, FIG. 16 is a depiction of combined radar for the detection of threats containing both linear (depicted by a picture of the Synchronous Impulse Reconstruction (SIRE) radar) and also depicting nonlinear components. Shown for example, FIG. 16 shows a linear target 50G below ground and a nonlinear target 50AG above ground.

Transmit Waveforms

The four waveforms selected for the linear/nonlinear transmitter are the single-tone pulse, the multitone pulse, the linear frequency-modulated (FM) chirp, and a stepped-frequency pulse.

A mathematical representation for a single-tone pulse produced by an arbitrary waveform generator (AWG) is $$V_{AWG} = A_{env} \cos(2\pi f_{pulse} t) s(t) \quad (B14)$$

with a carrier frequency $f_{pulse}$. The amplitude $A_{env}$ is computed from the power of the envelope of the pulse $P_{env}$ (in decibels referenced to 1 mW) by:

$$A_{env} = \sqrt{10^{P_{env}^{dBm}/10} \cdot 2(50\Omega)(10^{-3} V/mV)}. \quad (B15)$$

Figure 17:
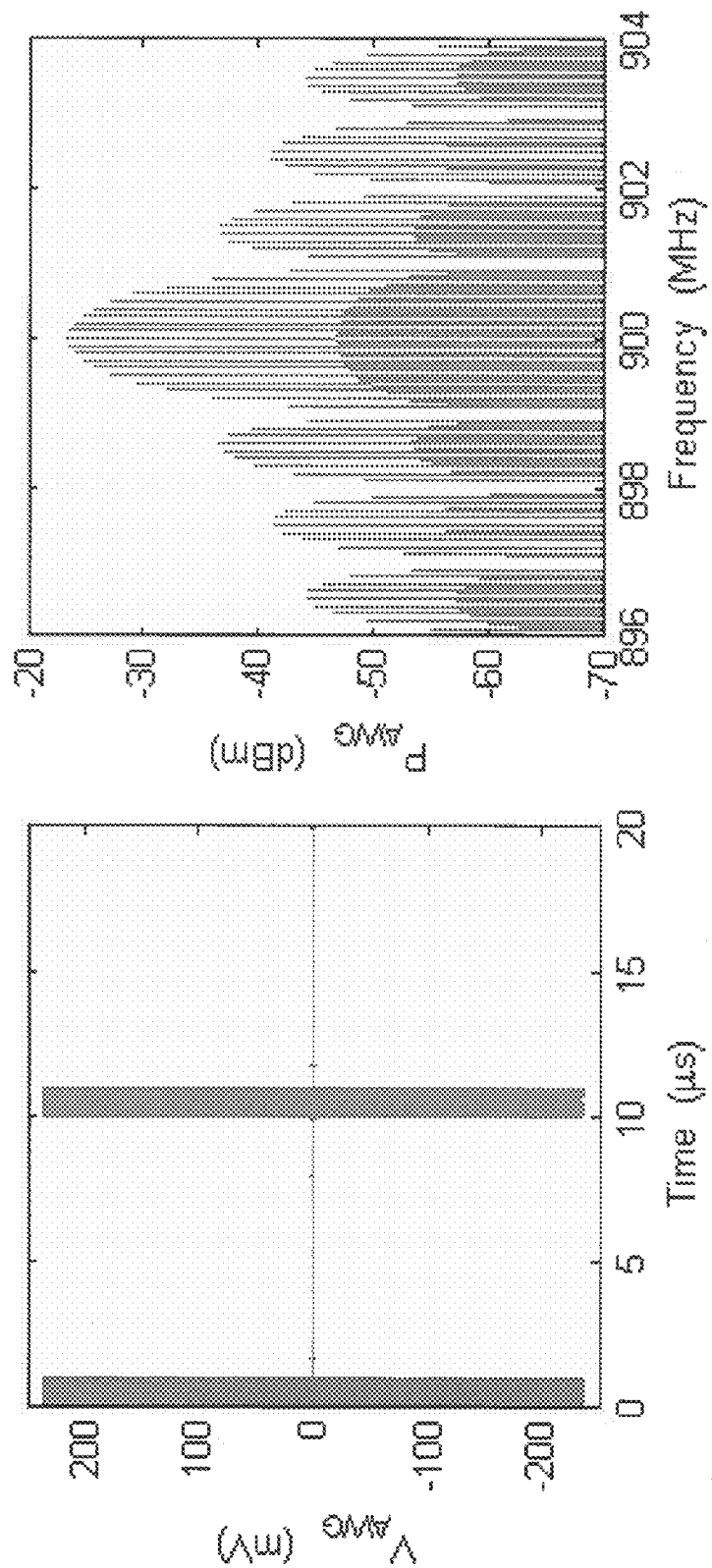
FIGS. 17-20 illustrate four waveforms selected for a preferred embodiment linear/nonlinear transmitter: the single-tone pulse, the multi-tone pulse, the linear frequency-modulated (FM) chirp, and the stepped-frequency chirp.

The pulse modulation is given by the switching waveform $s(t)$:

$$s(t) = u(t) - u(-D_c T) = s(t+T) D_c T = T_{env} \quad (B16)$$

which has a period T and a duty cycle $D_c$. The pulse is active during the time interval $T_{env}$. An example of an RF pulse generated by a Tektronix AWG7052 is given in FIG. 17. A Matlab function which generates a single-tone RF pulse is given in Appendix A.

It should be noted that (a) signals presented in the following description were captured in time by a Lecroy Wavemaster 8300A oscilloscope and in frequency by an Agilent N9342C spectrum analyzer; (b) the sampling rate of the 8300A oscilloscope was 20 GS/s, and the resolution bandwidth of the N9342C analyzer was 1 kHz; and (c) the amplitude of each waveform is less than $A_{env}$ computed by equation 15 due to the loss introduced by the 8-ft RG-58 Subminiature Version A (SMA) cable, which feeds each of the signal capture instruments.

Multitone Pulse

If, instead of a single RF carrier frequency, multiple frequencies are active during the pulse, a multitone pulse is generated:

$$V_{AWG} = A_{tone}\{\cos(2\pi \cdot f_1 \cdot t) + \cos(2\pi \cdot f_2 \cdot t) + \ldots + \cos(2\pi \cdot f_N \cdot t)\}s(t) \quad (B17)$$

which contains N frequencies given by $f_1, f_2, \ldots f_N$. In this representation, the amplitude of each tone is $A_{tone}$ and each tone begins at a common initial phase (for maximum peak-to-average ratio, which generates a maximum nonlinear response). Also, the tones are centered at $f_c$ and separated by $f_{space}$:

$$\frac{1}{N}\sum_{i=1}^{N} f_i = f_c \quad f_{i+1} - f_i = f_{space} \quad (B18)$$

Figure 18:
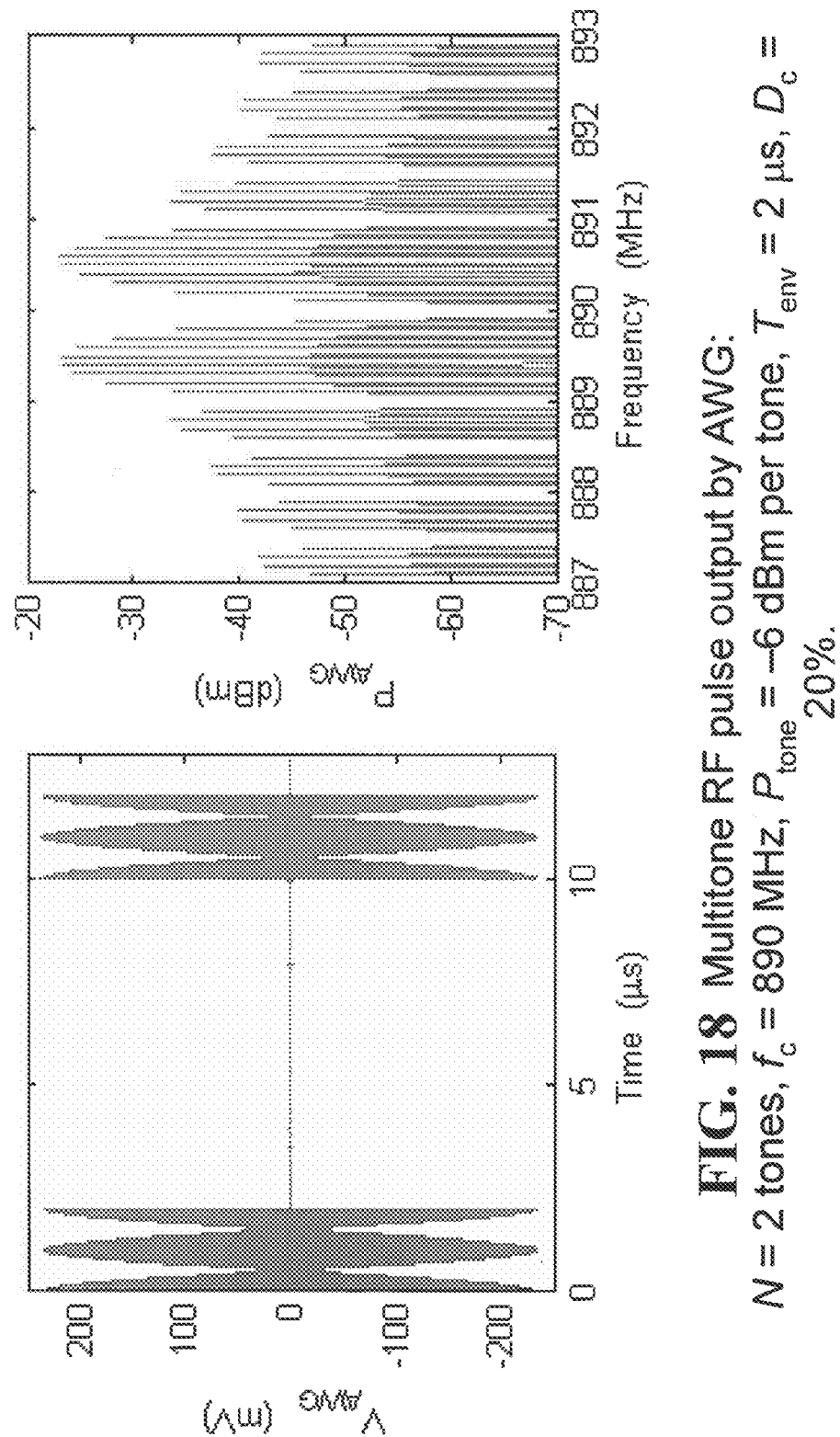

The active tones are again modulated by the on/off pulse waveform s(t). An example of a multitone pulse is shown in FIG. 18. A MATLAB function, which generates this waveform, is given in Appendix B.

Linear Frequency-Modulated Chirp Pulse

Figure 19:
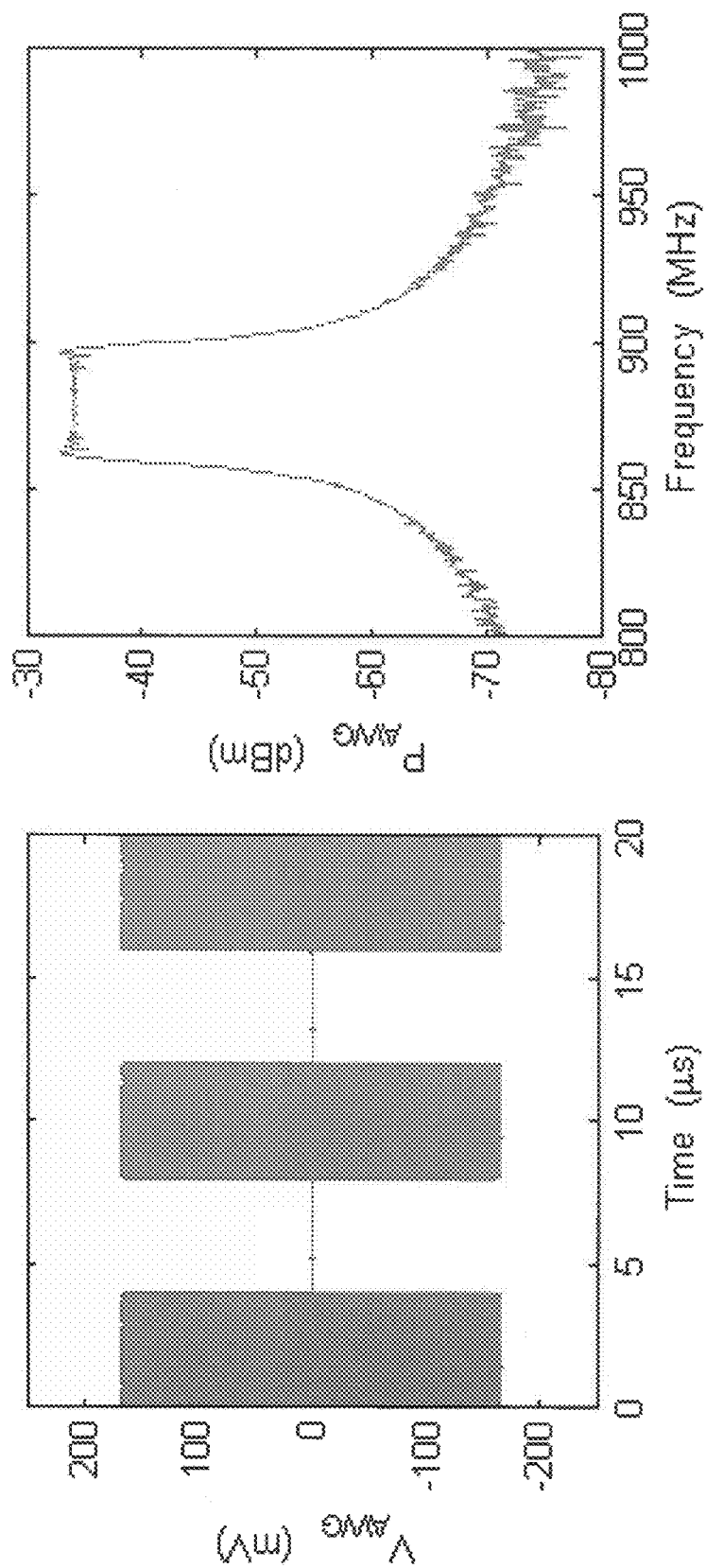

A pulse whose carrier frequency begins at $f_{start}$ and increases linearly to $f_{end}$ over the time interval $T_{env}$ is given by $$V_{AWG} = A_{env} \cos[2\pi \cdot (f_{start} + (k/2)t) \cdot t]s(t) k = (f_{end} - f_{start})/T_{env} \quad (B19)$$

where k is the linear chirp rate and $A_{env}$ is the amplitude of the pulse envelope. An example of a linear FM chirp pulse is shown in FIG. 19. A Matlab function which generates this waveform is given in Appendix C.

Stepped-Frequency Pulse

A chirp whose carrier frequency steps between discrete values can be represented by $$V_{AWG} = A_{env}\cos[2\pi \cdot f(t) \cdot t]s(t) \quad (B20)$$

$$f(t) = \begin{cases} f_{start} & 0 \le t < \Delta t \\ f_{start} + \Delta f & \Delta t \le t < 2\Delta t \\ f_{start} + 2\Delta f & 2\Delta t \le t < 3\Delta t \\ \ldots & \ldots \\ f_{end} - \Delta f & T_{env} - \Delta t \le t < T_{env} \end{cases} \quad \Delta t = \frac{T_{env}}{N_{steps}} \quad (B21)$$

where $N_{steps}$ is the number of steps, $T_{env}$ is the length of the stepped-frequency chirp, $A_{env}$ is the amplitude of the chirp, $\Delta f$ is the spacing in frequency between each step, and $\Delta t$ is the spacing in time between each step. It should be noted that this representation for the chirp is not phase-continuous, i.e. the phase of the waveform changes abruptly across each frequency transition.

Figure 20:
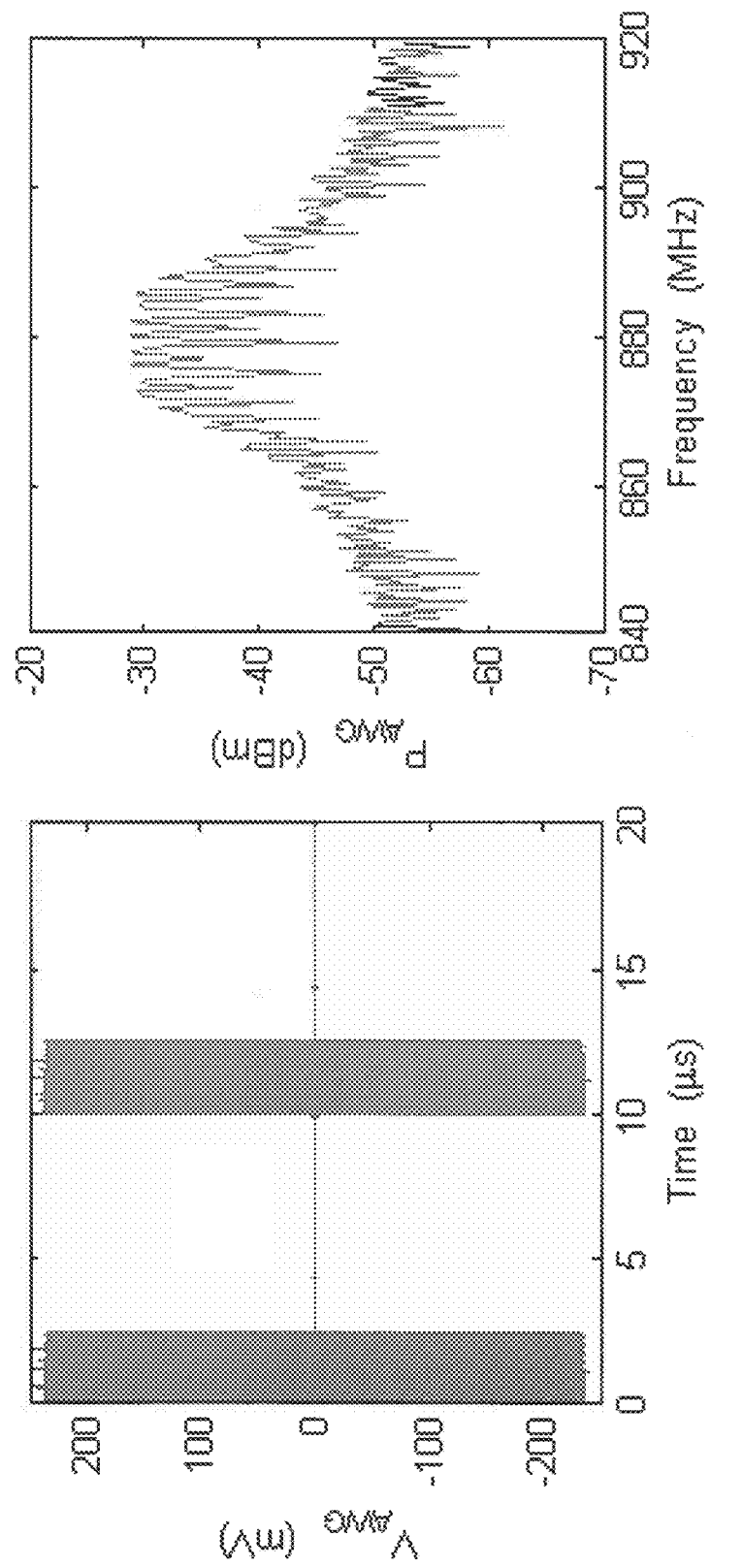

An example of a stepped-frequency chirp pulse is shown in FIG. 20. A Matlab function which generates this waveform is given in Appendix D.

Linear and Nonlinear Transceiver

An architecture having components common to both linear and nonlinear modes for transmitting and receiving radar waveforms is necessary to minimize the size, weight, and power of the combined radar system. A bench-top architecture for an alternate preferred embodiment combined radar transceiver is given in FIG. 21. However, the invention is not limited to the specific components of the bench-top architecture.

Figure 21:
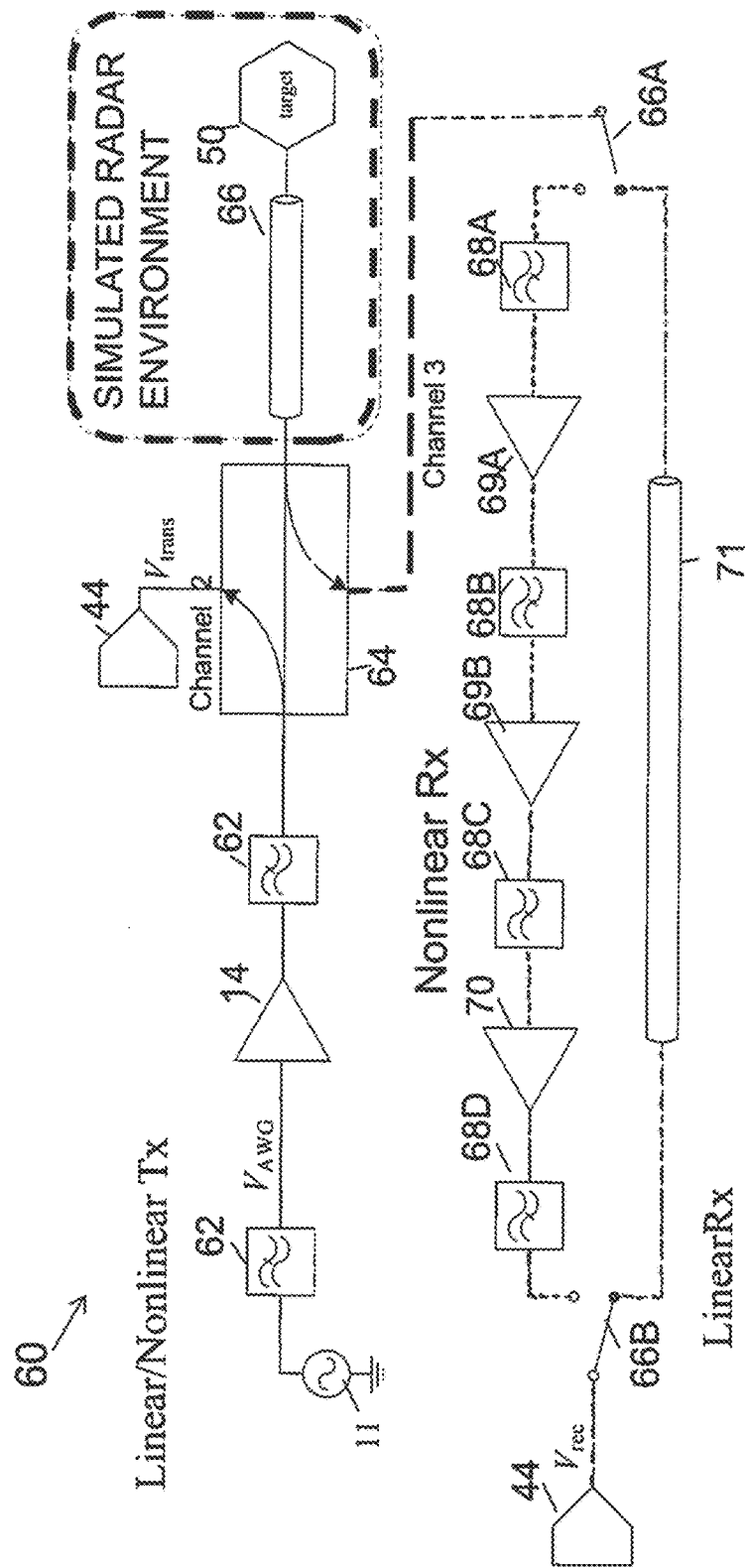
FIG. 21 is an illustration of an alternate preferred embodiment combined radar architecture where transmission from the radar and reception from the target is hardware simulated.

In this alternate embodiment (which includes a hardware simulation of the radar environment), first described in U.S. application Ser. No. 14/032,387, the signal generator 11 is both linear and nonlinear radar waveforms, which may be for example a Tektronix AWG7052. The low pass filters 62 (which may for example be MiniCircuits NLP-1000+ low-pass filters) are highly linear with a passband below 1 GHz and remove much of the transmitter (Tx)-generated nonlinear (harmonic) distortion. The amplifier 63, which may for example be a AR4W1000 amplifier, boosts the power of the AWG signal to a level sufficient to excite nonlinear responses from electronic targets. The dual-directional coupler 64, which may for example be a HP 778D, provides one port for sampling the forward transmit, Tx waveform (which may be monitored for example by a digital oscilloscope 44) and another port for sampling the reverse (receive, Rx) signal. The "Simulated Radar Environment" consists of 100 ft of SMA cable 16 (four 25-ft cables in series), terminated by an SMA-connectorized target 50A Two receive chains are selected by a pair of switches 66A, 66B, which may be for examples be Hittite HMC784MS8GE switches. Each switch 66A, 66B may be powered by 5 V from the 6-V/ 5-A port on an Agilent E3631A supply and controlled by 5 V/0 V from the ±25-V/1-A port. In FIG. 21, the "Linear Rx" chain is selected, and the signal is passed directly to the oscilloscope 44 through an SMA cable 71. Alternatively, the "Nonlinear Rx" chain may be selected. Along the nonlinear receiver path, the signal is filtered by four high-pass filters 68A-68D (which may be for example MiniCircuits VHF-1320+ high-pass filters having passbands above 1.32 GHz), to remove the linear response from capture and processing) and amplified by amplifiers 69A, 69B (which may be for example be two MiniCircuits PSA-5453+) and amplifier 70, which may for example be a MiniCircuits PSA-545+. Each amplifier is mounted on an evaluation board and powered by 3 V from another E3631A supply.

RF Signal Generation and Capture

Figure 22:
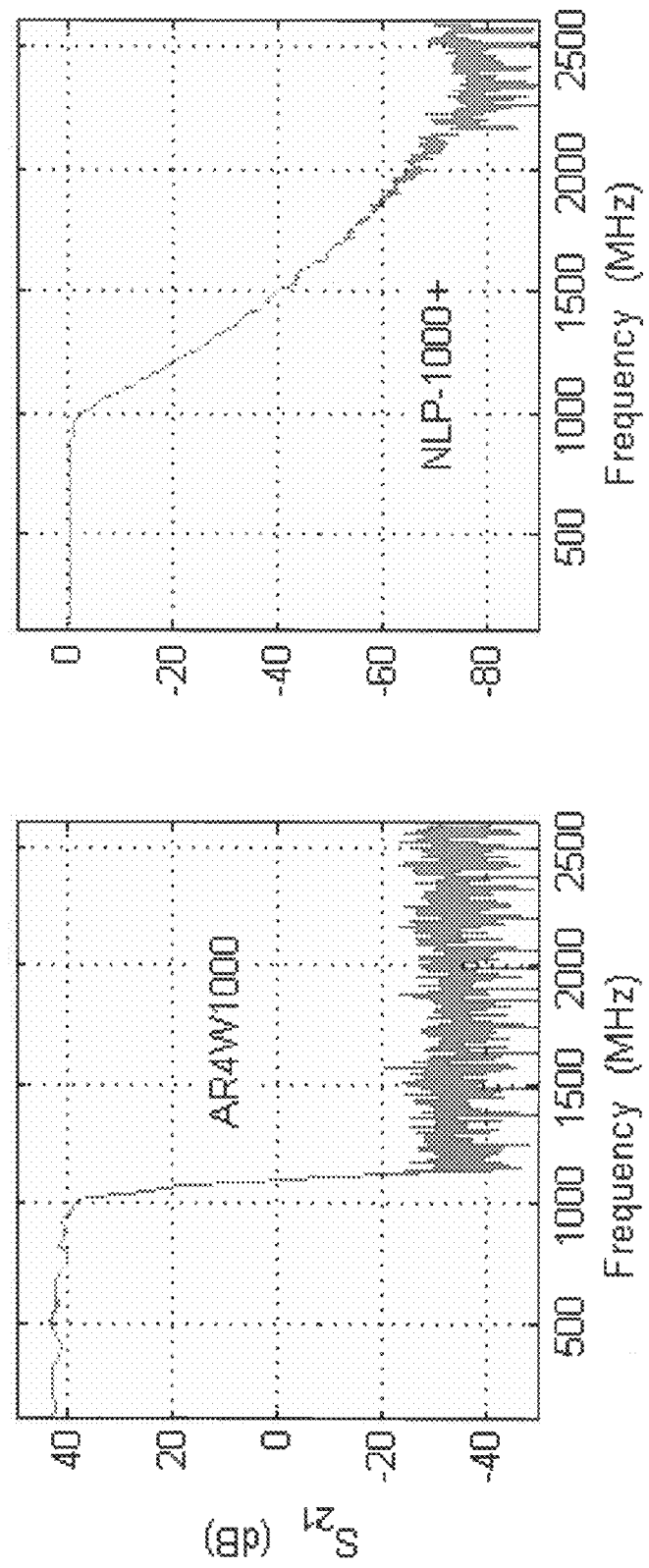
FIG. 22 is an illustration showing electromagnetic properties of the transmitter amplifier and low-pass filters.

As measured by an Agilent N9923A network analyzer and observed in FIG. 12, the amplifier 63 (AR4W1000) provides more than a 40-dB gain to the transmit signal. For nonlinear (harmonic) responses, each NLP-1000+ filter (62) attenuates Tx-generated distortion at frequencies above 1500 MHz by more than 40 dB. FIG. 22 is an illustration showing the signal at the transmitter amplifier 63 and low-pass filters 62

Figure 33A:
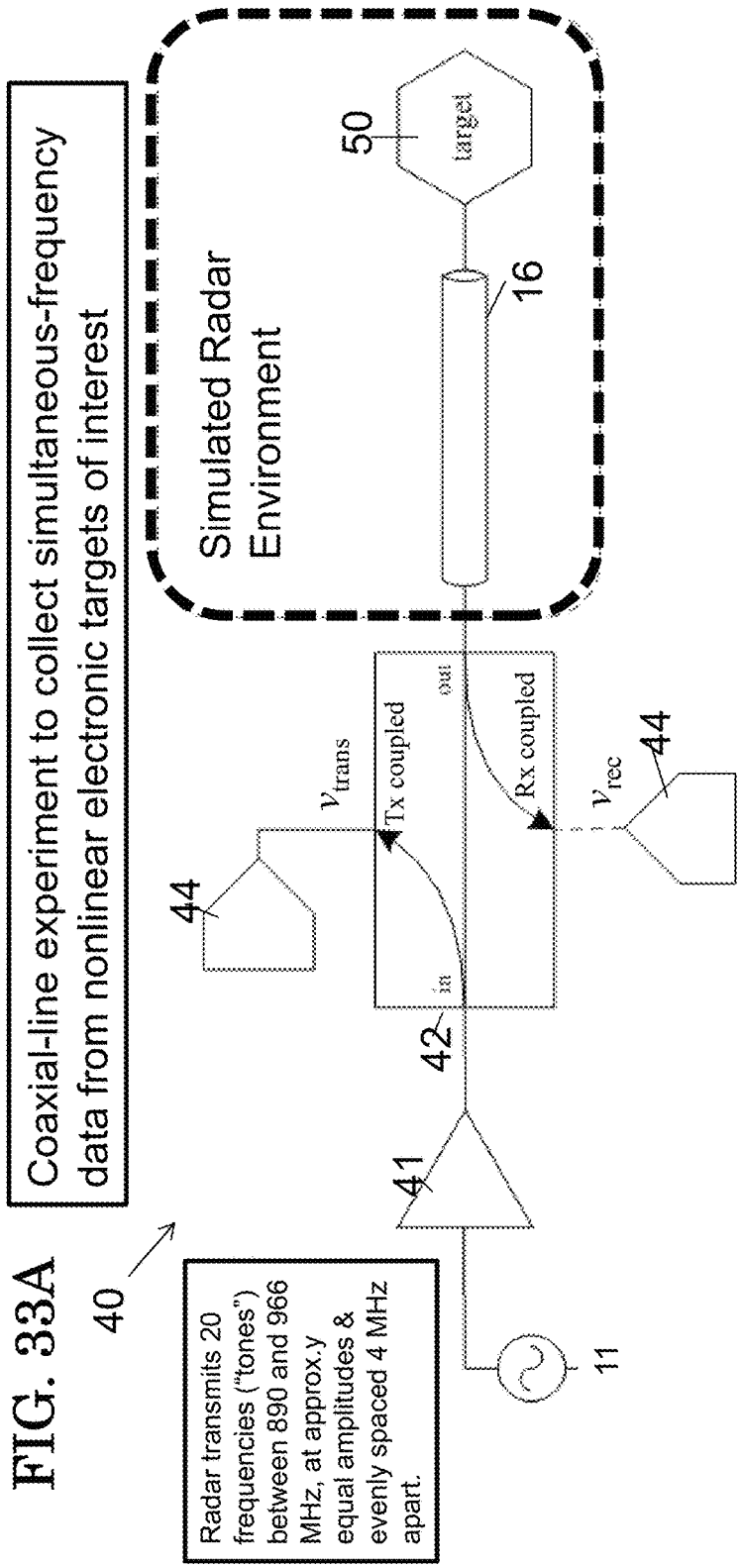
FIG. 33A illustrates an experimental/prototype set up used to collect simultaneous-frequency data. The radar environment is currently simulated in hardware using 51 ft of Megaphase F130 cable to mimic transmission over the air from the radar to an electronic target and reflection over the air back to the radar. The target 50 is a radio that has been connectorized (i.e., its antenna was removed and replaced).

As first described in U.S. application Ser. No. 14/032,387, and as seen in FIGS. 33A & B, illustrating signals relating to the directional coupler and linear/nonlinear receive chain, the Tx and Rx coupling from the 778D dual directional coupler is approximately −20 dB. Also, the nonlinear Rx chain (measured from one HMC784 "RF common" port to the other) passes signals to the 8300A with a gain of approximately 40 dB, whereas the linear Rx chain passes signals through with a loss under 3 dB.

MATLAB Graphical User Interface

The AWG7052 generator 11, 8300A oscilloscope 44, and E3631A supplies are controlled via the General Purpose Interface Bus (GPIB). Communication is established using the Instrument Control Toolbox in MATLAB (v7.0.0.19920, R14). An example of a graphical user interface (GUI) for the combined-radar system is illustrated in FIG. 14 and was created using MATLAB's "guide" function. The script and functions that govern the operation of the GUI are given in appendices E through K.

As first described in U.S. application Ser. No. 14/032,387, using the upper panel as shown in FIG. 24, four different waveforms may be uploaded to the arbitrary wave generator 11 for transmission to the target. Using the lower panel as shown in FIG. 14, the signal from the target may be captured using the linear or nonlinear receive chain and processed accordingly. For the single-tone pulse, the user may choose the power of the RF pulse while it is active ($P_{env}$), the RF frequency ($f_{pulse}$), the time interval during which the pulse is active ($T_{env}$), and the pulse duty cycle ($D_c$). The "waveform name" is the designation that appears on the AWG after the waveform is uploaded and is selected for waveform playback.

For the linear FM chirp pulse, the user may choose the power of the chirp envelope ($P_{env}$), the frequency at which the chirp starts ($f_{start}$), the frequency at which the chirp ends ($f_{end}$), the time interval during which the frequency linearly changes from $f_{start}$ to $f_{end}$ ($T_{env}$), and the duty cycle of the waveform ($D_c$).

For the multitone pulse, the user may choose the number of tones (N), power per tone ($P_{tone}$), the frequency at which the tones are centered ($f_c$), the time interval during which the pulse is active ($T_{env}$), and the pulse duty cycle ($D_c$). The frequency separation between the tones ($f_{space}$) is automatically set to $1/T_{env}$, so that the shortest waveform necessary to achieve N, $f_c$, and $T_{env}$ with negligible frequency aliasing is uploaded to the AWG.

For the stepped-frequency waveform, the user may choose the power of the pulse envelope ($P_{env}$), the frequency at which the stepping starts ($f_{start}$), the frequency at which the stepping ends ($f_{end}$), the time interval during which the frequency steps from $f_{start}$ to $f_{end}$ ($T_{env}$), the step size ($\Delta f$), and the duty cycle of the waveform ($D_c$).

As first described in U.S. application Ser. No. 14/032,387, and as depicted in FIG. 21, the sampled Tx signal is fed to channel 2 of the 8300A oscilloscope 44, and the sampled Rx signal is fed (through the linear/nonlinear receive chain) to channel 3. The user chooses the voltage scale per channel, the total data collection time per trace, and the number of integrations (i.e., the number of data traces averaged before capture).

The user chooses the trigger level and source for signal capture with a consistent time reference. In the experimental setup, Marker 1 from the arbitrary waveform generator 11 is fed to the External trigger port on the oscilloscope 44.

The user chooses the receiver (Rx) mode and types a name for the native MATLAB (MAT) file that will store the time-sampled Tx and Rx voltage vectors.

Upon pressing the "Upload . . . " button inside of one of the upper subpanels, the appropriate waveform is generated and sent to the arbitrary waveform generator 11. A new figure panel (not shown) appears, which plots the software-generated waveform in frequency and time to confirm that the signal the user intended has been uploaded.

Upon pressing the "Capture . . . " button inside the lower subpanel, the corresponding signal received from the target is recorded by the oscilloscope and processed in MATLAB. A second figure panel (shown in section 4) appears, which plots the raw Tx and Rx data in time. A third figure panel (also shown in the following Wireline Experiments section) appears, which plots the correlation of the Tx and Rx voltage samples.

Wireline Experiments

Several experiments were conducted in order to demonstrate the performance of the alternate preferred embodiment combined-radar transceiver 60 using three different waveforms (pulse, linear chirp, stepped-frequency), two Rx modes (linear and nonlinear), two hardware-simulated linear targets (open-circuit, matched load), and one hardware-simulated nonlinear target (Family Radio Service [FRS] radio).

Linear Rx, Chirp Waveform, Open-Circuit Target

Figure 25A:
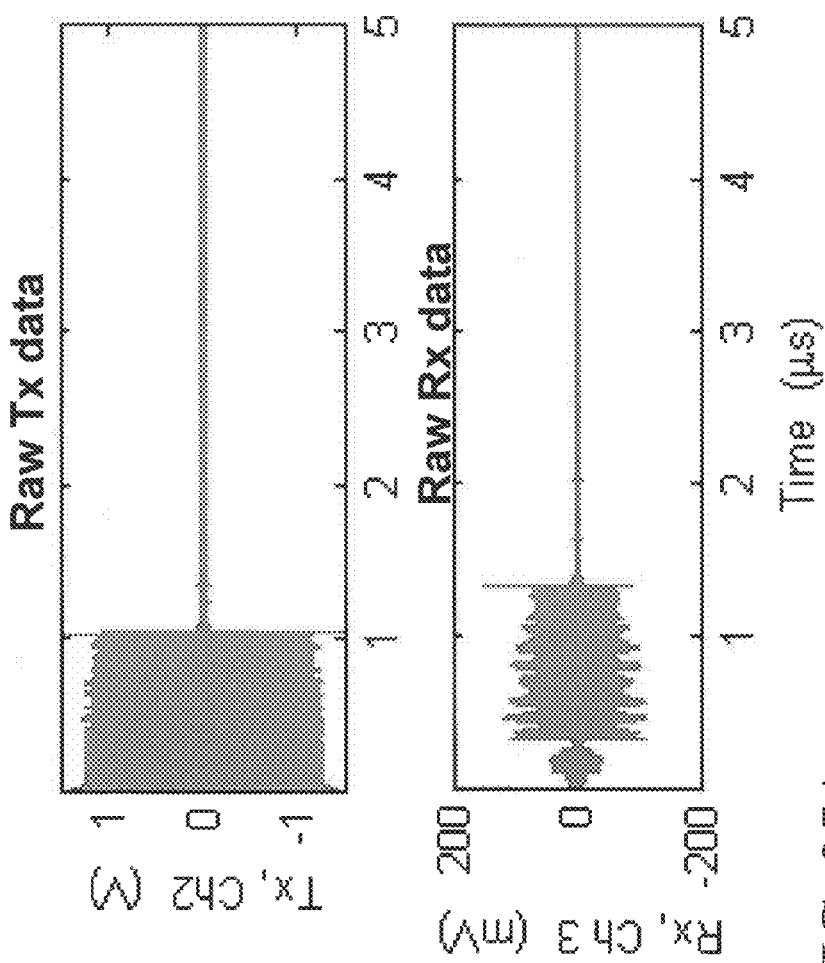
FIG. 25A illustrates a plot of the raw Tx and Rx data from a preferred embodiment of FIG. 21 showing the result of linear data capture and processing when reflecting a chirp from a simulated radar target, in this case an open circuit.

As first described in U.S. application Ser. No. 14/032,387, FIG. 25A illustrates a plot of the raw Tx and Rx data from the embodiment of FIG. 21 showing the result of linear data capture and processing when reflecting a chirp from a hardware-simulated highly-reflective linear target, in this case an open circuit. The specifications for FIGS. 25A, 25B are: Radar data, chirp Tx waveform, linear Rx mode, open-circuit target: fstart=880 MHz, fend=920 MHz, Penv=0 dBm, Tenv=1 µs, Dc=10%. FIG. 25B plots the cross correlation of the Tx and Rx signals (of FIG. 25A):

$$[V_{trans} * V_{rec}](t) = \int_{-\infty}^{+\infty} V_{trans}(t) \cdot V_{rec}(t+\tau) d\tau \quad \text{(B22)}$$

where time has been mapped to distance using the velocity of propagation of an RF signal in the MiniCircuits CBL-25FT coaxial lines (dielectric constant $\varepsilon_r \approx 2.1$):

$$d = \frac{1}{2} \cdot t \cdot \frac{c}{\sqrt{\varepsilon_r}} = \left(\frac{t}{2}\right)\left(\frac{3 \cdot 10^8 \text{ m/s}}{\sqrt{2.1}}\right)\left(\frac{3.28 \text{ ft}}{1 \text{ m}}\right) = \left(0.34 \frac{\text{ft}}{\text{ns}}\right) t. \quad \text{(B23)}$$

A factor of ½ is used in equation B-23 because the distance plotted is half the round-trip distance from the transmitter (i.e. from the coupler output port) to the target (i.e. to the end of the 100-ft coaxial line) to the receiver (i.e. back to the coupler output port).

Cross-correlation is a basic form of target ranging. The peak of $V_{trans} * V_{rec}$ (as a function of distance) indicates the distance from the transmitter to the target.

Figure 23:
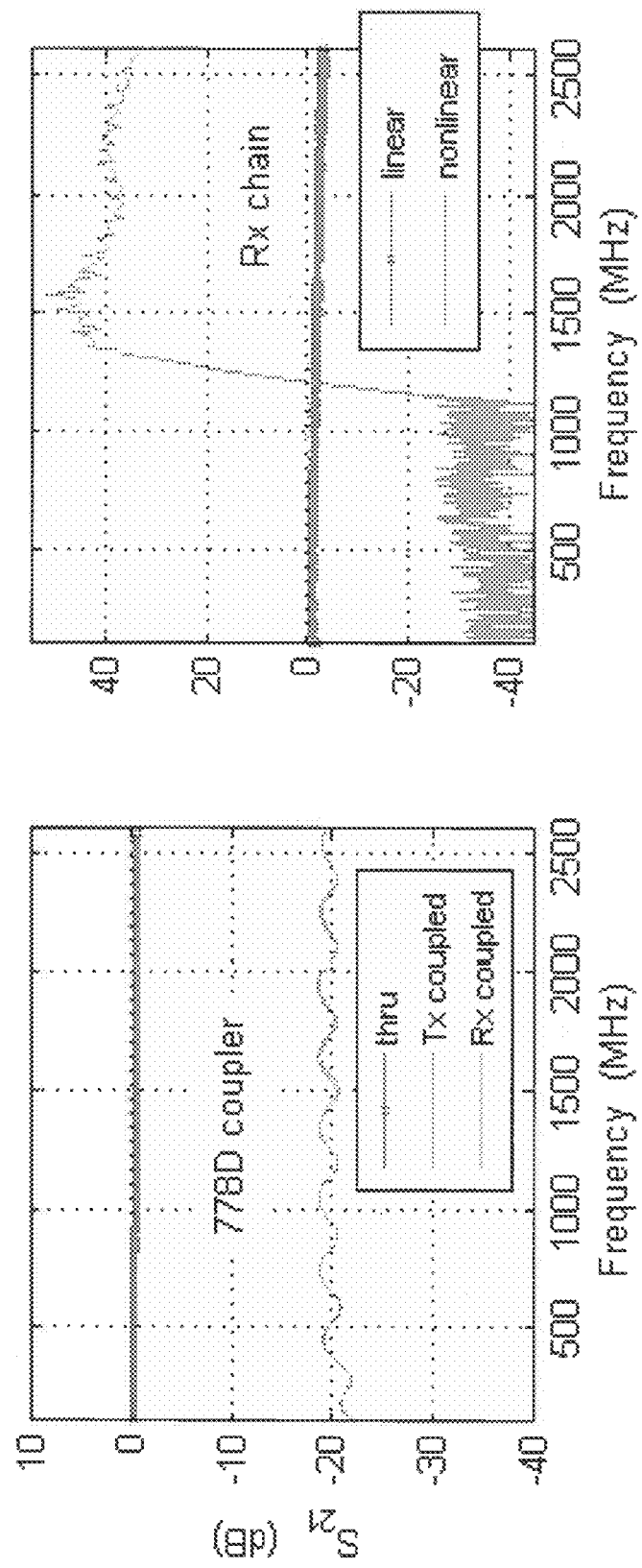
FIG. 23 is an illustration showing electromagnetic properties of the directional coupler and linear/nonlinear receiver chain.

As first described in U.S. application Ser. No. 14/032,387, in FIG. 25A, a relatively constant-amplitude pulse is visible in the sampled Tx channel, and a distorted pulse is visible in the sampled Rx channel. These waveforms are expected, given the frequency-dependent characteristic of the coupler in FIG. 23. In FIG. 25B, a sinc function is visible along with several sidelobes. This shape is expected from the cross correlation of two chirps. The peak of the sinc function is visible at a distance of d=101 ft. The calculated distance is very close to the length of the coaxial line (and slightly higher because the calculation does not account for the length of the Rx chain).

Linear Rx, Chirp Waveform, Open Circuit Versus Matched Load

Figures 26A, 26B:
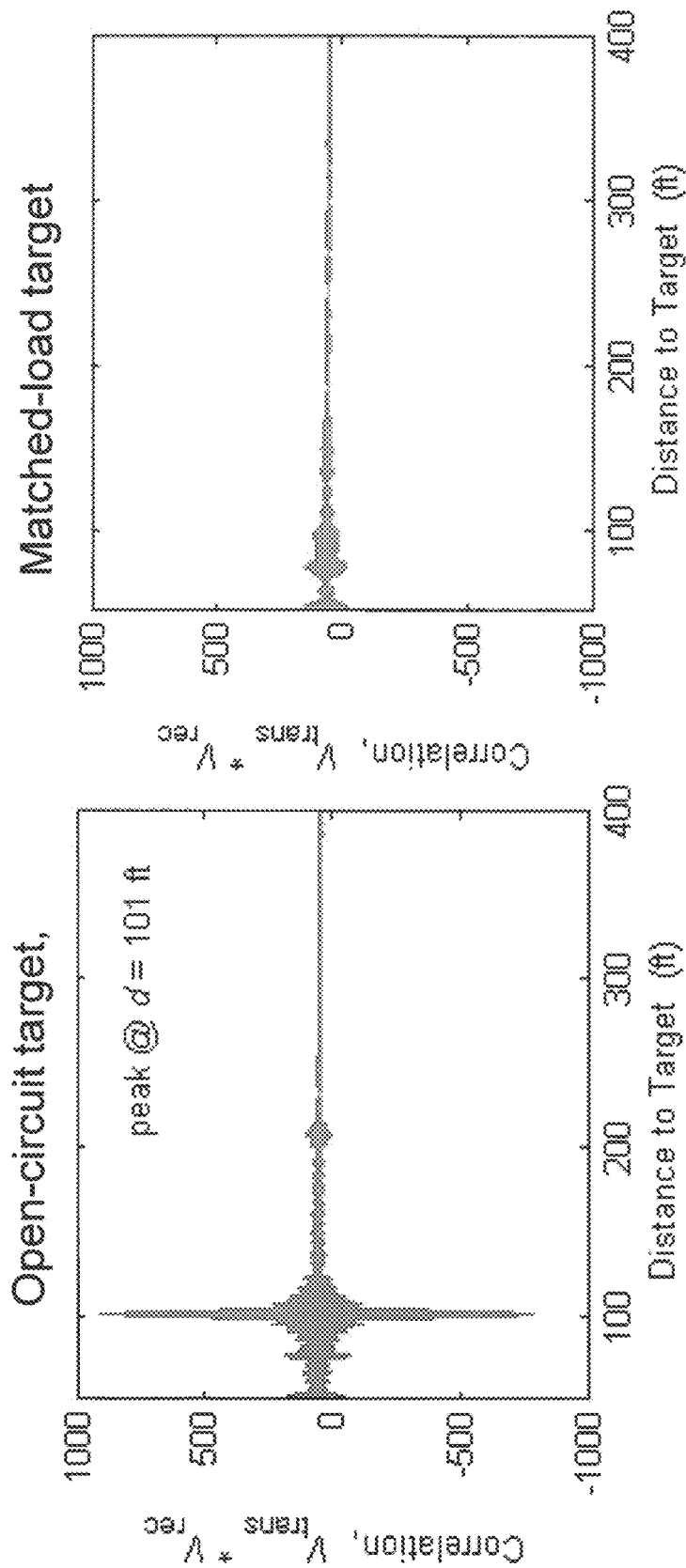
FIG. 26A illustrates the result of the cross-correlation when reflecting a chirp with a wider bandwidth than that of Linear Rx, Chirp Waveform from an open circuit (raw data, complete time scale).
FIG. 26B illustrates the correlation when receiving the same waveform in the absence of a radar target; minimal reflection is hardware-simulated with a matched (50-Ω) load (raw data, zoomed-in time scale).

FIG. 26A shows the result of the cross-correlation when reflecting a chirp with a wider bandwidth than that of Linear Rx, Chirp Waveform from a hardware-simulated highly-reflective linear target, in this case an open circuit. FIG. 26B illustrates the correlation when receiving the same waveform from a hardware-simulated absent target, in this case a matched (50-Ω) load. Two results are notable: (1) the peak is sharper when the bandwidth of the Tx waveform is wider, and (2) very little signal reflects from the matched load. Both results are expected and indicate proper operation of the transmitter and the linear receive chain. For FIGS. 26A & 26B the specifications are Radar data, chirp Tx waveform, linear Rx mode: fstart=860 MHz, fend=940 MHz, Penv=0 dBm, Tenv=1 µs (time interval during which the frequency steps from $f_{start}$ to $f_{end}$), Dc=10%, (FIG. 26A illustrates an open-circuit target, FIG. 26 B illustrates a matched-load target).

Nonlinear Rx, Pulse Waveform, Nonlinear Target

Figure 27:
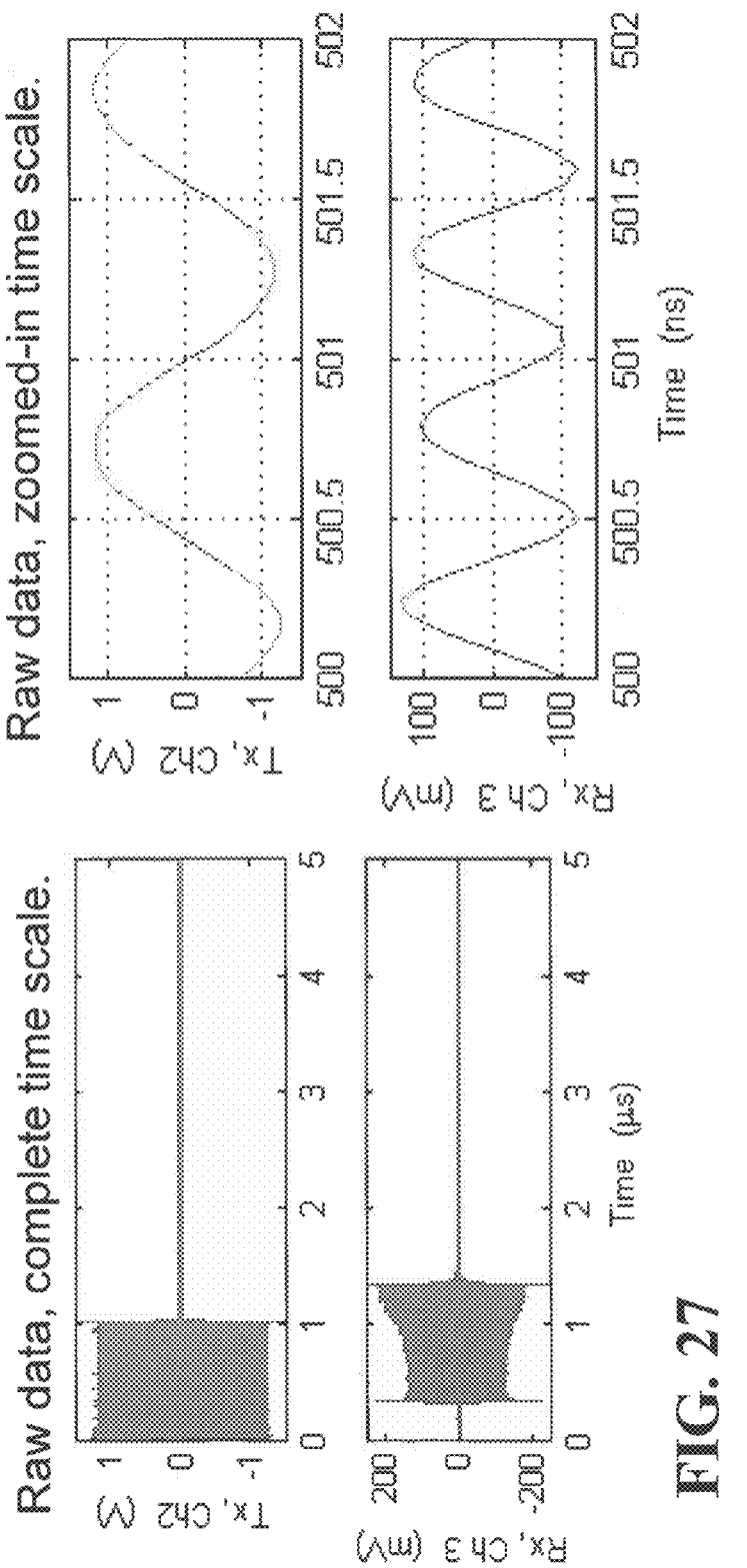
FIG. 27 illustrates the result of the nonlinear data capture (Radar data, RF pulse Tx waveform, linear Rx mode, FRS radio target: $f_{pulse}$=900 MHz, $P_{env}$=0 dBm, $T_{env}$=1 µs, $D_c$=10%) when reflecting an RF pulse from a hardware-simulated nonlinear target: a Motorola T4500 whose antenna has been replaced by an SMA end-launch connector. A 13-dB attenuator is placed between the end of the coaxial line and the FRS radio. The left side of FIG. 27 plots the raw Tx and Rx data along a 5-µs time scale. The right side plots the same raw data along a 2-ns time scale between t=500 ns and t=502 ns.

As first described in U.S. application Ser. No. 14/032,387, FIG. 27 shows the result of the nonlinear data capture when reflecting an RF pulse from a hardware-simulated nonlinear target: a Motorola T4500 whose antenna has been replaced by an SMA end-launch connector. The specifications for FIG. 27 are: Radar data, RF pulse Tx waveform, linear Rx mode, FRS radio target: $f_{pulse}$=900 MHz, $P_{env}$=0 dBm, $T_{end}$=1 μs, $D_c$=10%. A 13-dB attenuator is placed between the end of the coaxial line and the FRS radio. The left side of FIG. 27 plots the raw Tx and Rx data along a 5-μs time scale. The right side plots the same raw data along a 2-ns time scale between t=500 ns and t=502 ns.

As first described in U.S. application Ser. No. 14/032,387, it is not apparent from FIG. 27 (left side) that the transceiver is detecting the nonlinear response from the target. In the right side of FIG. 27, however, the observed response is clearly nonlinear, because the frequency of the received signal (1800 MHz) is twice that of the transmitted signal (900 MHz).

Nonlinear Rx, Stepped-Frequency Waveform, Nonlinear Target

Figure 28:
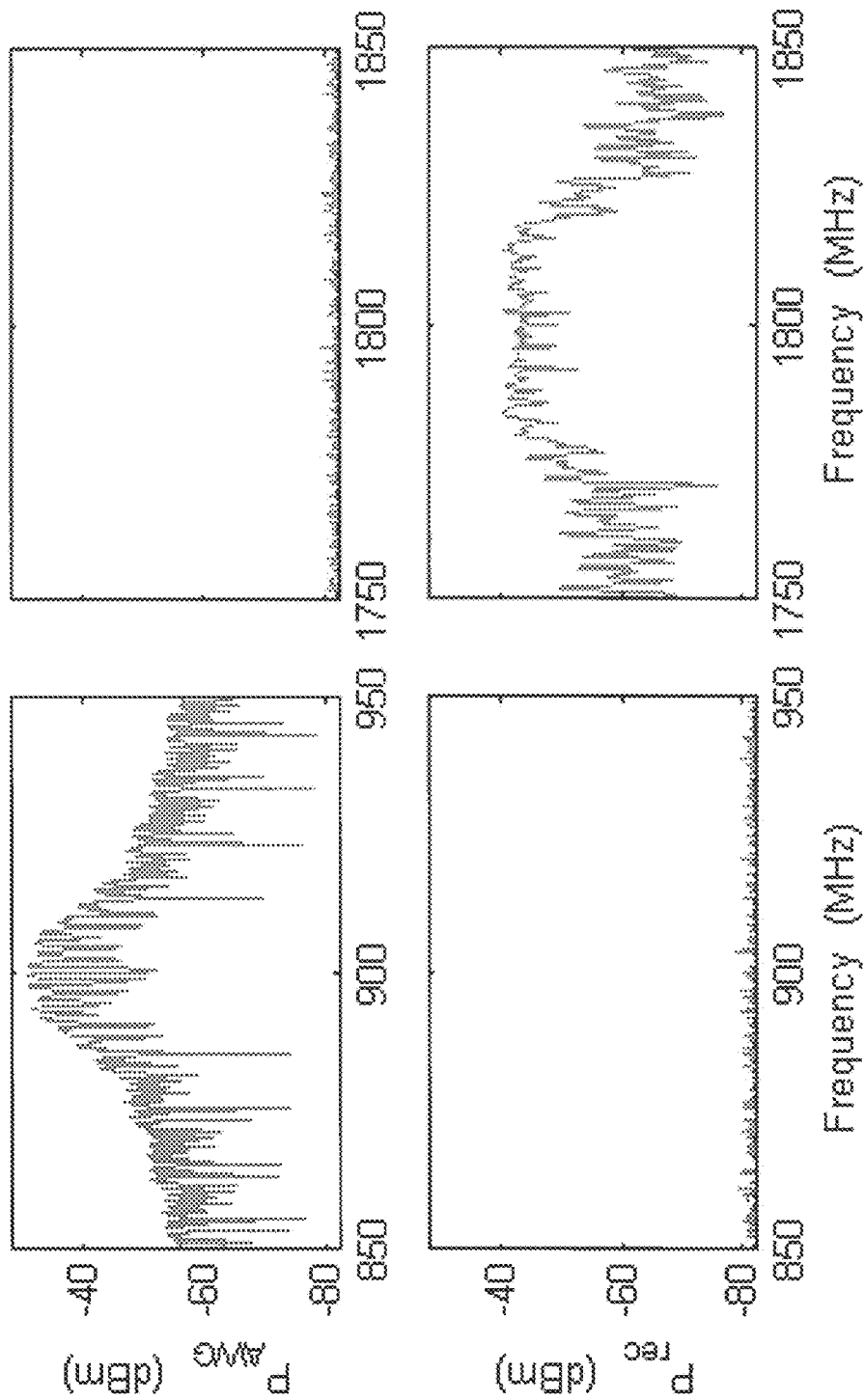
FIG. 28 illustrates plots for a stepped-frequency waveform and the FRS radio target.

As first described in U.S. application Ser. No. 14/032,387, nonlinearity is also visible in the frequency domain when the Tx and Rx signals are captured with a spectrum analyzer. FIG. 28 provides such captures for a stepped-frequency waveform and the FRS radio. The signal output from the arbitrary waveform generator 11 and filtered by a NLP-1000+) is plotted above and the received spectrum is plotted below. For $P_{AWG}$, all of the spectral content is centered at f=900 MHz and no spectral content exists near 2f=1800 MHz. For $P_{rec}$, all of the spectral content is centered at 2f=1800 MHz and no spectral content exists near f=900 MHz.

Nonlinear Rx, Chirp Waveform, Nonlinear Target

Figure 29:
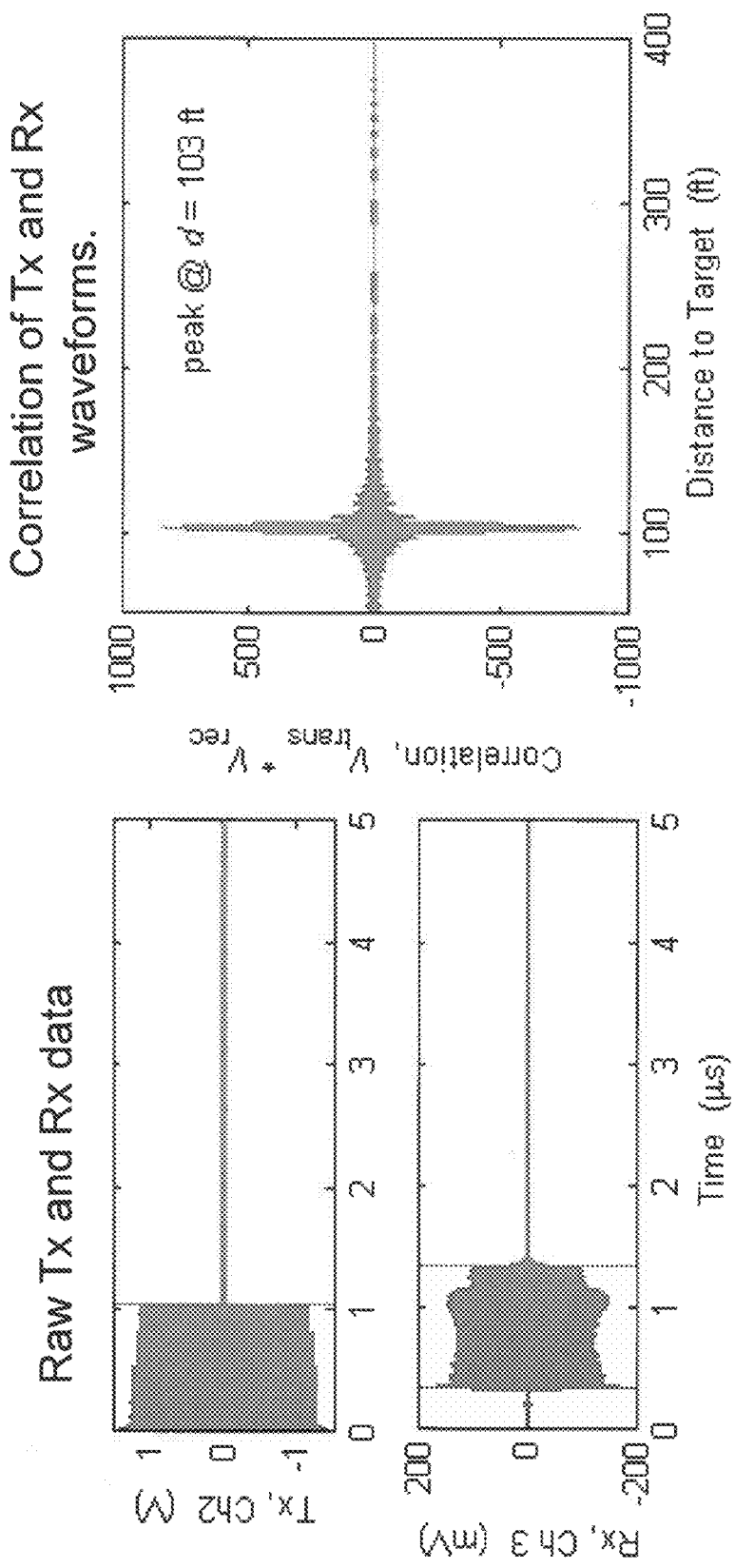
FIG. 29 illustrates a plot that shows the result of the nonlinear data capture and processing when reflecting a chirp from the FRS radio.

As first described in U.S. application Ser. No. 14/032,387, FIG. 29 shows the result of the nonlinear data capture and processing when reflecting a chirp from the FRS radio. FIG. 29 (left) plots the raw Tx and Rx data. FIG. 29 (right) plots the cross correlation of the Tx and Rx signals:

$$[V_{trans} * V_{rec}](t) = \int_{-\infty}^{+\infty} V'_{trans}(t) \cdot V_{rec}(t+\tau) d\tau \quad \text{(B24)}$$

where the Tx signal used for the correlation is a filtered $2^{nd}$ harmonic of the captured $V_{trans}$:

$$V'_{trans}(t) = h_{BPF}(t) * V_{trans}^2(t) \quad \text{(B25)}$$

and $h_{BPF}$ is a bandpass filter with passband edges $f_L=3f_c/2$ and $f_U=5f_c/2$ with $f_c=(f_{start}+f_{end})/2$. FIG. 29 illustrates the radar data results for a linear chirp Tx waveform, nonlinear Rx mode, FRS radio target, starting frequency $f_{start}$=880 MHz, ending frequency $f_{end}$=920 MHz, $P_{env}$=0 dBm, $T_{env}$=1 μs, $D_c$=10%.

A sinc function is again visible, centered at d=103 ft. This distance is longer than d=101 ft measured previously because the nonlinear Rx chain contains slightly more propagation delay (through the filters and amplifiers) than the linear Rx chain (SMA cable, pass-through).

Nonlinear Rx Chirp Waveform, Nonlinear Vs. Open-Circuit Target

As first described in U.S. application Ser. No. 14/032,387, the nonlinear Rx chain was tested against a purely linear target in order to demonstrate that the transceiver does not indicate detection if the target is linear, and the radar is listening for a nonlinear response. FIG. 30 gives the result of this test, which is performed with a chirp waveform.

From FIG. 30 it is clear that the radar registers a detection (at d=103 ft) when the target is nonlinear and the Rx is expecting a nonlinear response. From FIG. 30 (right side, open circuit target) it is clear that the nonlinear Rx chain does not register a detection when the target is linear. FIG. 30 illustrates the radar data results for a chirp transmission waveform, nonlinear Rx mode, starting frequency $f_{start}$=890 MHz, ending frequency $f_{end}$=910 MHz, $P_{env}$=0 dBm, $T_{env}$=1 ms, $D_c$=10%.

From the above it can be concluded that the alternate embodiment first described in U.S. application Ser. No. 14/032,387 combined-radar transceiver enables basic target ranging in both linear and nonlinear (harmonic) receive modes. The transceiver was constructed using an arbitrary waveform generator 11 as the signal source, a high-speed digitizing oscilloscope 44 as the signal capture device, and commercial off-the-shelf (COTS) components for the radar front-end (amplification, filtering, and switching). A 100-ft length of SMA cable 16 terminated in an open circuit simulated a linear radar target; the same cable terminated in an SMA-connectorized FRS radio simulated a nonlinear radar target. A MATLAB GUI was developed in order to control the transceiver remotely. The associated script and helper functions are provided in the appendices. Ranging to the target was demonstrated experimentally using RF pulses, linear FM chirps, and stepped-frequency waveforms.

The embodiment first described in U.S. application Ser. No. 14/032,387, combines linear radar with nonlinear radar. Linear radar detects targets whose permittivity contrasts with that of the background media; detection is best when the physical dimensions of the target are near to or greater than the wavelength of the incident radiation. Nonlinear radar detects targets containing nonlinear junctions, regardless of physical size, whose RF properties convert incident radiation at a set of probe frequencies to reflected radiation at a set of completely different frequencies. The key advantage of the combined linear and nonlinear radar is that it detects both of these target sets. For a given transmitted wavelength $\lambda_{trans}$, the combined radar detects linear targets whose physical size is near to or greater than $\lambda_{trans}$ as well as nonlinear targets that can be much smaller than $\lambda_{trans}$.

The Synchronous Impulse Reconstruction (SIRE) radar implements a wideband impulse transmit waveform, multiple transmit and receive antennas, and signal processing which creates synthetic aperture images. To date, the SIRE radar has demonstrated standoff detection of metallic and dielectric surface targets whose volume is at least 200 in$^3$ (see, for example M. Ressler, L. Nguyen, F. Koenig, D. Wong, and G. Smith, "The Army Research Laboratory (ARL) Synchronous Impulse Reconstruction (SIRE) forward-looking radar," in *Proc. SPIE*, pp. 656105(1-12), April 2007), herein incorporated by reference as though fully rewritten herein, buried dielectric targets whose volume is at least 1 ft$^3$, and people walking inside buildings.

The embodiments of FIGS. 14 & 21, a combination of linear wideband and nonlinear narrowband technology, enables a single radar to detect a variety of threats: targets that produce a linear response, targets that produce a nonlinear response, and targets that produce both. Some threats contain components whose permittivity contrasts substantially with that of the emplacement; such is the case with many threats that are buried. The embodiments of FIGS. 14 & 21 permit reception of a subsurface linear radar response from an area whose surface is otherwise undisturbed indicates the presence of a threat. Others threats contain metal contacts and semiconductor junctions whose nonlinear electromagnetic response contrasts with that of the emplacement; such is the case with RF electronics. The embodiments of FIGS. 14 & 21 also permit reception of a nonlinear radar response from an area that does not otherwise contain electronics indicates the presence of another class of threat. The combined radar is intended to detect both types of threats, collocated or not.

Often, threats contain dielectric as well as electronic components; hence, they will respond to both linear and nonlinear excitation. Either mode (linear/nonlinear) of the preferred embodiments shown in FIGS. 14 and 21 will detect the threat. By switching between the two modes, additional information about the threat is received and thus the probability that it is detected is improved. By combining linear and nonlinear radar capabilities, several additional applications are evident including detection of landmines, weapons, and miscellaneous ordnance, subsurface mapping (of pipes, electrical wires, and other manmade structures), vehicle tracking and navigation (with or without nonlinear tags), through-the-wall personnel tracking (with nonlinear tags), and performing counter-surveillance.

The preferred embodiments of FIGS. 14 and 21 enable detection of targets whose permittivity contrasts substantially with that of the emplacement; such is the case with many threats that are buried. Another class of threats contains metal contacts and semiconductor junctions whose nonlinear electromagnetic response contrasts with that of the emplacement; such is the case with RF electronics. Linear radar is a detection technique well-suited for targets whose permittivity contrasts with that of the background media, and whose physical dimensions are near to or greater than the wavelength of the incident radiation. Nonlinear radar is another technique, well-suited for detecting targets containing electronics, regardless of physical size, whose RF properties convert incident radiation at a set of probe frequencies to reflected radiation at a different set of frequencies. As first described in U.S. application Ser. No. 14/032,387, the preferred embodiments FIGS. 14 and 21 combine linear and nonlinear radar so as to detect a set of targets greater than either radar can detect alone. The embodiments FIGS. 14 and 21 first described in U.S. application Ser. No. 14/032, 387, enable reception of a subsurface linear radar response or nonlinear from an area whose surface is otherwise undisturbed so as to indicate the presence of a threat. By switching between the linear and nonlinear radar modes, either type of threat is detected. For targets that contain both linear and nonlinear components, switching between the two radar modes provides additional information and the probability of detection is improved.

Instantaneous Stepped Frequency System

System Definition

The present invention comprises a system for instantaneously generating non-linear, stepped frequency radar target signatures through the exploitation of intermodulation products. Non-linear targets of interest produce these intermodulation products when interrogated with a waveform comprising multiple, simultaneously transmitted frequencies. By utilizing a novel, constrained multi-tone waveform, the information is provided by stepped-frequency systems in a fraction of the time relative to preexisting systems.

A preferred embodiment of the present invention enables not only the detection, but also the localization of targets by exploiting both magnitude and phase information available with each intermodulation (intermod) product. The use of intermod products enables collection of frequency domain samples that are more finely spaced than those produced by a stepped-frequency system with the same transmitted frequency step size. Note that the non-linear, stepped-frequency radar considers the harmonics of each transmitted frequency, so the received frequency spacing scales with the number of the received harmonic. In addition, all of the received frequencies in a preferred embodiment system are collected simultaneously, resulting in a reduction of time required for data collection. This "time savings" (i.e., the number of received intermodulation products) is proportional to the number tones in the transmitted, multi-tone waveform. Hence, the preferred embodiment system is capable of implementing both the ranging function of the stepped-frequency system and the classification function of the current intermod-based system. The appropriate phase relationships between transmitted multi-tone frequencies is determined by the waveform generator. Hence the measurement of a reference phase at each frequency step is no longer necessary. Finally, multitone waveforms have high peak-to-average ratio which are advantageous for generating non-linear responses.

As to the basic premise of the design of a preferred embodiment, typically non-linear radars currently under development exploit non-linear target responses by considering either: (i) the harmonic responses to individually transmitted frequencies (i.e., "stepped-frequency" or "chirp" waveforms) or (ii) the relative magnitude of intermodulation responses excited by the simultaneous transmission of multiple frequencies (i.e. "multi-tone" waveforms). A preferred embodiment of the present invention enables the simultaneous implementation of the ranging capability of stepped-frequency systems and the classification capability of multi-tone systems. Since the multi-tone paradigm enables the instantaneous collection of data at multiple frequencies, a preferred embodiment system is capable of collecting the same frequency data as the stepped frequency system, but in a shorter period of time.

A block diagram of a preferred embodiment InSteF system is shown in FIG. 31. A waveform generator creates the transmitted multi-tone waveform from a stored template. This waveform is then modulated to the desired band, amplified and transmitted. When it impinges on the non-linear target, it engenders a non-linear response as indicated by:

$$r = \sum_{p=1}^{\infty} a_p s^p \quad (C\text{-}1)$$

where, $$s = \sum_{i=1}^{N} s_i = \sum_{i=1}^{N} \cos(2\pi f_i t + \phi_i) \quad (C\text{-}2)$$

and $\alpha_p$ represents a scaling factor characteristic of a specific device for the non-linearity of order p.

From equations (C-1) and (C-2), it is clear that the non-linear response contains intermod products around harmonics of the transmitted multi-tone component frequencies. In the following, attention will be directed to intermod products resulting from a third-order nonlinearity. For example, if the multi-tone signal comprises frequencies between 900-960 MHz in 3 MHz steps, then the $3^{rd}$ order intermod terms in the nonlinear response (i.e., p=3 in (C-1)) would include frequencies from 2700 MHz-2880 MHz in 3 MHz steps. (Note that all of the intermod terms may be considered, not just harmonics of the multi-tone component frequencies.) These tones can then be extracted by the receiver chain and used to create the desired high resolution range (HRR) profiles.

The above example reveals that, when intermod products of order p are available, both the number of frequency domain samples in the receive band and the receive bandwidth itself increase with the order of the non-linearity. The frequency interval between the received intermod products, however, remains the same as the frequency interval between component frequencies of the transmitted multi-tone waveform. If N=1 in Equation (C-2) and multiple frequencies are transmitted sequentially, then the system operates as a conventional non-linear stepped frequency radar. In this case, the received frequency step size of the target response increases by a factor equal to the order of the non-linearity (i.e., p). Considering, for example, only the conventional, stepped frequency mode and using frequencies from the earlier example, it can be seen that the measured target response may include frequencies from 2700-2880 MHz but in 9 MHz steps (instead of in 3 MHz steps as is the case when intermod products are available). Note that an assumption has been made that sequential transmission of frequencies $f_i$ and reception of frequencies $f_i p$; hence, no intermod products are available. This indicates that if the transmitted frequency step size were not reduced by a factor of p, then the unambiguous range would be reduced by a factor of p for conventional stepped frequency operation. This reduction in unambiguous range could be eliminated, however, by decreasing the transmitted frequency step size by a factor of p, thereby maintaining the frequency step size of $\Delta$ in the non-linear, stepped frequency target response. In order to produce the same frequency sampling as in accordance with a preferred embodiment (InSteF), the conventional stepped-frequency system would have to transmit an additional (p−1) frequencies within each of the (N−1) intervals between original frequencies, $f_i$. This implies that transmission of an additional (p−1)(N−1) pulses would be required for the classical approach to obtain the same frequency measurements obtained from a single multi-tone pulse transmitted by a preferred embodiment (InSteF) system. Hence, a total of p(N−1)+1 conventional (sequential) stepped frequency pulses must be transmitted for each InSteF pulse, and the InSteF could achieve a corresponding increase in speed at the cost of increased instantaneous transmit and receive bandwidths.

As to the selection of intermodulation products, it is desirable to extract the set of intermodulation products for p=2, 3, etc. in such a way as to avoid introducing "gaps" (i.e. frequency samples with no data). For example, if there are samples from both p=2 and p=3, then one has a big "gap" between the highest intermod product for p=2 and the lowest intermod product for p=3. This sort of a "gap" introduces sidelobe artifacts into the high resolution range profile. For example, see FIG. 45. So it is desirable to have many frequency samples as possible (i.e., as large a bandwidth as possible), while avoiding having gaps. The target returns corresponding to intermodulation products for p=2 are preferred because they were larger than those for p=3. Within that set of frequencies (for p=2), samples were selected that were (qualitatively) well above the noise level. That is, as many samples as possible were selected. If one could go to higher values of p, then more frequency samples may be extracted. Unfortunately, the level (strength) of the intermodulation products decreases as p increases. The initial phases of the individual components of the multi-tone waveform should be identical. This ensures that the target range responses will be well concentrated (i.e., as large as possible). This could be viewed as a limitation on the phases of the constituent elements of the multi-tone waveform. FIGS. 37A-D illustrate how the target responses degrade when this requirement is not met.

The phase of the measured intermodulation products (produced by the non-linear target) progresses linearly as a function of frequency, potentially going through several cycles. Basically, the number of cycles through which the phase progresses corresponds to the target range (which is the location of the target peak following the Fourier transform). So, it is the "rate of change" of the phase (of the measured intermodulation products) that determines the target's range. The time interval at which all of the frequencies once again have the same phase corresponds to the unambiguous range. (Targets closer than this range can be distinguished from one another, but targets beyond this range cannot. Typically, the unambiguous range is much greater than the range over which target responses can be detected.)

Figure 32A:
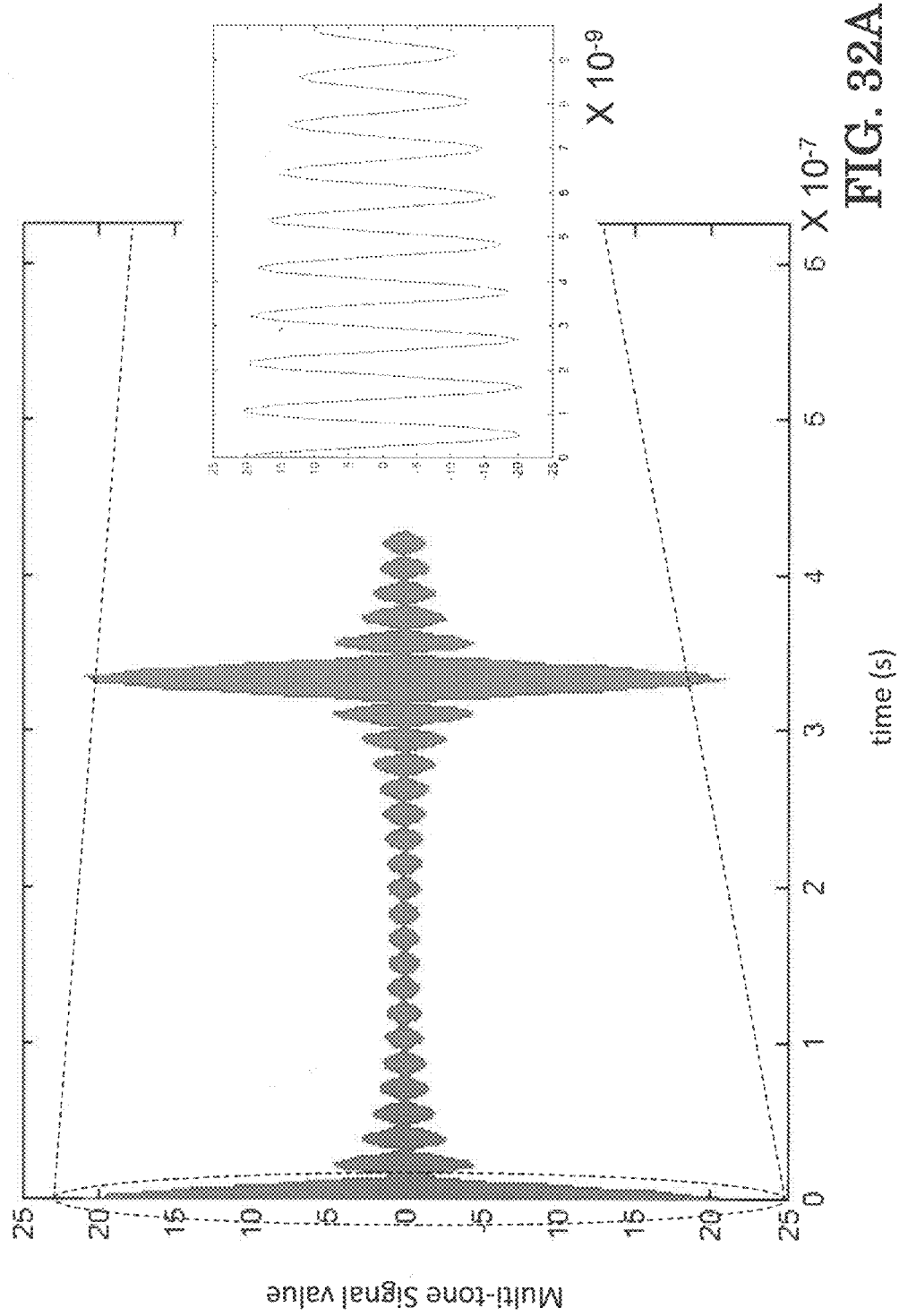
FIG. 32A illustrates a Multi-tone waveform.

The publication. Mazzaro, A. Martone, D. McNamara, "Detection of RF Electronics by Multitone Harmonic Radar," IEEE Transactions on Aerospace and Electronic Systems, vol. 50, no. 1, January 2014, pp. 477-490, herein incorporated by reference, indicated that the magnitude of the multi-tone target response depends on the initial phase relationships between the various transmit tones. For the formation of high resolution range (HRR) profiles, the specification of the initial phase relationship becomes critical. The initial phase of all waveforms must be equal to ensure that the phase progression across intermod frequencies is proportional to the target range. For this reason a waveform generator is used to create a transmit waveform comprising the sum of multiple frequencies with an identical initial phase. FIG. 32A shows the time domain, multi-tone waveform created such that $$s_i = \cos(2\pi(f_0 + i\Delta f)t), \tag{C-3}$$

where $f_0$=900 MHZ, $\Delta f$=3 MHz, and i=0, . . . , 20. Zoom (enlargement) insert shows that the initial phase (see zoom portion) was zero for all frequencies in this case, as indicated by the zoomed section of the plot. FIG. 32B shows the resulting HRR profile target response for a single target located at a range of 20 m (calculated using intermod products). More specifically, FIG. 32A discloses a multi-tone waveform for frequency components of 900 MHz-960 MHz in 3 MHz steps, as described in Equation (C-3). FIG. 32D illustrates an HRR profile for a single target at 25 m, calculated using the third order intermod products (p=3 in Equation (C-1)).

FIG. 32B illustrates multiple frequency (multitone) waves with the spacing varying with time. As an example, a formula can be used to determine the relationships between multitone frequencies. The relationships between the various parameters is determined by the relationship between the various frequencies. For example, if F1 is the lowest "multi-tone" frequency, and FN is the highest "multi-tone" frequency, then Fc=(F1+FN)/2 is the "center" multi-tone frequency. If there are N tones separated by dF=(FN−F1)/N, then F1>0 implies that N*dF must be less than 2Fc.

Figure 32C:
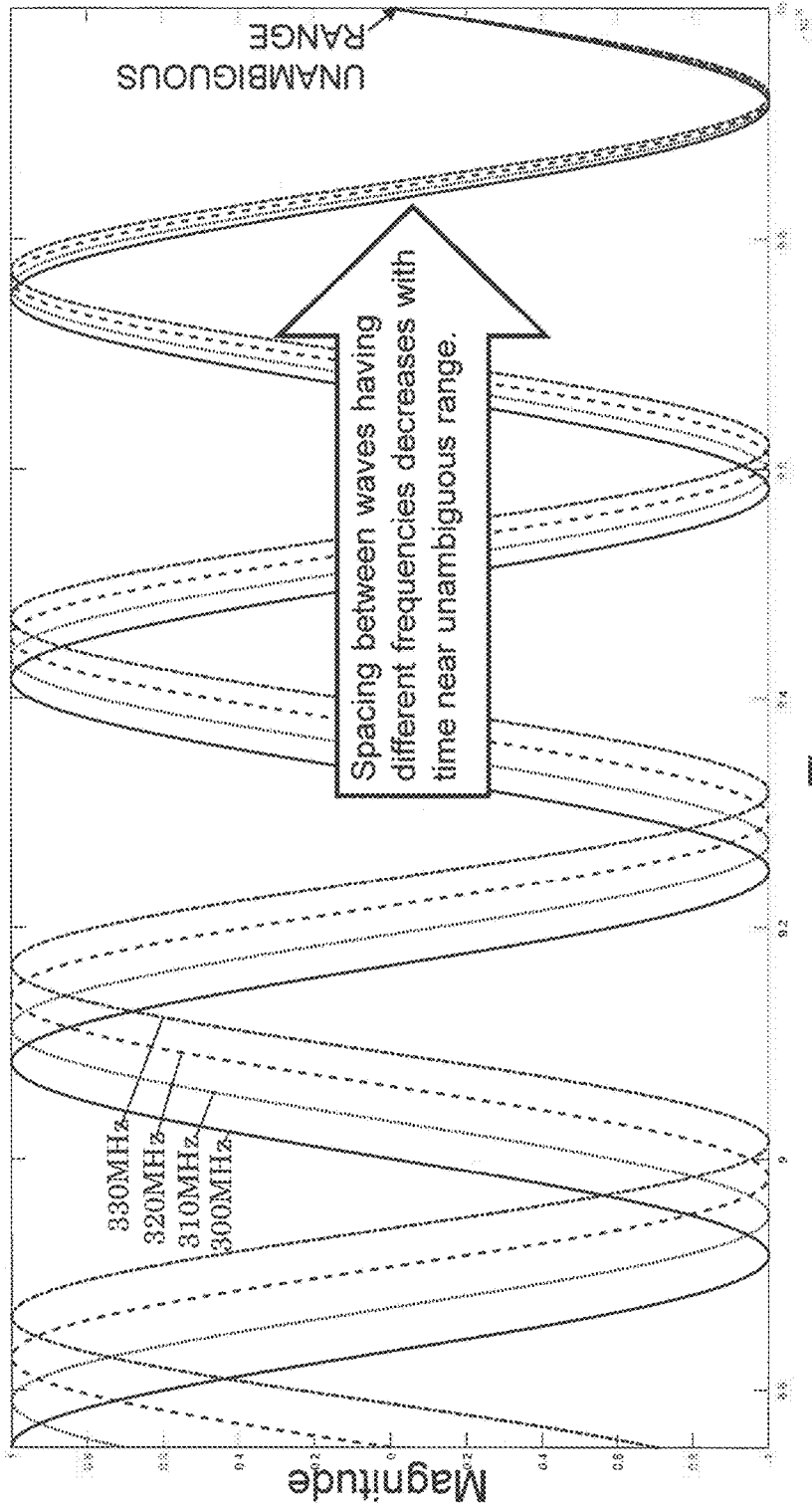
FIG. 32C is an illustration showing the unambiguous range of the multitone signal.

FIG. 32C is an illustration showing the unambiguous range of the multitone signal.

FIG. 33A illustrates an experimental set up used to collect simultaneous-frequency data. The radar environment is currently simulated in hardware using 51 ft of Megaphase F130 cable to mimic transmission over the air from the radar to an electronic target and reflection over the air back to the radar.

The target 50 is a radio that has been connectorized (i.e., its antenna was removed and replaced).

Figure 33B:
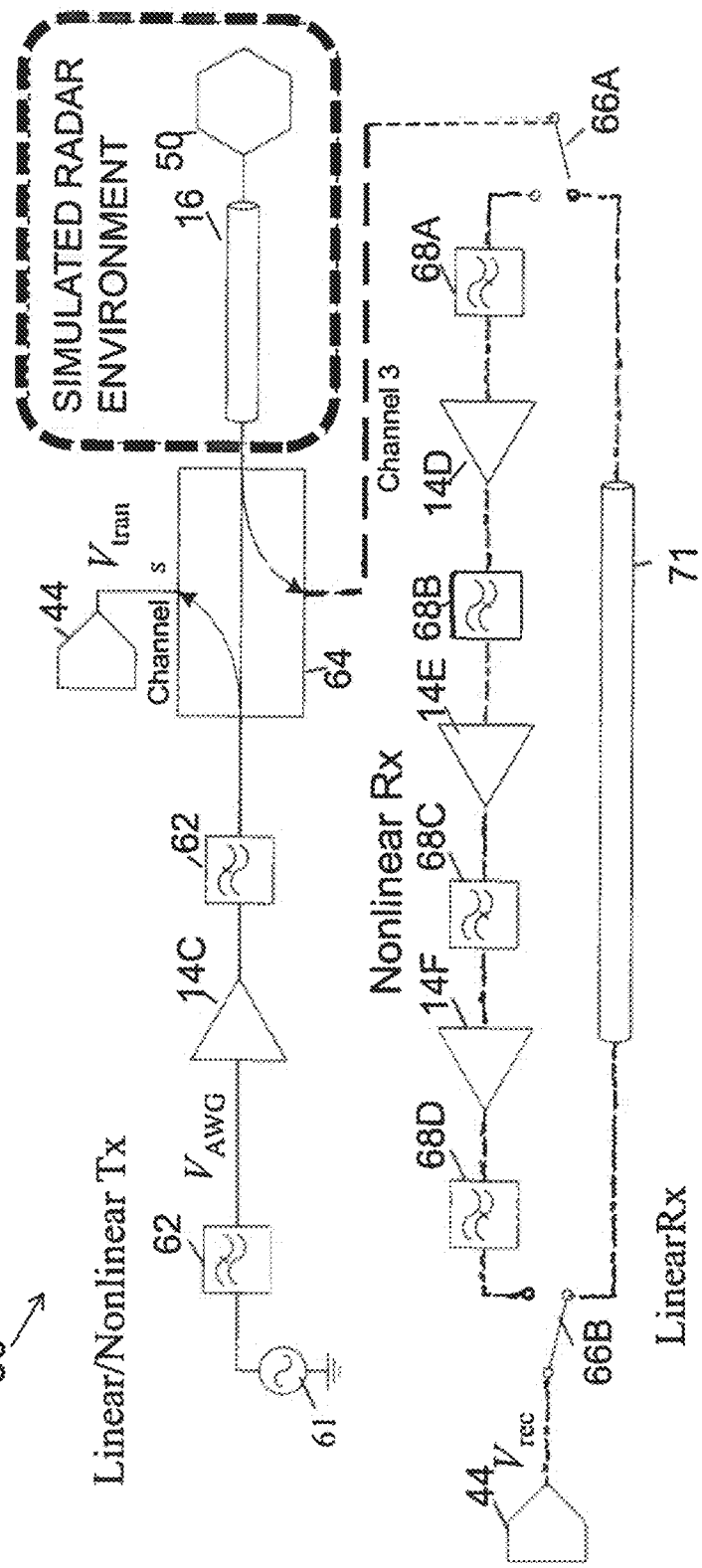
FIG. 33B is a schematic illustration of a prototype preferred embodiment set-up comprising combined linear and nonlinear radar architecture.

FIG. 33B illustrates a combined linear and nonlinear preferred embodiment having components common to both linear and nonlinear modes for transmitting and receiving radar waveforms is necessary to minimize the size, weight, and power of the combined radar system. A bench-top architecture for an alternate preferred embodiment combined radar transceiver is also shown in FIG. 33B. However, the invention is not limited to the specific components of the bench-top architecture.

In this alternate embodiment of FIG. 33B (which includes a hardware simulation of the radar environment), first described in U.S. application Ser. No. 14/032,387, the signal generator 11 is both linear and nonlinear radar waveforms, which may be for example a Tektronix AWG7052. The low pass filters 62 (which may for example be MiniCircuits NLP-1000+ low-pass filters) are highly linear with a passband below 1 GHz and remove much of the transmitter (Tx)-generated nonlinear (harmonic) distortion. The amplifier 14, which may for example be an AR4W1000 amplifier, boosts the power of the AWG signal to a level sufficient to excite nonlinear responses from electronic targets. The dual-directional coupler 64, which may for example be a HP 778D, provides one port for sampling the forward transmit, Tx waveform (which may be monitored for example by a digital oscilloscope 44) and another port for sampling the reverse (receive, Rx) signal. The "Simulated Radar Environment" consists of 100 ft of SMA cable 16 (four 25-ft cables in series), terminated by an SMA-connectorized target 50C.

Two receive chains are selected by a pair of switches 66A, 66B, which may for examples be Hittite HMC784MS8GE switches. Each switch 66A, 66B may be powered by 5 V from the 6-V/ 5-A port on an Agilent E3631A supply and controlled by 5 V/0 V from the ±25-V/1-A port. In FIG. 21, the "Linear Rx" chain is selected, and the signal is passed directly to the oscilloscope 44 through an SMA cable 71. Alternatively, the "Nonlinear Rx" chain may be selected. Along the nonlinear receiver path, the signal is filtered by four high-pass filters 68A-68D (which may be for example MiniCircuits VHF-1320+ high-pass filters having passbands above 1.32 GHz), to remove the linear response from capture and processing) and amplified by amplifiers 14 69B (which may for example be two MiniCircuits PSA-5453+) and amplifier 70, which may for example be a MiniCircuits PSA-545+. Each amplifier is mounted on an evaluation board and powered by 3 V from another E3631A supply.

As measured by an Agilent N9923A network analyzer and observed in FIG. 33B, the amplifier 63 (AR4W1000) provides more than a 40-dB gain to the transmit signal. For nonlinear (harmonic) responses, each NLP-1000+ filter (62) attenuates Tx-generated distortion at frequencies above 1500 MHz by more than 40 dB. FIG. 33B is an illustration showing the signal at the transmitter amplifier 63 and low-pass filters 62.

As first described in U.S. application Ser. No. 14/032,387, and as seen in FIG. 33, illustrating signals relating to the directional coupler and linear/nonlinear receive chain, the Tx and Rx coupling from the 778D is approximately −20 dB. Also, the nonlinear Rx chain (measured from one HMC784 "RF common" port to the other) passes signals to the 8300A with a gain of approximately 40 dB, whereas the linear Rx chain passes signals through with a loss under 3 dB.

Referring now to the embodiment shown in FIG. 33A, a depiction of the transmitted waveforms used in conjunction with the set-up of FIG. 33A is shown in FIGS. 34A and 34B; showing a depiction of the transmitted waveform in both the time and frequency domains, respectively. The 20 component frequencies of the multi-tone waveform are clearly recognizable as "spikes" in the frequency domain plot of FIG. 34B.

Figure 34D:
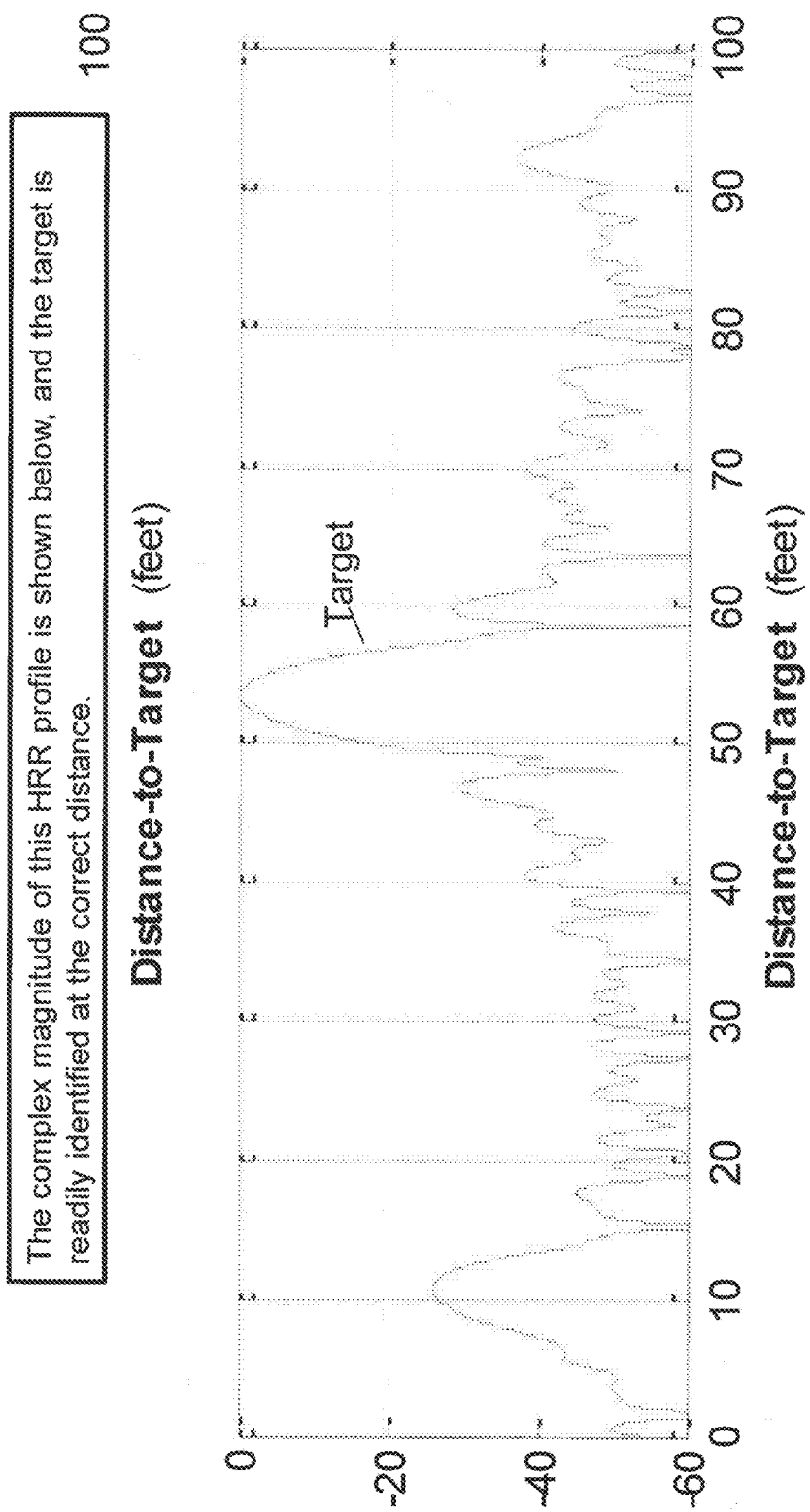
FIG. 34D is an illustration showing the complex magnitude of the HRR profile collected by the prototype system of FIG. 33A, and the target is readily identified at the correct distance/range of approximately 51 ft, which confirms the results predicted by the underlying theory.

Illustrated in FIG. 34C is a frequency domain representation of the received signal, showing the 2nd_and 3rd_order intermod products available for exploitation by the InSteF system. The prototype of a preferred embodiment system processes second order intermod products (i.e. p=2 in Equation (C-1)) indicated by the dashed ellipse in the plot of FIG. 34C to produce a high resolution range (HRR) profile (target signature). However, the invention is not limited to the second order intermod products. The second and third order intermod products are indicated by the dashed ellipse in the plot of FIG. 34C to produce a high resolution range (HRR) profile (target signature), which is illustrated in FIG. 34D for the case of p=2. The complex magnitude of this HRR profile is shown in FIG. 34D, and the target is readily identified at the correct distance. This confirms that the prototype system has successfully realized the capabilities predicted by the underlying theory.

It is noted that multi-tone waveforms have a high peak-to-average ratio, and this property was, in turn, observed to be advantageous for generating nonlinear target responses. The preferred embodiment uses the phase of intermodulation products to determine the range to a target once it had been detected. The preferred embodiment system exploits multi-tone techniques to simultaneously enable both target ranging and classification. Hence, existing multi-tone systems are enhanced through provision of a simultaneous detection and ranging capability. Similarly, performance of existing stepped-frequency and chirp systems may be exceeded by the availability of the higher peak-to-average ratios advantageous for generating nonlinear target responses. Finally, the multi-tone technique offers the instantaneous availability of a richer, multi-tone signature, without the need for a reference transmitted waveform. However, the present invention is not limited to multitone systems.

In addition, the proposed system provides additional flexibility vis a vis the standard stepped-frequency implementation. For example, the stepped frequency technique obtains a gain in signal-to-noise ratio through: (i) the integration of multiple pulses at each frequency step and (ii) the integration inherent in the FFT operation. Thus, to vary the ratio, it becomes necessary to: (i) increase the number of transmitted pulses at each frequency and/or: (ii) increase the number of transmitted frequencies. The preferred embodiment InSteF implementation can increase integration by simply increasing the length of the observation interval (i.e. increasing the coherent processing interval (CPI)). If a pulsed implementation were desired, then pulse-to-pulse integration could be incorporated in conjunction with an increase in CPI length.

Figure 35:
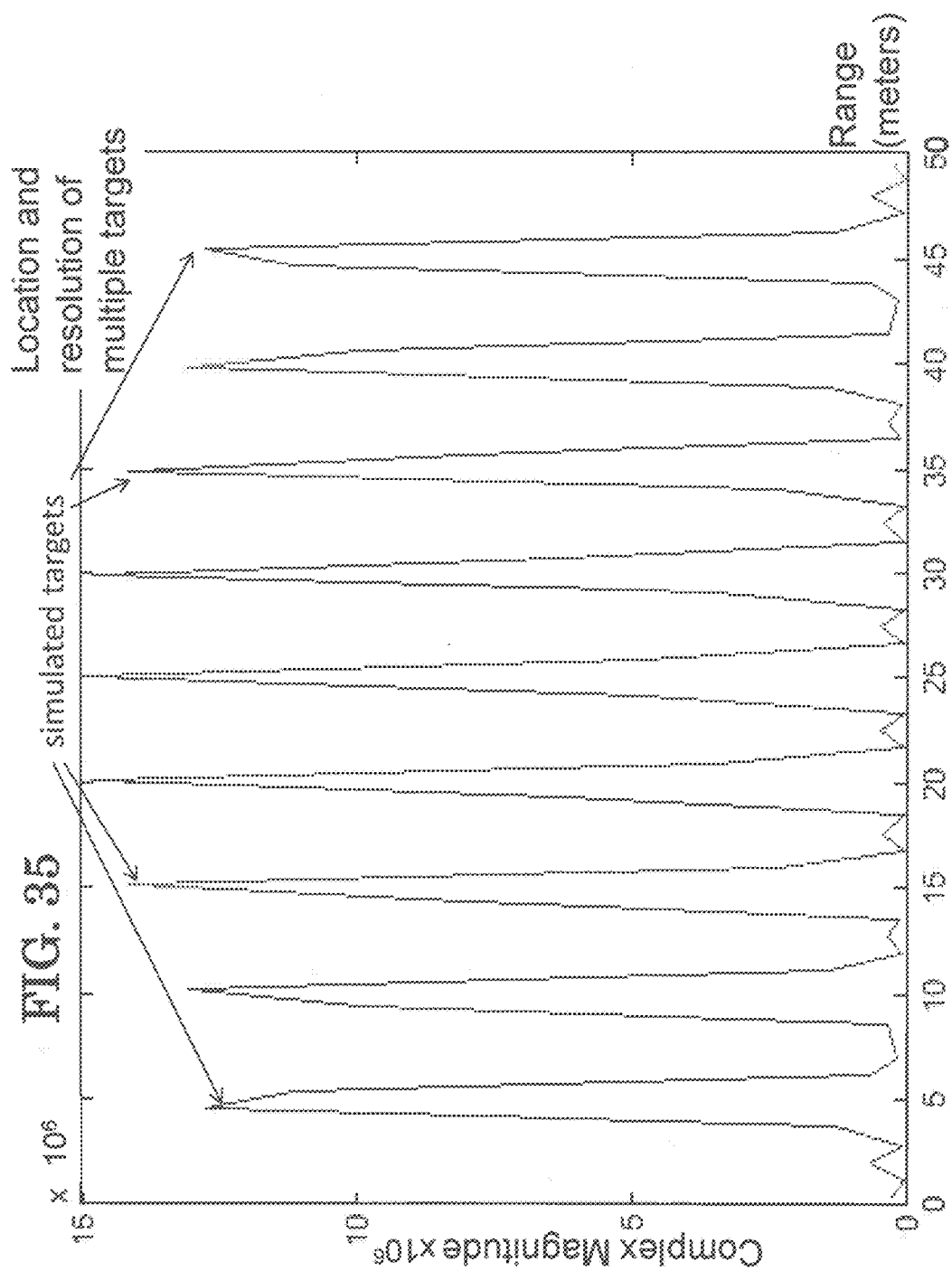
FIG. 35 illustrates an alternative case in which the location and resolution of multiple targets is shown.

The measurement process was simulated for a collection of hypothesized targets spaced 5 m apart and placed within the unambiguous range of the hypothesized system. The HRR profiles obtained are included in FIG. 35 and the plots show that all targets were correctly resolved and located. Note that the hypothesized system produced an intermod frequency spacing of 3 MHz, fixing the unambiguous range at 50 m. The system parameters were also configured so that the unambiguous range swath covered from 0 m (the radar's location) to 50 m. Finally, the bandwidth covered by the third-order intermod products (180 MHz) fixed the HRR cell size at approximately 0.83 m, much smaller than the target spacing.

Since the signals of interest are low-power, it was anticipated that system noise will likely have a major impact on system effectiveness. To address this issue, the process of FIG. 35 was repeated, adding different levels of white Gaussian (system) noise. The process of FIG. 35 was also repeated and varied the initial phases of the multi-tone frequencies were varied, thereby illustrating the importance of ensuring that all initial phases are identical.

Adding Noise to the Received Signal

FIGS. 36A to 36D show the effect of adding white Gaussian noise (AWGN) to the multi-tone signal to the receive chain, for the hypothesized non-linear system with p=3 in Equation C-1, progressing from the pristine, no-noise case (FIG. 36A) to the case of approximately 2 dB, peak-signal-to-noise ratio. The time-domain returns from the targets are shown on the left in FIGS. 36A-36D, and the calculated HRR profiles are shown on the right. Here, the RMS noise level has been scaled relative to the peak signal value indicated in 36A, and the degradation due to the increasing noise level is apparent. In 36D, the system has become completely ineffective due to a number of spurious "false targets" appearing at levels comparable to those of the true target levels. FIG. 36A illustrates no noise, FIG. 36B illustrates peak-signal to average-noise ratio of 14 dB, FIG. 36C illustrates peak-signal to average-noise ratio of 8 dB, and FIG. 36D illustrates peak-signal to average-noise ration of 2 dB.

Violating Requirement that all Initial Phase are Identical

A target signature degradation is also observed when the initial phase requirement is violated. The process resulting in FIG. 35 (location and resolution of multiple targets) was repeated and a random phase variation was introduced at each of the component frequency "tones" of the transmitted waveform. FIG. 37 illustrates the effects on the range profiles, and once again, the distortions in the target signatures are apparent.

FIGS. 37A-37D illustrate the introduction of random initial phase on frequency components of multi-tone signal. Initial phase selected from uniform distribution over the indicated phase interval. The solid blue plots represent no noise, and the remaining plots represent different realizations with random phase variations incorporated. FIG. 37A illustrates phase of each multi-tone frequency uniformly distributed between 0° and 45°. Blue represents zero initial phase across all frequencies; remaining colors represent different realizations (i.e. random initial phases).

FIG. 37B illustrates phase error uniformly distributed between 0° and 20°. Blue represents zero initial phase across all frequencies; remaining colors represent different realizations (i.e. random initial phases.).

FIG. 37C illustrates phase error uniformly distributed between 0° and 10°. Blue represents zero initial phase across all frequencies; remaining colors represent different realizations (i.e. random initial phases).

FIG. 37D illustrates phase error uniformly distributed between 0° and 5°. Blue represents zero initial phase across all frequencies; remaining colors represent different realizations (i.e. random initial phases.

The plots in FIGS. 37A-37D have been normalized relative to the peak value across all realizations. For the deterministic case, this implies that the normalization factor is the maximum across a single HRR profile. For the "random phase" case, however, the normalization factor may or may not be among the HRR profiles that are plotted. Hence, the peak values in the "random phase" plots are often less than one. Based on these plots, we conclude that the initial phases of the frequencies comprising the multi-tone signal must be the same. A large amount of variability will likely degrade system capability, reducing the signal-to-noise ratio of already weak signals.

A preferred method of the present invention is a technique for extracting magnitude and phase information from inter-modulation (intermod) products produced by non-linear target responses. It was observed that these intermod products could be treated as an instantaneous stepped-frequency target signature. That is, after appropriate pre-processing, they could be used to create a high range resolution (HRR) profile by applying an inverse fast Fourier transform (IFFT). The underlying phenomena is shown through a non-linear system model based on an infinite power series expansion of the target response, which is simulated using a multi-tone signal as the radar transmit waveform.

Provided that the initial phase remains constant across all frequencies, the simulation suggested that the target phase relationships (across frequency) would be preserved. This confirmed the initial design assumption—that stepped-frequency signal processing techniques could be applied to the collection of intermod products. Through careful design and implementation, increased data collection rates are achievable, and a corresponding increase in signal-processing flexibility. That is, by increasing the system bandwidth collection speed and system flexibility is increased The above process was repeated for a collection of hypothesized targets spaced 5 m apart and placed within the unambiguous range of the hypothesized system. The HRR profiles obtained are included in FIG. 35 and the plots show that all targets were correctly resolved and located. Note that the hypothesized system produced an intermod frequency spacing of 3 MHz, fixing the unambiguous range at 50 m. The system parameters were also configured so that the unambiguous range swath covered from 0 m (the radar's location) to 50 m. The bandwidth covered by the third-order intermod products (180 MHz) fixed the HRR cell size at approximately 0.83 m, much smaller than the target spacing.

Figure 38:
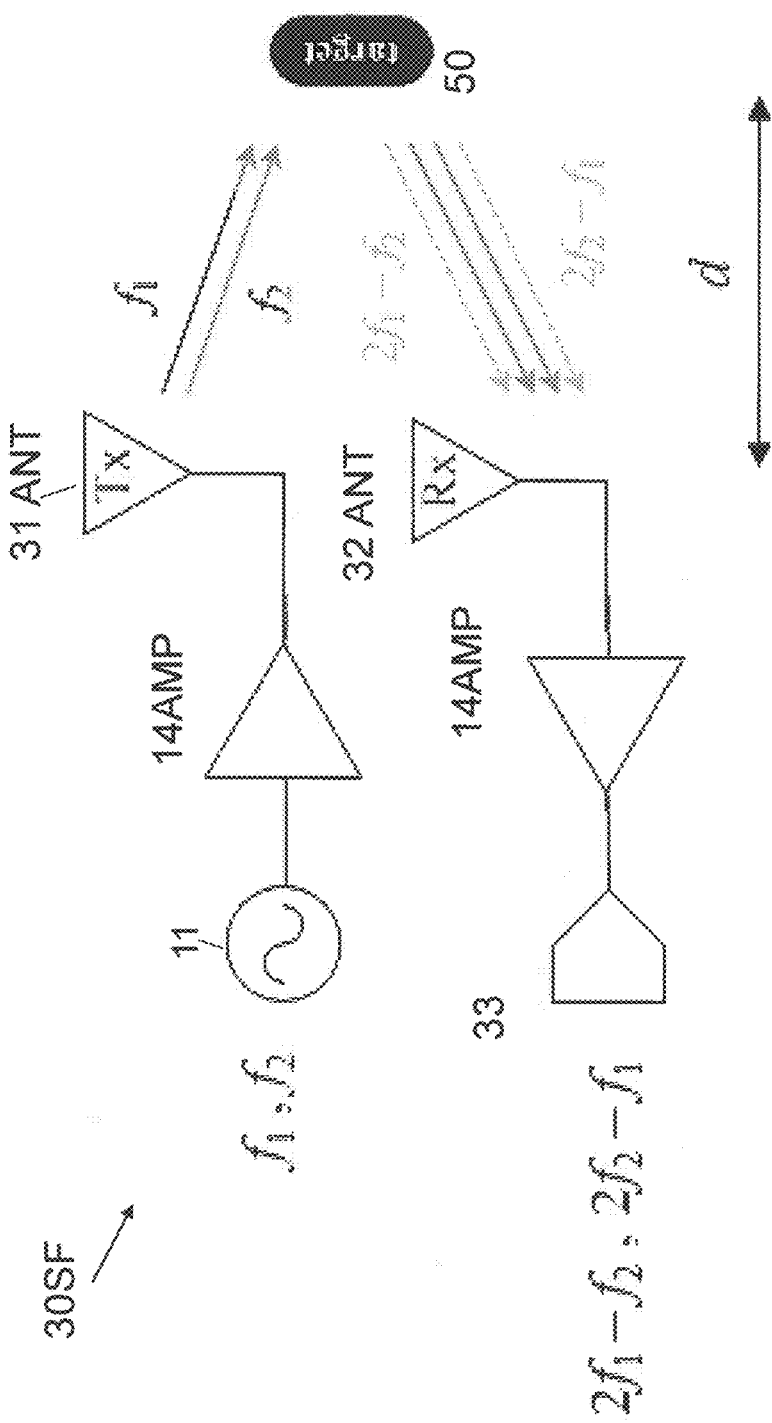
FIG. 38 illustrates a preferred embodiment 2-tone simultaneous-frequency radar 30SF. The preferred embodiment 30SF transmits 2 frequencies, $f_1$ and $f_2$, at (approximately) the same amplitude. The radar receives at least 2 intermodulation frequencies, $2f_1-f_2$ and $2f_2-f_1$.

The preferred embodiment nonlinear radar system 30S shown in FIG. 38 transmits multiple simultaneous frequencies and receives intermodulation products in the vicinity of those same frequencies. This work is similar to that on intermodulation radar, however, the simultaneous-frequency radar is wideband and allows for the generation of a range profile of the nonlinear radar environment.

FIG. 38 illustrates a preferred embodiment 2-tone simultaneous-frequency radar 30S. The preferred embodiment 30S transmits 2 frequencies, $f_1$ and $f_2$, at (approximately) the same amplitude. The radar receives at least 2 intermodulation frequencies, $2f_1-f_2$ and $2f_1-f_2$. Although not depicted in FIG. 38, the radar may also receive higher-order intermodulation frequencies such as $3f_1-2f_1$ and $3f_1-2f_1$. Preferred embodiment 30S may be modified to transmit 20 simultaneous frequencies and receive enough (higher-order) intermodulation products to adequately construct a range profile over more than 100 ft.

Figure 39:
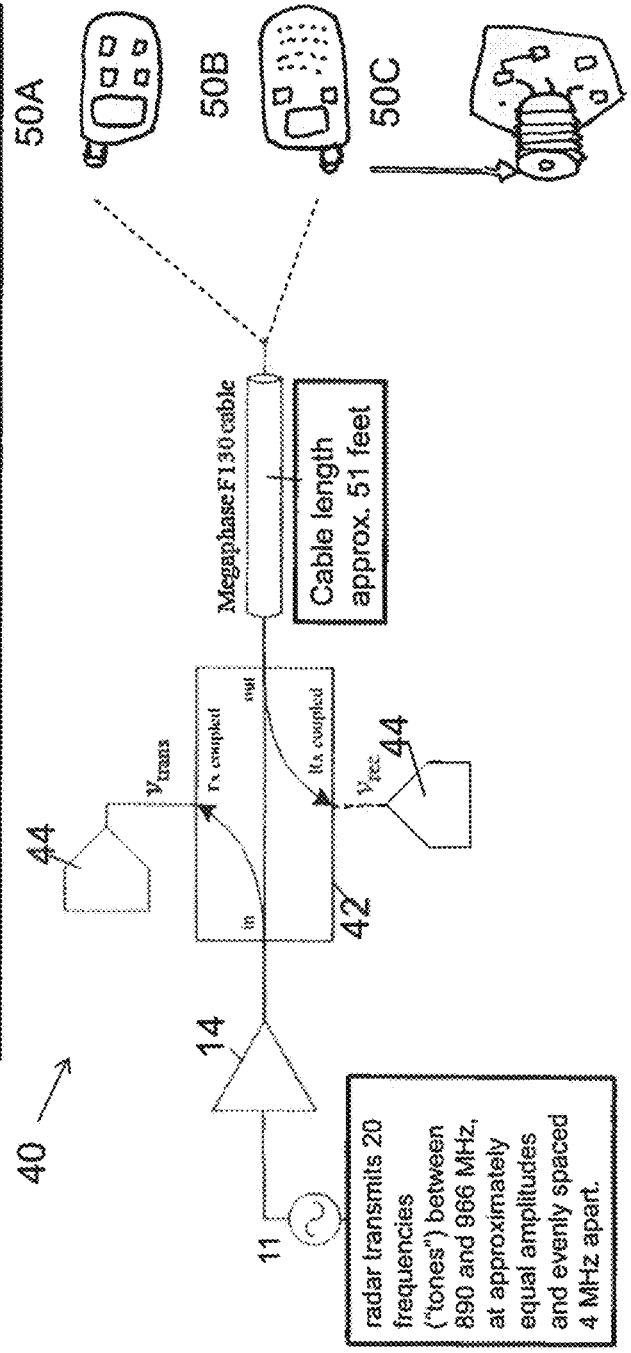
FIG. 39 illustrates an experimental set up used to collect simultaneous-frequency data. The radar environment is currently simulated in hardware using 51 ft of Megaphase F130 cable to mimic transmission over the air from the radar to an electronic target and reflection over the air back to the radar. The target 50 is a radio that has been connectorized (i.e., its antenna was removed and replaced). Illustrated are two types of targets; hand held radios FV300 (50A) and T4500 (50B), and the connector that is used in place of the radio antenna (50C).

An experimental embodiment of the present invention used to collect simultaneous-frequency data is depicted in FIG. 39, in which there is shown a preferred embodiment simultaneous-frequency nonlinear radar system 40 for detecting radio frequency electronic targets of interest. The radar transmits 20 frequencies ("tones") between 890 and 966 MHz, at approximately equal amplitudes and evenly spaced 4 MHz apart. The radar transceiver and the target are connected by coaxial cabling as a hardware simulation of a wireless channel. The radar receives intermodulation produced by these 20 frequencies, in a 90-MHz band just below 890 MHz and another 90-MHz band just above 966 MHz. An inverse Fourier transform of this intermodulation demonstrates successful detection and ranging of each electronic target at a distance (i.e., cable length) of just over 50 ft. The radar environment is simulated in hardware using 51 ft of Megaphase F130 cable to mimic transmission over the air from the radar to an electronic target and reflection over the air back to the radar. The targets 50A & 50B (in FIG. 39) are radios that has been connectorized (i.e., its antenna was removed and replaced with an SMA end-launch connector. The transmitted signal source 11 may be, for example, a Tektronix AWG7052 arbitrary waveform generator. An amplifier 41, such as, for example, the MiniCircuits ZHL-42W, amplifies this signal by 38 dB before it is input to a directional coupler 42, which may be, for example, a Hewlett-Packard 778D dual-directional coupler. The output of the HP 778D directional coupler 42 feeds into 51 ft of low-loss, low-distortion Megaphase F130 cable 43 (three 12-ft lengths plus one 15-ft length in cascade). At the end of the 51-ft cable is the connectorized target via connector 50C. Data was collected from 2 targets: the Motorola FV300 and the Motorola T4500 (handheld radios 50A and 50B). Photos of these 2 targets and a zoomed-in view of the connectorized FV300 are given in FIG. 39 (right side).

The output from the AWG7052 waveform generator 11 contains N=20 simultaneous frequencies. The lowest frequency is $f_{start}$=890 MHz. The highest frequency is $f_{end}$=966 MHz. The frequencies are evenly spaced by $\Delta f$=4 MHz. The output power is −54 dBm/frequency (−41 dBm total).

The voltage wave that reflects from the target is separated from the wave transmitted to the target by the directional coupler. The transmit (Tx) and receive (Rx) waveforms are sampled at 20 dB down from their true amplitudes via the Tx- and Rx-coupled ports on the 778D. These sampled waveforms may be captured by, for example, a Lecroy Wavemaster 8300A digitizing oscilloscope 44; channel 1 captures $v_{trans}$ and channel 2 captures $v_{rec}$. A fast Fourier transform (FFT) computed in Matlab is used to view the time-domain-captured waveforms in the frequency domain.

Figure 40:
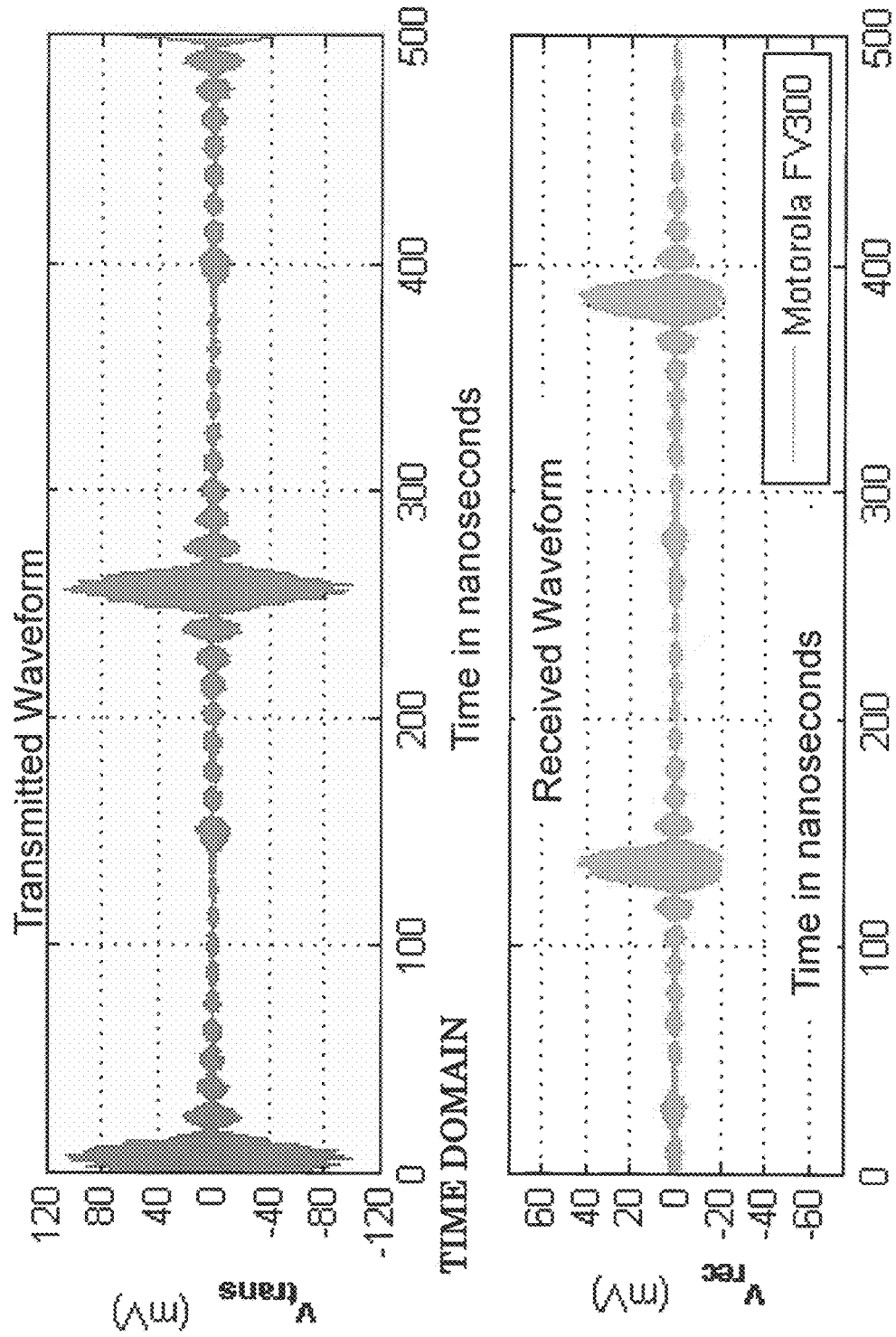
FIG. 40 illustrates the time-domain transmitted and received waveforms for the Motorola FV300 as the target.

FIG. 40 illustrates the time-domain transmitted and received waveforms for the multitone experiment; the received waveform shown is from the Motorola FV300 radio as the target. FIG. 21 illustrates the frequency-domain versions of these same waveforms. The transmit waveform contains a significant amount of intermodulation (below 890 MHz and above 966 MHz), which can be traced to the output from the wave generator 11 (AWG). For this wireline experiment, the current level of transmitter-generated intermodulation is not prohibitive. For a wireless experiment, this intermodulation should be minimized using pre-distortion or feedforward cancellation (because the received intermodulation, which is expected to be much weaker in the wireless case, is likely to be masked by the transmitter-generated intermodulation.

The received waveform contains intermodulation generated by the target (particularly in the ranges 800-886 and 970-1060 MHz, and relative to the power at the intended 20 transmit frequencies).

FIG. 42A is the spectrum received from the target, frequency-notched in software. Raw voltage-vs-time data is transformed via FFT into a power spectrum, then the original transmit frequencies (between 890 and 966 MHz) are notched-out (reduced to zero amplitude). This notched spectrum is shown FIG. 42A. Then the spectrum is inverse-FFTed back into the time domain to give FIG. 42B, which is denoted "h_IMD". The horizontal scale of h_IMD is mapped from time to distance using time-of-flight (assuming the speed of light, and a correction for propagation internal to the radar before/after the Tx/Rx antennas).

As to the terminology, the acronym "IMD" denotes intermodulation distortion. The label "h" is used because the final waveform is very much like an impulse response of the radar environment. Here "h" is attributed to a nonlinear response, though the term "impulse response" is ill-defined for nonlinear systems. If a series of tones were transmitted, some variation in amplitude & phase would be received across exactly those tones, and if one inverse-FFTed this purely-linear received signal, the resulting waveform—would—be an impulse response, in the traditional—linear—sense.

The main (largest, central) hump in FIG. 42B appears at the range to the target. The phases of the received tones align in such a way that that their collective inverse-FFT across the IMD tones sums constructively at this range. (If there is no target present, the received phases are random due to the reception of noise only and no distinctive humps appear in "h_IMD".)

The secondary (smaller) humps in FIG. 42B appear near to the true target range, both in front and behind. Using a preferred embodiment method of processing (notching then inverse-FFTing), the magnitude of these humps is due primarily to frequency-notching. (Humps like this can also be generated by weakly-responding targets which are physically near to a strongly-responding target, but in the experiment which generated this data only one target was present.) The filtering used was very sharp ("hard" filtering/infinite-roll-off). As discussed earlier, the received response at those frequencies corresponding to the transmit frequencies was set to zero. This square-block-type manipulation of the waveform in the frequency domain generates ripples (humps, ringing) in the time domain. A "softer" filtering (windowing/slower frequency-roll-off) could be used to reduce these humps.

In FIG. 42A, the target-generated intermodulation is isolated from target's linear response by band-stop filtering $v_{rec}$ between 890 and 966 MHz. An inverse FFT of this filtered $v_{rec}$, whose horizontal axis is scaled from time to distance by, is given in FIG. 42B as $h_{IMD}$. The propagation speed used for this calculation is that reported by the cable manufacturer: $2_p$dut=11.27nsft$_p$u=.

Figure 43E:
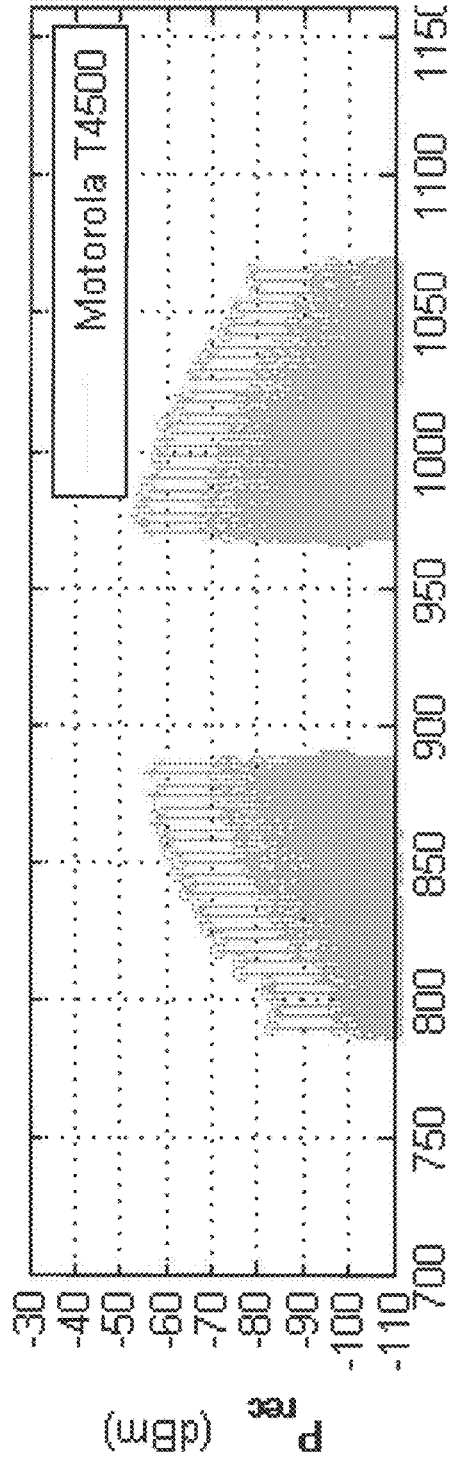
FIG. 43E illustrates the filtered received waveform from the T4500 shown in FIG. 50B.
Figure 43F:
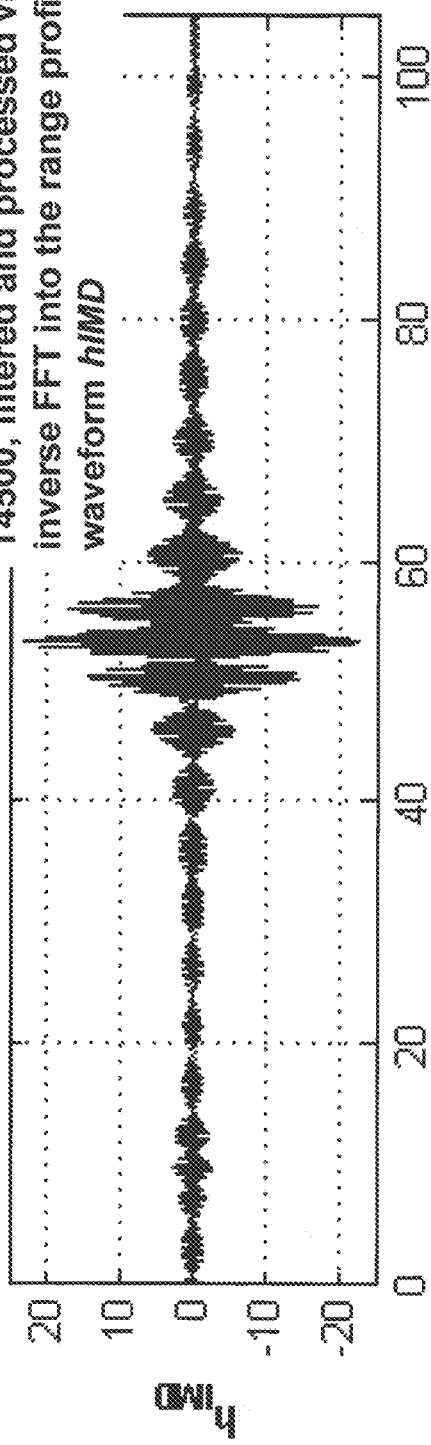
FIG. 43F illustrates the range profile waveform processed via inverse FFT into the range profile waveform hIMD).

FIGS. 43A and 43B illustrate time-domain Tx and Rx waveforms for multitone experiment: the received waveform shown is from the Motorola T4500 radio. FIGS. 43C and 43D illustrate the received waveform from the T4500, filtered and processed via inverse FFT into the range profile waveform hIMD. FIGS. 43E and 43F are the same as FIGS. 42A and 42B, but for the T4500 radio as the target instead of the FV300. In FIG. 43A the time-domain transmitted and received waveforms for the multitone experiment are illustrated; the received waveform shown is from the T4500 radio. FIG. 43C illustrates the frequency-domain versions of these same waveforms. The transmit waveform contains a substantial amount of intermodulation (below 890 MHz and above 966 MHz), which can be traced to the output from the waveform generator AWG 11. For this wireline experiment, the current level of transmitter-generated intermodulation is not prohibitive. For a wireless experiment, this intermodulation should be minimized using pre-distortion or feedforward cancellation (because the received intermodulation, which is expected to be much weaker in the wireless case, is likely to be masked by the transmitter-generated intermodulation.

The received waveform contains a substantial amount of intermodulation than generated by the target; as in previous FIGS. 41 and 42A, particularly in the ranges 800-886 and 970-1060 MHz, and relative to the power at the intended 20 transmit frequencies.

In FIG. 43E, the target-generated intermodulation is isolated from target's linear response by band-stop filtering $v_{rec}$ between 890 and 966 MHz. An inverse FFT of this filtered $v_{rec}$, whose horizontal axis is scaled from time to distance by $c_{cable}\tau/2$, where $c_{cable}$ is the propagation speed of electromagnetic waves in the cable, is given in FIG. 43F as $h_{IMD}$. The propagation speed used for this calculation is that reported by the cable manufacturer: $c_{cable}=1/1.27$ ft/ns≈2.4*10$^8$ m/s or 0.8c, where c is the speed of light in free space.

FIGS. 44A, 44B, 44C, 44D, 44E and 44F are the corresponding data traces for an open circuit located at the end of the 51-ft cable instead of an actual target. In FIG. 44E, the target-generated intermodulation is isolated from target's linear response by band-stop filtering vrec between 890 and 966 MHz. An inverse FFT of this filtered $v_{rec}$, whose horizontal axis is scaled from time to distance by $c_{cable}\tau/2$, is given in FIG. 44F as $h_{IMD}$. The propagation speed used for this calculation is that reported by the cable manufacturer: $c_{cable}=1/1.27$ ft/ns or 1.27 ns/ft.

The waveforms hIMD in FIGS. 42B and 43F display a maximum at d=53 ft, corresponding to the length of the cascaded Megaphase cables, plus an extra 2 ft due to the length of the 778D coupler and each cable between the coupler and the oscilloscope. Compared to the "no-target case," i.e., the open-circuit data in FIGS. 43E and 43F, the presence of a well-defined peak indicates successful detection of each nonlinear target. The location of the peak at a distance d corresponding to the physical length of the coaxial line between the radar transceiver and the target indicates successful ranging of each nonlinear target. Simultaneous-frequency radar, for 20 tones and transmit frequencies between 890 and 966 MHz, has been successfully demonstrated via wireline.

In the foregoing, simultaneous-frequency nonlinear radar was successfully demonstrated for 20 transmitted tones, evenly spaced between 890 and 966 MHz, for 2 electronic targets of interest, at a distance of just over 50 ft, by receiving and processing intermodulation generated by each target. The wireline experiment of FIG. 39 appears to indicate that the results may be extended to a well-controlled (high transmit power, low noise, short-range) wireless test.
Frequencies of Interest—P2 Intermod Products with InSteF System With reference to FIGS. 33A and 39, wherein the prototype systems used to collect InSteF data are depicted and described in detail above, the radar environment is simulated in hardware using 51 ft of Megaphase F130 cable to mimic transmission over the air from the radar to an electronic target and reflection over the air back to the radar. The target is a radio (e.g., 50A or 50B in FIG. 39) that has been connectorized (i.e., its antenna was removed and replaced with an SMA end-launch connector 50C). The transmitted signal source is the Tektronix AWG7052 arbitrary waveform generator 11. The MiniCircuits ZHL-42W (41) amplifies this signal by 38 dB before it is input to the Hewlett-Packard 778D dual-directional coupler (42). The output of the coupler 42 feeds into 51 ft of low-loss, low-distortion Megaphase F130 cable (three 12-ft lengths plus one 15-ft length in cascade). At the end of the 51-ft cable is the connectorized target. Data were collected using the Motorola FV300 handheld radio 50A with a zoomed-in view of its connector.

The output from the wave generator 11 contains N=20 simultaneous frequencies, programmed in accordance with the procedure outlined in K. Ranney, K. Gallagher, A. Martone, G. Mazzaro, K. Sherbondy, R. Narayanan, "Instantaneous Stepped-Frequency, Non-linear Radar," *Proc. SPIE*. 9461, Radar Sensor Technology IX and Active and Passive Signatures VI, 946122. (May 21, 2015) doi: 10.1117/12.2186620, herein incorporated by reference. The lowest frequency is fstart=890 MHz, the highest frequency is fend=966 MHz, and the frequencies are evenly spaced by Δf=4 MHz. (Note that this implies a range resolution c/2B≈2 m and an unambiguous range of c/2□f≈for a linear system operating in fee space.) The output power is −54 dBm/frequency (−41 dBm total). The voltage wave that reflects from the target is separated from the wave transmitted to the target by the directional coupler. The transmit (Tx) and receive (Rx) waveforms are sampled at 20 dB down from their true amplitudes via the Tx- and Rx-coupled ports on the 778D. These sampled waveforms are captured by the Lecroy Wavemaster 8300A digitizing oscilloscope 44 (channel 1 captures vtrans and channel 2 captures vrec). The recorded data is then input to a prototype InSteF processor implemented in Matlab.
Instantaneous Stepped Frequency Processing As described in the foregoing, FIGS. 5D and 5E show a comparison of single cycle and stepped frequencies. In the InSteF preferred embodiment, 57 frequencies are extracted from the interval surrounding the second harmonic (i.e., the case of p=2 in K. Ranney, et al, "Instantaneous Stepped-Frequency, Non-linear Radar," Proc. SPIE. 9461, Radar Sensor Technology IX and Active and Passive Signatures VI, 946122. (May 21, 2015) doi: 10.1117/12.2186620, herein incorporated by reference. FIG. 25 shows the location of frequencies used, and it is noted that the peak value measured in this interval is roughly 11 dB lower than the peak value measured from the set of transmitted multi-tones. A linear radar system could be realized by processing frequency measurements extracted at these transmitted multi-tones, but such an approach would defeat the purpose of a non-linear radar system. Both clutter and the targets of interest would reflect energy at these frequencies. Hence, the "instantaneous stepped frequency" measurements are processed in the vicinity of 1800 MHz by transforming 57 frequency domain samples back into the time domain via an inverse fast-Fourier transform (IFFT). This produces the desired, coherent high resolution range (HRR) profile that is suitable for additional processing (e.g., beamforming, moving target indication (MTI) and synthetic aperture radar (SAR) processing).

Figures 45, 46:
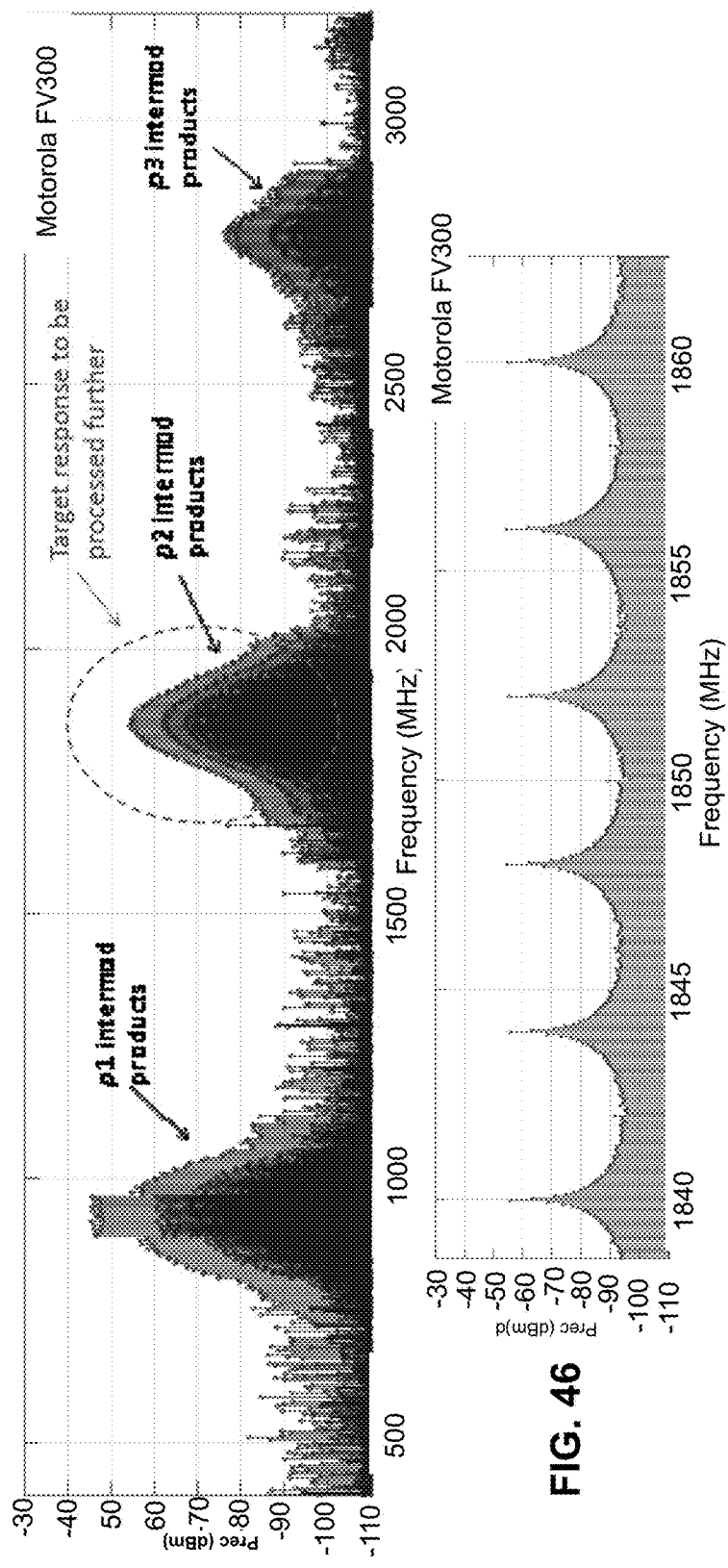
FIG. 45 illustrates a frequency domain representation of target response. Dashed oval indicates the location of frequency domain samples used to form the HRR profile
FIG. 46 illustrates a zoomed view of the plot in FIG. 45 showing the location and separation of intermod product peaks used for downstream InSteF processing.

FIG. 45 is a frequency domain representation of target response. The dashed oval indicates the location of frequency domain samples used to form the HRR profile. A zoomed view of the plot in FIG. 45 is shown in FIG. 46, clearly illustrating the 4 MHz spacing of peak intermod product responses extracted to create a HRR profile. Since a larger number of frequency samples are obtained for the InSteF system with p=2, a higher range resolution is realized than is possible for the corresponding linear system. (Recall that the linear system's waveform (e.g., FIG. 13B) comprises only 20 frequency steps with a spacing of 4 MHz, while the preferred embodiment InSteF procedure shown in FIG. 46 is able to exploit 57 steps available for p=2.) In addition, the unambiguous range remains the same for the InSteF system as it is for the linear system, because the frequency step size remains the same.

Figure 47A:
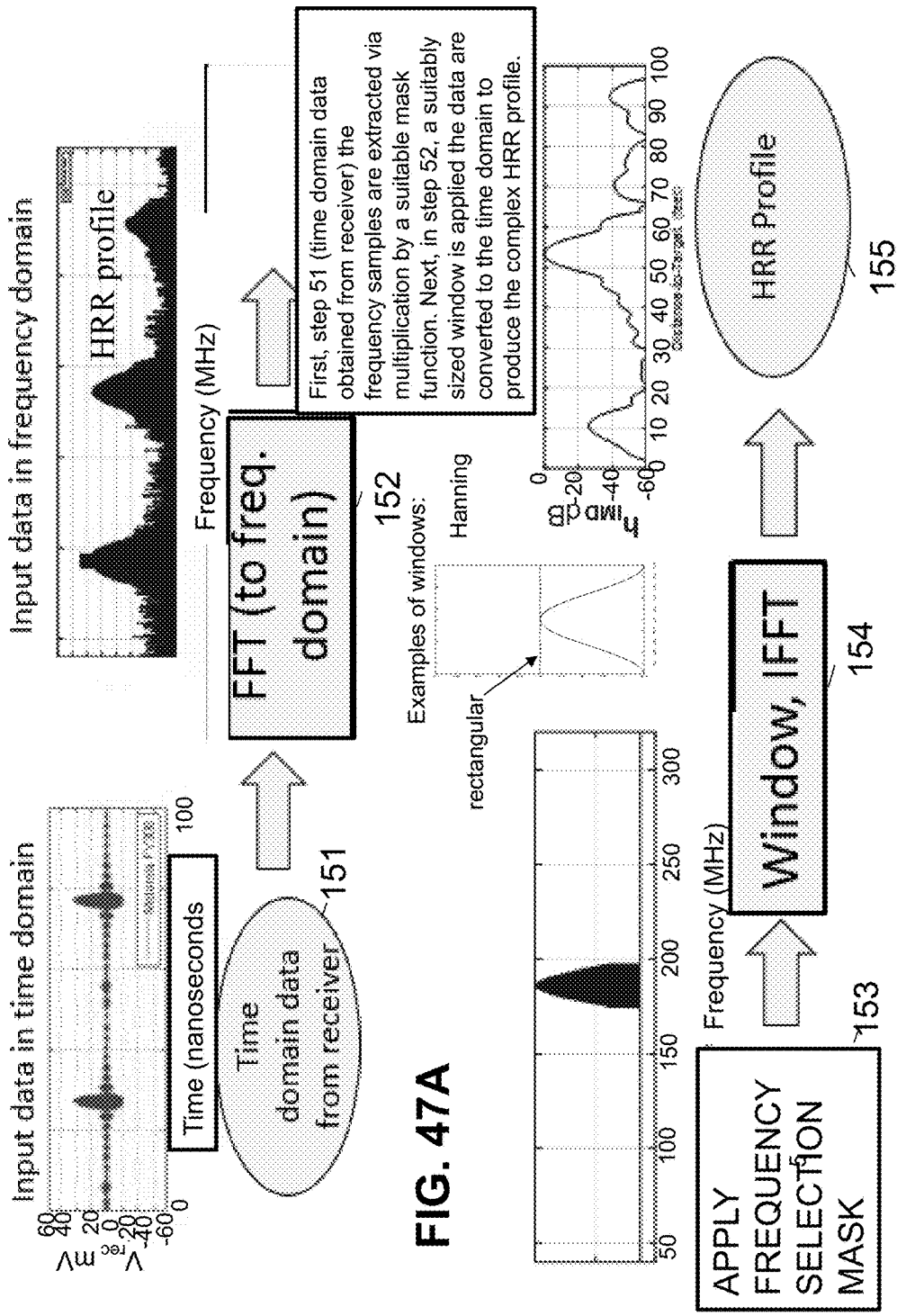
FIG. 47A is an illustration showing a block diagram that outlines the receive-chain processing steps performed by a preferred embodiment InSteF system.

The block diagram in FIG. 47A outlines the receive-chain (shown as receiver 132 and process (or at least one processor) 133 in FIG. 31) processing steps performed by the preferred embodiment InSteF system. Referring now to 47B, First, step 151 (time domain data obtained from receiver) the frequency samples are extracted via multiplication by a suitable mask function. Next, in step 152, a suitably sized window is applied the data are converted to the time domain to produce the complex HRR profile. Typically, this HRR profile would then serve as input for additional downstream processing, as previously noted. The magnitude of the HRR profile is plotted in FIG. 48 for both the case where the selected frequencies have been windowed (black) and have not been windowed (cyan). Notice that the target is correctly located in both cases, and notice, as well, how the Hanning window suppresses sidelobes at the expense of a slight reduction in resolution (i.e., wider main lobe of the target response). The amount of sidelobe reduction is probably limited somewhat due to the nature of the spectral samples, themselves. That is, the envelope of the frequency domain samples already includes a window-like weighting pattern due to the inherent scaling that is part of the intermod product generation process. (See FIG. 46A.)

FIG. 42A is the spectrum received from the target, frequency-notched in software. Raw voltage-vs-time data is transformed via FFT into a power spectrum, then the original transmit frequencies (between 890 and 966 MHz) are notched-out (reduced to zero amplitude). This notched spectrum is 42A. Then the spectrum is inverse-FFTed back into the time domain to give FIG. 42B, which is denoted "h_IMD". The horizontal scale of h_IMD is mapped from time to distance using time-of-flight (assuming the speed of light, and a correction for propagation internal to the radar before/after the Tx/Rx antennas).

The "IMD" denotes intermodulation distortion, and the label "h" is used because the final waveform is very much like an impulse response of the radar environment. Here "h" is attributed to a nonlinear response, though the term "impulse response" is ill-defined for nonlinear systems. If we transmitted a series of tones, received some variation in amplitude & phase across exactly those tones, and inverse fast Fourier transform (inverse-FFTed) this purely-linear received signal, the resulting waveform would be an impulse response, in the traditional linear sense.

The main (largest, central) hump in FIG. 42B appears at the range to the target.

The phases of the received tones align in such a way that that their collective inverse-FFT across the IMD tones sums constructively at this range. (If there is no target present, the received phases are random due to the reception of noise only and no distinctive humps appear in "h_IMD".)

The secondary (smaller) humps in FIG. 42B appear near to the true target range, both in front and behind. By the current method of processing (notching then inverse-FFT-ing), the magnitude of these humps is due primarily to frequency-notching. (Humps like this can also be generated by weakly-responding targets which are physically near to a strongly-responding target, but in the experiment which generated this data only one target was present.) The filtering that was used was very sharp ("hard" filtering/infinite-roll-off). As previously noted, the received response at those frequencies corresponding to the transmit frequencies was set to zero. This square-block-type manipulation of the waveform in the frequency domain generates ripples (humps, ringing) in the time domain. "Softer" filtering (windowing/slower frequency-roll-off) could be used to reduce these humps.

FIG. 49 is a graphical illustration showing HRR profiles calculated using different frequency bands. Blue=contiguous band of p2 intermod products, shorter Hanning window applied; black=upper half of p1 frequencies, Hanning window applied; red=both halves of p1 frequencies, shorter Hanning window applied separately to each half to "smooth" the transitions on either side of the frequency notch. Note that the black plot has the widest main lobe (smallest total bandwidth), while the red plot has the narrowest main lobe (highest total bandwidth). Sidelobes introduced by the frequency notch effectively negate any benefit of extending the bandwidth to both sides of the transmitted tones.

The band of frequencies selected by InSteF should be contiguous to avoid introducing unwanted sidelobes into the HRR profile. This is not a problem for p>1; however, if intermod products are extracted in the vicinity of the transmitted multi-tones, then the frequency band may no longer be contiguous. Filters must be incorporated to eliminate the linear target and clutter responses, and this either creates a "notch" in the middle of the band or reduces the number of available frequencies. Reduced bandwidth implies reduced range resolution while the introduction of a frequency notch leads to HRR sidelobes. These effects are illustrated by the plots in FIG. 49. Here, a Hanning window has been applied to each of the frequencies bands used. Thus, if only the p1 intermod products above the transmitted multi-tones are used, then a shorter Hanning window is applied these samples. (It is noted that the p1 intermod products are those in the immediate vicinity of the transmitted tones, as illustrated in FIG. 46A). The increased width of the main lobe (i.e., reduction in resolution) is readily apparent in the black plot of FIG. 49. Similarly, if all of the intermod products surrounding the transmitted tones are used—necessitating the introduction of a frequency notch—then each of the selected bands (on either side of the notch) are weighted separately using the shorter Hanning window. In this case the narrower main lobe is evident in the red plot of FIG. 49, but the high sidelobe levels effectively negate any benefit realized through the inclusion of the larger bandwidth. Finally, if the contiguous frequency band corresponding to p2 is used, then all of the samples are weighted using a longer Hanning window. In this case, we obtain a mainlobe width that is between the previously considered main lobe widths, as evidenced by the blue plot in FIG. 49. The sidelobe levels, however, are lower; hence it should be easier to separate targets in range using the contiguous p2 frequency samples.

Utilizing the preferred embodiment in conjunction with the InSteF system, intermodulation frequency responses from a non-linear target have been developed for use. In addition, by carefully processing these responses, a target can be located within the non-ambiguous range covered by its high resolution profile. There are also described some subtleties associated with both the selection of suitable intermodulation responses and the subsequent processing of the selected, frequency domain samples. These measurements support the theory underpinning development of an "instantaneous stepped frequency" non-linear radar system, and they confirm predictions based on that theory. The preferred embodiment is not limited to a "wireline" transmission path and may collect data using a "free-space" transmission path.

As used herein, the terminology "closely spaced" refers to signals with frequencies 1 through n such that the phase relationships of the first and nth are such that the first quadrature of the first signal wave form is completed within the first half of the nth signal waveform.

As used herein, the terminology "multitoned" means multiple frequencies.

As used herein, the terminology "quadrature" as somewhat related to the definition in Wikipedia means in signal processing:

Quadrature amplitude modulation (QAM), a modulation method of using both an (in-phase) carrier wave and a 'quadrature' carrier wave that is 90° out of phase with the main, or in-phase, carrier Quadrature phase, oscillations that are said to be in quadrature if they are separated in phase by 90° ($\pi/2$, or $\lambda/4$)

Quadrature filter, the analytic signal of a real-valued filter

As used herein the terminology "$2^{nd}$-order intermod products" (i.e. p=2 in (Equation C-1)) indicated by the dashed ellipse in the plot of FIG. 34C. Mathematically, the second order intermod or intermodulation products are represented where p equals 2 in the equation $$r = \sum_{p=1}^{\infty} a_p s^p$$

where $$s = \sum_{i=1}^{N} s_i = \sum_{i=1}^{N} \cos(2\pi f_i t + \phi_i)$$

where N is the number of frequency components, t is time, $\phi$ is phase and $\alpha_p$ represents a scaling factor.

As used herein the terminology "amplitude maximum" means in terms of a graphical representation of a cross correlation between the transmitted and received wave versus time or distance, a sharp rise in amplitude indicative of a target. In cases where the transmitted waveform comprises the sum of multiple tones, such a correlation can be accomplished using a Fast Fourier Transform.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for determining distance to an electronic target using a multitone nonlinear radar system comprising:
   providing a transmitter that transmits a signal comprising at least two predetermined frequency components; the at least two predetermined frequency components having identical initial phase;
   receiving the transmitted signal upon reflection from a target; determining the phase relationships of the at least two predetermined frequency components when the signal strikes a target;
   determining the distance the signal has travelled to the target based upon the phase relationship of the at least two predetermined frequency signal components at the time of reflection from the target;
   computing the distance to the target based upon the distance the at least two predetermined frequency components have travelled;
   creating a graphical representation of the harmonic and intermodulation products from the at least two predetermined frequency components within a
   predetermined frequency range and wherein upon striking the target the at least two frequency components create harmonic and intermodulation correlations; the harmonic and intermodulation correlations creating an amplitude envelope in a graphical representation;
   wherein when the signal strikes the target, the amplitude of phase correlations of the harmonic and intermodulation products is maximized;
   wherein the harmonic and intermodulation correlations that create an amplitude envelope in the graphical representation determine the location of a target;
   and, further comprising the step of creating a high resolution range profile from the second order intermodulation products represented by p equals 2 in the equation $$r = \sum_{p=1}^{\infty} a_p s^p$$

where $$s = \sum_{i=1}^{N} s_i = \sum_{i=1}^{N} \cos(2\pi f_i t + \phi_i)$$

where N is the number of frequency components, t is time, $\phi$ is phase and $\alpha_p$ represents a scaling factor.

* * * * *